(12) United States Patent
Desoli et al.

(10) Patent No.: US 12,118,451 B2
(45) Date of Patent: Oct. 15, 2024

(54) DEEP CONVOLUTIONAL NETWORK HETEROGENEOUS ARCHITECTURE

(71) Applicants: STMICROELECTRONICS S.R.L., Agrate Brianza (IT); STMICROELECTRONICS INTERNATIONAL N.V., Amsterdam (NL)

(72) Inventors: Giuseppe Desoli, San Fermo Della Battaglia (IT); Thomas Boesch, Rovio (CH); Nitin Chawla, Noida (IN); Surinder Pal Singh, Noida (IN); Elio Guidetti, Montano Lucino (IT); Fabio Giuseppe De Ambroggi, Biassono (IT); Tommaso Majo, Vittuone Mi (IT); Paolo Sergio Zambotti, Milan (IT)

(73) Assignees: STMICROELECTRONICS S.r.l., Agrate Brianza (IT); STMICROELECTRONICS INTERNATIONAL B.V., Amsterdam (NL)

( * ) Notice: Subject to any disclaimer, the term of this patent is extended or adjusted under 35 U.S.C. 154(b) by 1032 days.

(21) Appl. No.: 15/423,272

(22) Filed: Feb. 2, 2017

(65) Prior Publication Data

US 2018/0189229 A1    Jul. 5, 2018

(30) Foreign Application Priority Data

Jan. 4, 2017    (IN) .............................. 201711000422

(51) Int. Cl.
*G06N 3/04*    (2023.01)
*G06F 30/327*    (2020.01)
(Continued)

(52) U.S. Cl.
CPC ......... *G06N 3/0464* (2023.01); *G06F 30/327* (2020.01); *G06F 30/34* (2020.01);
(Continued)

(58) Field of Classification Search
CPC .... G06N 3/04; G06F 15/7817; G06F 13/4022
See application file for complete search history.

(56) References Cited

U.S. PATENT DOCUMENTS 5,189,665 A    2/1993    Niehaus et al.
5,506,815 A    4/1996    Hsieh et al.
(Continued)

FOREIGN PATENT DOCUMENTS

CN    101093577 A    12/2007
CN    101578590 A    11/2009
(Continued)

OTHER PUBLICATIONS

Meloni et al. ("A High-Efficiency Runtime Reconfigurable IP for CNN Acceleration on a Mid-Range All-Programmable SoC"), Nov. 2016, ReConFig.*
(Continued)

*Primary Examiner* — Omar F Fernandez Rivas
*Assistant Examiner* — Tri T Nguyen
(74) *Attorney, Agent, or Firm* — Seed IP Law Group LLP

(57) ABSTRACT

Embodiments are directed towards a system on chip (SoC) that implements a deep convolutional network heterogeneous architecture. The SoC includes a system bus, a plurality of addressable memory arrays coupled to the system bus, at least one applications processor core coupled to the system bus, and a configurable accelerator framework coupled to the system bus. The configurable accelerator framework is an image and deep convolutional neural network (DCNN) co-processing system. The SoC also includes a plurality of digital signal processors (DSPs) coupled to the
(Continued)

system bus, wherein the plurality of DSPs coordinate functionality with the configurable accelerator framework to execute the DCNN.

24 Claims, 21 Drawing Sheets

(51) Int. Cl.

| | | |
|---|---|---|
| *G06F 30/34* | (2020.01) | |
| *G06F 30/347* | (2020.01) | |
| *G06N 3/044* | (2023.01) | |
| *G06N 3/045* | (2023.01) | |
| *G06N 3/0464* | (2023.01) | |
| *G06N 3/047* | (2023.01) | |
| *G06N 3/084* | (2023.01) | |
| *G06N 20/00* | (2019.01) | |
| *G06N 20/10* | (2019.01) | |
| *G06F 9/445* | (2018.01) | |
| *G06F 13/40* | (2006.01) | |
| *G06F 15/78* | (2006.01) | |
| *G06F 115/02* | (2020.01) | |
| *G06F 115/08* | (2020.01) | |
| *G06N 3/063* | (2023.01) | |
| *G06N 3/08* | (2023.01) | |
| *G06N 7/01* | (2023.01) | |

(52) U.S. Cl.
CPC .......... *G06F 30/347* (2020.01); *G06N 3/044* (2023.01); *G06N 3/045* (2023.01); *G06N 3/047* (2023.01); *G06N 3/084* (2013.01); *G06N 20/00* (2019.01); *G06N 20/10* (2019.01); *G06F 9/44505* (2013.01); *G06F 13/4022* (2013.01); *G06F 15/7817* (2013.01); *G06F 2115/02* (2020.01); *G06F 2115/08* (2020.01); *G06N 3/04* (2013.01); *G06N 3/063* (2013.01); *G06N 3/08* (2013.01); *G06N 7/01* (2023.01)

(56) References Cited

U.S. PATENT DOCUMENTS

| | | | |
|---|---|---|---|
| 5,768,613 A * | 6/1998 | Asghar | G06F 9/3879 |
| | | | 712/35 |
| 5,996,058 A * | 11/1999 | Song | G06F 9/3879 |
| | | | 712/31 |
| 6,011,779 A | 1/2000 | Wills | |
| 6,668,290 B1 | 12/2003 | Nelson | |
| 7,737,994 B1 | 6/2010 | Wasserman et al. | |
| 7,782,873 B2 | 8/2010 | Sharma | |
| 7,840,403 B2 | 11/2010 | Mehrotra et al. | |
| 8,131,659 B2 | 3/2012 | Xu et al. | |
| 9,020,276 B2 | 4/2015 | Vigliar et al. | |
| 9,294,097 B1 | 3/2016 | Vassiliev | |
| 9,294,403 B2 | 3/2016 | Mejia et al. | |
| 9,436,637 B2 * | 9/2016 | Kommanaboyina | |
| | | | G06F 15/17368 |
| 9,652,390 B2 | 5/2017 | Gu et al. | |
| 10,078,620 B2 | 9/2018 | Farabet et al. | |
| 10,296,829 B2 | 5/2019 | Mostafa et al. | |
| 10,394,929 B2 | 8/2019 | Tsai et al. | |
| 10,417,364 B2 | 9/2019 | Boesch et al. | |
| 10,417,560 B2 | 9/2019 | Henry et al. | |
| 10,438,115 B2 | 10/2019 | Henry et al. | |
| 10,452,605 B2 | 10/2019 | Wang et al. | |
| 10,482,155 B2 | 11/2019 | Werner et al. | |
| 10,546,211 B2 | 1/2020 | Shacham et al. | |
| 10,552,222 B2 | 2/2020 | Wang et al. | |
| 10,586,148 B2 | 3/2020 | Henry et al. | |
| 10,643,129 B2 | 5/2020 | Chen et al. | |
| 10,909,728 B1 | 2/2021 | Appalaraju et al. | |
| 11,003,985 B2 | 5/2021 | Kim et al. | |
| 11,334,768 B1 | 5/2022 | Brody | |
| 11,388,416 B2 | 7/2022 | Habibian et al. | |
| 11,520,561 B1 | 12/2022 | Afzal | |
| 11,531,873 B2 | 12/2022 | Boesch et al. | |
| 2002/0145779 A1 | 10/2002 | Strasser et al. | |
| 2003/0086421 A1 * | 5/2003 | Awsienko | H04L 45/04 |
| | | | 370/387 |
| 2004/0158623 A1 | 8/2004 | Avida et al. | |
| 2005/0138582 A1 | 6/2005 | So et al. | |
| 2005/0183055 A1 | 8/2005 | Herrera | |
| 2005/0268070 A1 | 12/2005 | Baxter | |
| 2010/0005238 A1 | 1/2010 | Jeddeloh et al. | |
| 2010/0061726 A1 | 3/2010 | Barbarossa et al. | |
| 2010/0077079 A1 | 3/2010 | Xu et al. | |
| 2010/0115249 A1 | 5/2010 | Paltashev et al. | |
| 2011/0002947 A1 | 1/2011 | Bouchard et al. | |
| 2011/0029471 A1 | 2/2011 | Chakradhar | |
| 2012/0287344 A1 | 11/2012 | Choi et al. | |
| 2012/0303932 A1 | 11/2012 | Farabet et al. | |
| 2013/0156278 A1 | 6/2013 | Kim et al. | |
| 2015/0046674 A1 | 2/2015 | Barry et al. | |
| 2015/0170021 A1 | 6/2015 | Lupon et al. | |
| 2015/0212955 A1 * | 7/2015 | Easwaran | G06F 13/4022 |
| | | | 710/317 |
| 2015/0261702 A1 | 9/2015 | Culurciello et al. | |
| 2016/0092484 A1 | 3/2016 | Finkler | |
| 2016/0094827 A1 | 3/2016 | Li et al. | |
| 2016/0148004 A1 | 5/2016 | Bakke et al. | |
| 2016/0179434 A1 | 6/2016 | Herrero Abellanas et al. | |
| 2016/0217101 A1 | 7/2016 | Johns et al. | |
| 2016/0344629 A1 | 11/2016 | Gray | |
| 2016/0379109 A1 | 12/2016 | Chung et al. | |
| 2016/0379115 A1 | 12/2016 | Burger et al. | |
| 2017/0011006 A1 | 1/2017 | Saber et al. | |
| 2017/0116495 A1 * | 4/2017 | Nomura | G06F 17/153 |
| 2017/0262407 A1 | 9/2017 | Wang et al. | |
| 2018/0032857 A1 | 2/2018 | Lele et al. | |
| 2018/0046895 A1 | 2/2018 | Xie et al. | |
| 2018/0046900 A1 | 2/2018 | Dally et al. | |
| 2018/0046906 A1 | 2/2018 | Dally et al. | |
| 2018/0076918 A1 | 3/2018 | Boduch et al. | |
| 2018/0084253 A1 | 3/2018 | Thiagarajan et al. | |
| 2018/0121796 A1 | 3/2018 | Deisher et al. | |
| 2018/0113649 A1 | 4/2018 | Shafie et al. | |
| 2018/0129935 A1 | 5/2018 | Kim et al. | |
| 2018/0157970 A1 * | 6/2018 | Henry | G06F 12/0813 |
| 2018/0189063 A1 | 7/2018 | Fleming et al. | |
| 2018/0189229 A1 | 7/2018 | Desoli et al. | |
| 2018/0189231 A1 | 7/2018 | Fleming, Jr. et al. | |
| 2018/0189424 A1 | 7/2018 | Boesch et al. | |
| 2018/0189641 A1 | 7/2018 | Boesch et al. | |
| 2018/0189642 A1 | 7/2018 | Boesch et al. | |
| 2018/0189981 A1 | 7/2018 | Singh et al. | |
| 2018/0197084 A1 | 7/2018 | Kim et al. | |
| 2018/0204110 A1 | 7/2018 | Kim et al. | |
| 2018/0255385 A1 | 9/2018 | Djordjevic et al. | |
| 2018/0336468 A1 | 11/2018 | Kadav et al. | |
| 2018/0336469 A1 | 11/2018 | O'Connor et al. | |
| 2019/0026626 A1 | 1/2019 | Du et al. | |
| 2019/0244080 A1 | 8/2019 | Li et al. | |
| 2019/0266479 A1 | 8/2019 | Singh et al. | |
| 2019/0266485 A1 | 8/2019 | Singh et al. | |
| 2019/0266784 A1 | 8/2019 | Singh et al. | |
| 2019/0340488 A1 | 11/2019 | Fishel et al. | |
| 2019/0340508 A1 | 11/2019 | Liu et al. | |
| 2019/0392297 A1 | 12/2019 | Lau et al. | |
| 2020/0092556 A1 | 3/2020 | Coelho et al. | |
| 2020/0228840 A1 | 7/2020 | Fracastoro et al. | |
| 2020/0272779 A1 | 8/2020 | Boesch et al. | |
| 2020/0280717 A1 | 9/2020 | Li et al. | |
| 2020/0293487 A1 | 9/2020 | Anderson et al. | |
| 2020/0304802 A1 | 9/2020 | Habibian et al. | |
| 2020/0304804 A1 | 9/2020 | Habibian et al. | |
| 2020/0327367 A1 | 10/2020 | Ma et al. | |
| 2020/0364288 A1 | 11/2020 | Wen et al. | |
| 2021/0021823 A1 | 1/2021 | Na et al. | |
| 2021/0073450 A1 | 3/2021 | Boesch et al. | |
| 2021/0099710 A1 | 4/2021 | Salehifar et al. | |

(56) References Cited

U.S. PATENT DOCUMENTS

| | | |
|---|---|---|
| 2021/0125070 A1 | 4/2021 | Wang et al. |
| 2021/0125380 A1 | 4/2021 | Lee et al. |
| 2021/0150767 A1 | 5/2021 | Ikai et al. |
| 2021/0216752 A1 | 7/2021 | Trani et al. |
| 2021/0232407 A1 | 7/2021 | Liu |
| 2021/0319290 A1 | 10/2021 | Mills et al. |
| 2021/0397966 A1 | 12/2021 | Sun et al. |
| 2022/0027715 A1 | 1/2022 | Carrera et al. |
| 2022/0138992 A1 | 5/2022 | Wu et al. |
| 2023/0084985 A1 | 3/2023 | Boesch et al. |
| 2023/0206032 A1 | 6/2023 | Desoli et al. |
| 2023/0252298 A1 | 8/2023 | Song et al. |

FOREIGN PATENT DOCUMENTS

| | | |
|---|---|---|
| CN | 101739241 A | 6/2010 |
| CN | 105247821 A | 1/2016 |
| CN | 105659099 A | 6/2016 |
| CN | 105892989 A | 8/2016 |
| CN | 106951961 A | 7/2017 |
| CN | 109255429 A | 1/2019 |
| CN | 106228240 B | 9/2020 |
| EP | 1 087 533 A1 | 3/2001 |
| WO | 9602895 A1 | 2/1996 |
| WO | 2018/120019 A1 | 7/2018 |
| WO | 2019/045883 A1 | 3/2019 |
| WO | 2019/093234 A1 | 5/2019 |

OTHER PUBLICATIONS

Graf et al. ("A Massively Parallel Digital Learning Processor"), 2008, Advinces in Neural Information Processing Ssystems.*
Stenstrom et al. ("Reducing Contention in Shared-Memory Multiprocessors"), Nov. 1988.*
Moctar et al. ("Routing Algorithms for FPGAS With Sparse Intra-Cluster Routing Crossbars"), Aug. 2012.*
Choudhary et al. ("Netra: A Hierarchical and Partitionable Architecture for Computer Vision Systems"), Jan. 1993.*
Du et al. ("ShiDianNao: Shifting Vision Processing Closer to the Sensor"), Jun. 2015.*
Jagannathan et al. ("Optimizing Convolutional Neural Network on DSP") (Year: 2016).*
Jain, "Parallel Processing with the TMS320C40 Parallel Digital Signal Processor", Feb. 1994 (Year: 1994).*
Kurugollu et. al., "Advanced educational parallel DSP system based on TMS320C25 processors", Apr. 1995 (Year: 1995).*
Chen et. al. "DianNao: A Small-Footprint High-Throughput Accelerator for Ubiquitous Machine-Learning", Mar. 2014 (Year: 2014).*
Guo et. al., "Angel-Eye: A Complete Design Flow for Mapping CNN onto Customized Hardware", Jul. 2016 (Year: 2016).*
Desoli et al., "14.1: A 2.9TOPS/W Deep Convolutional Neural Network SoC in FD-SOI 28nm for Intelligent Embedded Systems," *IEEE International Solid-State Circuits Conference* (*ISSCC*), San Francisco, California, Feb. 5-9, 2017, pp. 238-239. (3 pages).
Du et al., "ShiDianNao: Shifting Vision Processing Closer to The Sensor," *2015 ACM/IEEE 42nd Annual International Symposium on Computer Architecture* (*ISCA*), Portland, Oregon, Jun. 13-17, 2015, pp. 92-104.
Extended European Search Report, dated May 18, 2018, for European Application No. 17196986.8-1221, 11 pages.
Gokhale et al., "A 240 G-ops/s Mobile Coprocessor for Deep Neural Networks (Invited Paper)," *The IEEE Conference on Computer Vision and Pattern Recognition* (*CVPR*) Workshop, Columbus, Ohio, Jun. 23-28, 2014, pp. 696-701.
Dehon et al., "Stream computations organized for reconfigurable execution, " *Microprocessors and Microsystems* 30(6):334-354, 2006.
Extended European Search Report, dated May 7, 2018, for European Application No. 17197155.9-1221, 10 Pages.
Extended European Search Report, dated May 9, 2018, for European Application No. 17197096.5-1221, 12 Pages.
Extended European Search Report, dated May 23, 2018, for European Application No. 17197028.8-1221, 15 pages.
Venieris et al., "fpgaConvNet: A Framework for Mapping Convolutional Neural Networks on FPGAs," *IEEE 24th Annual International Symposium on Field-Programmable Custom Computing Machines* (*FCCM*), IEEE Computer Society, Washington DC, May 1-3, 2016, pp. 40-47.
Venieris et al., "fpgaConvNet: A Framework for Mapping Convolutional Neural Networks on FPGAs," *IEEE 24th Annual International Symposium on Field-Programmable Custom Computing Machines* (*FCCM*), IEEE Computer Society, Washington DC, May 2, 2016, 19 pages.
"CS 179 Lecture 4: GPU Compute Architecture," Slideshow Presentation, 2015, 29 pages.
Abdelgawad et al., "High Level Synthesis of Canny Edge Detection Algorithm on Zynq Platform," *International Journal of Computer, Electrical, Automation, Control and Information Engineering* 9(1):148-152, 2015.
Chen et al., "A High-Throughput Neural Network Accelerator," *IEEE Micro* 35(3):24-32, May 2015.
Chen et al., "DaDianNao: A Machine-Learning Supercomputer," 2014 47th Annual IEEE/ACM International Symposium on Microarchitecture, Dec. 13-17, 2014, Cambridge, United Kingdom, 14 pages.
Chen et al., "Eyeriss: An Energy-Efficient Reconfigurable Accelerator for Deep Convolutional Neural Networks," 2016 IEEE International Solid-State Circuits Conference, Jan. 31-Feb. 4, 2016, San Francisco, CA, 3 pages.
Kościelnicki, "nVidia Hardware Documentation," Release git, Dec. 16, 2016, 631 pages.
Krizhevsky et al., "ImageNet Classification with Deep Convolutional Neural Networks," 25th International Conference on Neural Information Processing Systems, Dec. 3-6, 2012, Lake Tahoe, Nevada, 9 pages.
LeCun et al., "Deep Learning: Nature Review," Slideshow Presentation, 2016, 44 pages.
LeCun et al., "Deep Learning Tutorial," Slideshow Presentation, 2013, 204 pages.
LeCun et al., "Gradient-Based Learning Applied to Document Recognition," Proceedings of the *IEEE* 86(11):2278-2324, Nov. 1998.
Lee, "Deep Learning Methods for Vision," Slideshow Presentation, 2012, 102 pages.
Matteucci, "Deep Learning—Introduction," Slideshow Presentation, 2015, 79 pages,.
Monson et al., "Implementing High-Performance, Low-Power FPGA-based Optical Flow Accelerators in C," 24th International Conference on Application-Specific Systems, Architectures and Processors (ASAP), Jun. 5-7, 2013, Washington, DC, 7 pages.
Nvidia, "Nvidia's Next Generation CUDA Compute Architecture: Fermi™," Whitepaper, 2009, 22 pages.
Porter et al., "Lucas-Kanade Optical Flow Accelerator," MIT 6.375, May 11, 2011, 22 pages.
Qiu et al., "A Hardware Accelerator with Variable Pixel Representation & Skip Mode Prediction for Feature Point Detection Part of SIFT Algorithm," 2009 IAPR Conference on Machine Vision Applications, May 20-22, 2009, Yokohama, Japan, 4 pages.
Roque et al., "Adapting the Sobel Edge Detector and Canny Edge Extractor for iPhone 3GS architecture," 17th International Conference on Systems, Signals and Image Processing, Jun. 17-19, 2010, Rio de Janeiro, Brazil, 4 pages.
Sim et al., "A 1.42TOPS/W Deep Convolutional Neural Network Recognition Processor for Intelligent IoE Systems," 2016 IEEE International Solid-State Circuits Conference, Jan. 31-Feb. 4, 2016, San Francisco, CA, 3 pages.
Stensland, "INF5063—GPU & CUDA," Slideshow Presentation, 2011, 44 pages.
Extended European Search Report, dated May 18, 2018, for European Application No. 17197117.9-1221, 15 pages.

(56) References Cited

OTHER PUBLICATIONS

Alawad et al., "Stochastic-Based Deep Convolutional Networks with Reconfigurable Logic Fabric," *IEEE Transactions on Multi-Scale Computing Systems* 2(4):242-256, 2016.

Conti et al., "A Ultra-Low-Energy Convolution Engine for Fast Brain-Inspired Vision in Multicore Clusters," *Automations & Test in Europe Conference & Exhibition*, Mar. 9-13, 2015, Grenoble, France, pp. 683-688.

DeBole et al., "FPGA-Accelerator System for Computing Biologically Inspired Feature Extraction Models," *2011 Conference Record of the Forty Fifth Asilomar Conference on Signals, Systems and Computers (ASILOMAR)*, Nov. 6-9, 2011, Pacific Grove, California, pp. 751-755.

Jin et al., "An Efficient Implementation of Deep Convolutional Neural Networks on a Mobile Coprocessor," *57th International Midwest Symposium on Circuits and Systems (MWSCAS)*, Aug. 3-6, 2014, College Station, Texas, pp. 133-136.

Lenart, "Design of Reconfigurable Hardware Architectures for Real-time Applications," thesis, Lund University, Lund, Sweden, 2008, 195 pages.

Rahman et al., "Efficient FPGA Acceleration of Convolutional Neural Networks Using Logical-3D Compute Array," *Design, Automation & Test in Europe Conference & Exhibition*, Mar. 14-18, 2016, Dresdon, Germany, pp. 1393-1398.

Sedcole, "Reconfigurable Platform-Based Design in FPCGAs for Video Image Processing," doctoral thesis, University of London, London, UK, 2006, 206 pages.

Shi et al., "A Locality Aware Convolutional Neural Networks Accelerator," *Euromicro Conference on Digital System Design*, Aug. 26-28, 2015, Funchal, Portugal, pp. 591-598.

Huang, et al., "eCNN: A Block-Based and Highly Parallel CNN Accelerator for Edge Inference", MICRO-52, 2019, 14 pages.

Shen, et al., "Escher: A CNN Accelerator with Flexible Buffering to Minimize Off-Chip Transfer", 2017 IEEE 25th Annual International Symposium on Field-Programmable Custom Computing Machines (FCCM), Napa, CA, 2017, pp. 93-100.

Wang, et al., "PipeCNN: An OpenCL-Based FPGA Accelerator for Large-Scale Convolution Neuron Networks", 2017 International Conference on Field Programmable Technology (ICFPT), Melbourne, VIC, 2017, pp. 279-282.

Yin, et al. "Parana: A Parallel Neural Architecture Considering Thermal Problem of 3D Stacked Memory", IEEE Transactions on Parallel and Distributed Systems, vol. 29, 2018, 15 pages.

Cesur et al., "On an Improved FPGA Implementation of CNN-based Gabor-Type filters," *IEEE Transactions on Circuits and Systems—II Express Briefs* 59(11):815-819, 2012.

Choudhary et al., "Netra: A Hierarchical and Partitionable Architecture for Computer Vision Systems," *IEEE Transactions on Parallel and Distributed Systems* 4(10):1092-1104, 1993.

Dundar, "Learning from minimally labeled data with accelerated convolutional neural networks," Doctoral Thesis, Purdue University, West Lafayette, Indiana, 2016, 150 pages.

Gong et al., "Compressing Deep Convolutional Networks using Vector Quantization," arXiv:1412.6115 [cs.CV], Dec. 2014, 10 pages.

Gray et al., "MOS Operational Amplifier Design—A Tutorial Overview," *IEEE Journal of Solid-State Circuits SC-17*(6):969-982, Dec. 1982.

Huang et al., "A Vector-Quantization Compression Circuit With On-Chip Learning Ability for High-Speed Image Sensor," *IEEE Access* 5:22132-22143, 2017.

Lee et al., "Convolutional Neural Network Accelerator with Vector Quantization," IEEE International Symposium on Circuits and Systems, May 26-29, 2019, Sapporo, Japan, 5 pages.

Lloyd "Least Squares Quantization in PCM," *IEEE Transactions on Information Theory IT-28*(2):129-137, 1982.

Nair et al., "Rectified Linear Units Improve Restricted Boltzmann Machines," Proceedings of the 27th International Conference on Machine Learning, Haifa, Israel, Jun. 21, 2010, 8 pages.

Qin et al., "How Convolutional Neural Networks See the World—A Survey of Convolutional Neural Network Visualization Methods," *Mathematical Foundations of Computing* 1(2):149-180, 2018 (32 pages).

Sedcole, "Reconfigurable Platform-Based Design in FPGAs for Video Image Processing," Doctoral Thesis, Imperial College of Science, Technology and Medicine, University of London, London, UK, Jan. 2006, 206 pages.

Wu et al., "Accelerator Design for Vector Quantized Convolutional Neural Network," IEEE International Conference on Artificial Intelligence Circuits and Systems, Mar. 18-20, 2019, Hsinchu, Taiwan, pp. 46-50.

Xia et al., "Dynamic Look-up Table Method for Optimizing the Training of Deep Neural Networks on Many-Core Architecture," IEEE 7th International Conference on Computer Science and Network Technology, Oct. 19-20, 2019, Dalian, China, pp. 216-225.

Yu et al., "FPGA-based Accelerator for Convolutional Neural Network," *Computer Engineering* 43(1):109-119, 2017 (with English abstract).

Cavigelli et al., "Origami: A 803 GOp/s/W Convolutional Network Accelerator," *IEEE Transactions on Circuits and Systems for Video Technology* 27(11):2461-2475, 2017.

Chi et al., "Prime: A Novel Processing-in-Memory Architecture for Neural Network Computation in ReRAM-Based Main Memory," Jun. 18-22, 2016, ACM/IEEE 43rd Annual International Symposium on Computer Architecture (ISCA), pp. 27-39.

DiCecco et al., "Caffeinated FPGAs: FPGA Framework for Convolutional Neural Networks," arXiv:1609.09671, 8 pages, 2016.

Gysel et al., "Hardware-Oriented Approximation of Convolutional Neural Networks." arXiv:1604.03168, 8 pages, 2016.

Lei et al., "Scadis: A Scalable Accelerator for Data-Intensive String Set Matching on FPGAs," IEEE TrustCom-BigDataSE-ISPA, Aug. 23-26, 2016, Tianjin, China, pp. 1190-1197.

Wang et al., "DLAU: A Scalable Deep Learning Accelerator Unit on FPGA" *IEEE Transactions on Computer-Aided Design of Integrated Circuits and Systems* 36(3):513-517, 2017.

Yao et al., "Hardware-Friendly Convolutional Neural Network with Even-Number Filter Size," Workshop track—ICLR 2016, 4 pages, 2016.

Zhao et al., "Pie: A Pipeline Energy-efficient Accelerator for Inference Process in Deep Neural Networks," IEEE 22nd International Conference on Parallel and Distributed Systems (ICPADS), Dec. 13-16, 2016, Wuhan, China, 8 pages.

Dundar, "Learning from minimally labeled data with accelerated convolutional neural networks," doctoral dissertation, Purdue University, West Lafayette, Indiana, 2016, 150 pages.

Boo et al., Compression of Deep Neural Networks with Structured Sparse Ternary Coding, *Journal of Signal Processing Systems* 91:1009-1019, 2019.

Chang et al., "Mitigating Asymmetric Nonlinear Weight Update Effects in Hardware Neural Network Based on Analog Resistive Synapse," *IEEE Journal on Emerging and Selected Topics in Circuits and Systems* 8(1):116-124, 2018.

Choudhary, "Parallel Architectures and Parallel Algorithms for Integrated Vision Systems," Thesis, University of Illinois at Urbana-Champaign, Champaign, Illinois, 200 pages.

Jain, "Parallel Processing With the TMS320C40 Parallel Digital Signal Processor," Texas Instruments, SPRAO53, pp. 1-32, 1994 (34 pages).

Kurugöllü et al., "Advanced educational Parallel DSP system based on TMS320C25 Processors," *Microprocessors and Microsystems* 19(3):147-156, 1995.

Lian, "A Framework for FPGA-Based Acceleration of Neural Network Inference with Limited Numerical Precision via High-Level Synthesis With Streaming Functionality," Thesis, University of Toronto, Toronto, Ontario, Canada, 2016, 117 pages.

Zamanidoost et al., "Low Area Overhead In-situ Training Approach for Memristor-Based Classifier," Proceedings of the 2015 IEEE/ACM International Symposium on Nanoscale Architectures (NANOARCH'15), Jul. 8-10, 2015, Boston, Massachusetts, pp. 139-142.

(56) References Cited

OTHER PUBLICATIONS

Zhao et al., "Leveraging MLC STT-RAM for Energy-efficient CNN Training, " MEMSYS '18: Proceedings of the International Symposium on Memory Systems, Oct. 2018, Alexandria, Virginia, pp. 279-290.
Albericio et al., "Bit-Pragmatic Deep Neural Network Computing," Oct. 20, 2016. (12 pages).
Li et al., "A High Performance FPGA-based Accelerator for Large-Scale Convolutional Neural Networks," 1-9, 2016.
Liu et al., "Pruning of Winograd and FFT Based Convolution Algorithm," 1-7, 2016.
Paulino, "Generation of Custom Run-time Reconfigurable Hardware for Transparent Binary Acceleration," dissertation, Faculdade de Engenharia da Universidade do Porto, Jun. 2016. (202 pages).
Shen et al., "Maximizing CNN Accelerator Efficiency Through Resource Partitioning," Jun. 30, 2016. (12 pages).

\* cited by examiner

| Unit | INFO |
|---|---|
| KERNEL SIZE | 1x1 to 12x12 |
| BATCH SIZE | Up to 16 |
| PARALLEL KERNELS | Up to 4 |
| FEATURE SIZE | Up to 512 for kernels > 6x6<br>Up to 1024 for kernels > 3x3<br>Up to 2048 for others |
| VARIOUS EXTENSIONS | KERNEL DECOMPRESSION 8bit => 16 bit, KERNEL PREBUFFERING, OUTPUT STREAM MERGING, DATA SHIFTING AND ROUNDING |

DEEP CONVOLUTIONAL NETWORK HETEROGENEOUS ARCHITECTURE

CROSS-REFERENCE(S) TO RELATED APPLICATION(S)

This application claims the benefit of Indian Provisional Patent Application No. 201711000422, filed Jan. 4, 2017, which application is hereby incorporated by reference in its entirety.

BACKGROUND

Technical Field

The present disclosure generally relates to deep convolutional neural networks (DCNN). More particularly, but not exclusively, the present disclosure relates to a hardware accelerator engine arranged to implement a portion of the DCNN.

Description of the Related Art

Known computer vision, speech recognition, and signal processing applications benefit from the use of deep convolutional neural networks (DCNN). A seminal work in the DCNN arts is "Gradient-Based Learning Applied To Document Recognition," by Y. LeCun et al., Proceedings of the IEEE, vol. 86, no. 11, pp. 2278-2324, 1998, which led to winning the 2012 ImageNet Large Scale Visual Recognition Challenge with "AlexNet." AlexNet, as described in "ImageNet Classification With Deep Convolutional Neural Networks," by Krizhevsky, A., Sutskever, I., and Hinton, G., NIPS, pp. 1-9, Lake Tahoe, Nev. (2012), is a DCNN that significantly outperformed classical approaches for the first time.

A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer.

For example, if a plurality of two-dimensional pictures of faces is provided as input to a DCNN, the DCNN will learn a variety of characteristics of faces such as edges, curves, angles, dots, color contrasts, bright spots, dark spots, etc. These one or more features are learned at one or more first layers of the DCNN. Then, in one or more second layers, the DCNN will learn a variety of recognizable features of faces such as eyes, eyebrows, foreheads, hair, noses, mouths, cheeks, etc.; each of which is distinguishable from all of the other features. That is, the DCNN learns to recognize and distinguish an eye from an eyebrow or any other facial feature. In one or more third and then subsequent layers, the DCNN learns entire faces and higher order characteristics such as race, gender, age, emotional state, etc. The DCNN is even taught in some cases to recognize the specific identity of a person. For example, a random image can be identified as a face, and the face can be recognized as Orlando Bloom, Andrea Bocelli, or some other identity.

In other examples, a DCNN can be provided with a plurality of pictures of animals, and the DCNN can be taught to identify lions, tigers, and bears; a DCNN can be provided with a plurality of pictures of automobiles, and the DCNN can be taught to identify and distinguish different types of vehicles; and many other DCNNs can also be formed. DCNNs can be used to learn word patterns in sentences, to identify music, to analyze individual shopping patterns, to play video games, to create traffic routes, and DCNNs can be used for many other learning-based tasks too.

FIG. 1 includes FIGS. 1A-1J.

FIG. 1A is a simplified illustration of a convolutional neural network (CNN) system 10. In the CNN system, a two-dimensional array of pixels is processed by the CNN. The CNN analyzes a 10×10 input object plane to determine if a "1" is represented in the plane, if a "0" is represented in the plane, or if neither a "1" nor a "0" is implemented in the plane.

In the 10×10 input object plane, each pixel is either illuminated or not illuminated. For the sake of simplicity in illustration, illuminated pixels are filled in (e.g., dark color) and unilluminated pixels are not filled in (e.g., light color).

FIG. 1B illustrates the CNN system 10 of FIG. 1A determining that a first pixel pattern illustrates a "1" and that a second pixel pattern illustrates a "0." In the real world, however, images do not always align cleanly as illustrated in FIG. 1B.

In FIG. 1C, several variations of different forms of ones and zeroes are shown. In these images, the average human viewer would easily recognize that the particular numeral is translated or scaled, but the viewer would also correctly determine if the image represented a "1" or a "0." Along these lines, without conscious thought, the human viewer looks beyond image rotation, various weighting of numerals, sizing of numerals, shifting, inversion, overlapping, fragmentation, multiple numerals in the same image, and other such characteristics. Programmatically, however, in traditional computing systems, such analysis is very difficult. A variety of image matching techniques are known, but this type of analysis quickly overwhelms the available computational resources even with very small image sizes. In contrast, however, a CNN system 10 can correctly identify ones, zeroes, both ones and zeroes, or neither a one nor a zero in each processed image with an acceptable degree of accuracy even if the CNN system 10 has never previously "seen" the exact image.

FIG. 1D represents a CNN operation that analyzes (e.g., mathematically combines) portions of an unknown image with corresponding portions of a known image. For example, a 3-pixel portion of the left-side, unknown image B5-C6-D7 may be recognized as matching a corresponding 3-pixel portion of the right-side, known image C7-D8-E9. In these and other cases, a variety of other corresponding pixel arrangements may also be recognized. Some other correspondences are illustrated in Table 1.

TABLE 1

| Corresponding known to unknown images segments | |
|---|---|
| FIG. 1D<br>Left-side, unknown image | FIG. 1D<br>Right-side, known image |
| C3-B4-B5<br>C6-D7-E7-F7-G6<br>E1-F2<br>G2-H3-H4-H5 | D3-C4-C5<br>D8-E9-F9-G9-H8<br>G2-H3<br>H3-I4-I5-I6 |

Recognizing that segments or portions of a known image may be matched to corresponding segments or portions of an unknown image, it is further recognized that by unifying the portion matching operation, entire images may be processed in the exact same way while achieving previously uncalculated results. Stated differently, a particular portion size may be selected, and a known image may then be analyzed portion-by-portion. When a pattern within any given portion of a known image is mathematically combined with a similarly sized portion of an unknown image, information is generated that represents the similarity between the portions.

FIG. 1E illustrates six portions of the right-side, known image of FIG. 1D. Each portion, also called a "kernel," is arranged as a 3-pixel-by-3-pixel array. Computationally, pixels that are illuminated are represented mathematically as a positive "1" (i.e., +1); and pixels that are not illuminated are represented mathematically as a negative "1" (i.e., −1). For the sake of simplifying the illustration in FIG. 1E, each illustrated kernel is also shown with the column and row reference of FIG. 1D.

The six kernels shown in FIG. 1E are representative and selected for ease of understanding the operations of CNN system 10. It is clear that a known image can be represented with a finite set of overlapping or non-overlapping kernels. For example, considering a 3-pixel-by-3-pixel kernel size and a system of overlapping kernels having a stride of one (1), each 10×10 pixel image may have 64 corresponding kernels. That is, a first kernel spans the 9 pixels in columns A, B, C, and rows 1, 2, 3.

A second kernel spans the 9 pixels in columns B, C, D, and rows 1, 2, 3.

A third kernel spans the 9 pixels in columns C, D, E, and rows 1, 2, 3 and so on until an eighth kernel spans the 9 pixels in columns H, I, J, and rows 1, 2, 3.

Kernel alignment continues in this way until a $57^{th}$ kernel spans columns A, B, C, and rows 8, 9, 10, and a $64^{th}$ kernel spans columns H, I, J, and rows 8, 9, 10.

In other CNN systems, kernels may be overlapping or not overlapping, and kernels may have strides of 2, 3, or some other number. The different strategies for selecting kernel sizes, strides, positions, and the like are chosen by a CNN system designer based on past results, analytical study, or in some other way.

Returning to the example of FIGS. 1D, and 1E, a total of 64 kernels are formed using information in the known image. The first kernel starts with the upper-most, left-most 9 pixels in a 3×3 array. The next seven kernels are sequentially shifted right by one column each. The ninth kernel returns back to the first three columns and drops down a row, similar to the carriage return operation of a text-based document, which concept is derived from a twentieth-century manual typewriter. In following this pattern, FIG. 1E shows the $7^{th}$, $18^{th}$, $24^{th}$, $32^{nd}$, $60^{th}$, and $62^{nd}$ kernels.

Sequentially, or in some other known pattern, each kernel is aligned with a correspondingly sized set of pixels of the image under analysis. In a fully analyzed system, for example, the first kernel is conceptually overlayed on the unknown image in each of the kernel positions. Considering FIGS. 1D and 1E, the first kernel is conceptually overlayed on the unknown image in the position of Kernel No. 1 (left-most, top-most portion of the image), then the first kernel is conceptually overlayed on the unknown image in the position of Kernel No. 2, and so on, until the first kernel is conceptually overlayed on the unknown image in the position of Kernel No. 64 (bottom-most, right-most portion of the image). The procedure is repeated for each of the 64 kernels, and a total of 4096 operations are performed (i.e., 64 kernels in each of 64 positions). In this way, it is also shown that when other CNN systems select different kernel sizes, different strides, and different patterns of conceptual overlay, then the number of operations will change.

In the CNN system 10, the conceptual overlay of each kernel on each portion of an unknown image under analysis is carried out as a mathematical process called convolution. Each of the nine pixels in a kernel is given a value of positive "1" (+1) or negative "1" (−1) based on whether the pixel is illuminated or unilluminated, and when the kernel is overlayed on the portion of the image under analysis, the value of each pixel in the kernel is multiplied by the value of the corresponding pixel in the image. Since each pixel has a value of +1 (i.e., illuminated) or −1 (i.e., unilluminated), the multiplication will always result in either a +1 or a −1. Additionally, since each of the 4096 kernel operations is processed using a 9-pixel kernel, a total of 36,864 mathematical operations (i.e., 9×4096) are performed at this first stage of a single unknown image analysis in a very simple CNN. It is clear that CNN systems require tremendous computational resources.

As just described, each of the 9 pixels in a kernel is multiplied by a corresponding pixel in the image under analysis. An unilluminated pixel (−1) in the kernel, when multiplied by an unilluminated pixel (−1) in the subject unknown image will result in a +1 indicated a "match" at that pixel position (i.e., both the kernel and the image have an unilluminated pixel). Similarly, an illuminated pixel (+1) in the kernel multiplied by an illuminated pixel (+1) in the unknown image also results in a match (+1). On the other hand, when an unilluminated pixel (−1) in the kernel is multiplied by an illuminated pixel (+1) in the image, the result indicates no match (−1) at that pixel position. And when an illuminated pixel (+1) in the kernel is multiplied by an unilluminated pixel (−1) in the image, the result also indicates no match (−1) at that pixel position.

After the nine multiplication operations of a single kernel are performed, the product results will include nine values; each of the nine values being either a positive one (+1) or a negative one (−1). If each pixel in the kernel matches each pixel in the corresponding portion of the unknown image, then the product result will include nine positive one (+1) values. Alternatively, if one or more pixels in the kernel do not match a corresponding pixel in the portion of the unknown image under analysis, then the product result will have at least some negative one (−1) values. If every pixel in the kernel fails to match the corresponding pixel in the corresponding portion of the unknown image under analysis, then the product result will include nine negative one (−1) values.

Considering the mathematical combination (i.e., the multiplication operations) of pixels, it is recognized that the number of positive one (+1) values and the number of negative one (−1) values in a product result represents the degree to which the feature in the kernel matches the portion of the image where the kernel is conceptually overlayed. Thus, by summing all of the products (e.g., summing the nine values) and dividing by the number of pixels (e.g., nine), a single "quality value" is determined. The quality value represents the degree of match between the kernel and the portion of the unknown image under analysis. The quality value can range from negative one (−1) when no kernel pixels match and positive one (+1) when every pixel in the kernel has the same illuminated/unilluminated status as its corresponding pixel in the unknown image.

The acts described herein with respect to FIG. 1E may also collectively be referred to as a first convolutional process in an operation called "filtering." In a filter operation, a particular portion of interest in a known image is searched for in an unknown image. The purpose of the filter is to identify if and where the feature of interest is found in the unknown image with a corresponding prediction of likelihood.

FIG. 1F illustrates twelve acts of convolution in a filtering process. FIG. 1G shows the results of the twelve convolutional acts of FIG. 1F. In each act, a different portion of the unknown image is processed with a selected kernel. The selected kernel may be recognized as the twelfth kernel in the representative numeral one ("1") of FIG. 1B. The representative "1" is formed in FIG. 1B as a set of illuminated pixels in a 10-pixel-by-10-pixel image. Starting in the top-most, left-most corner, the first kernel covers a 3-pixel-by-3-pixel portion. The second through eighth kernels sequentially move one column rightward. In the manner of a carriage return, the ninth kernel begins in the second row, left-most column. Kernels 10-16 sequentially move one column rightward for each kernel. Kernels 17-64 may be similarly formed such that each feature of the numeral "1" in FIG. 1B is represented in at least one kernel.

In FIG. 1F(a), a selected kernel of 3-pixels by 3-pixels is conceptually overlayed on a left-most, top-most section of an unknown image. The selected kernel in this case is the twelfth kernel of the numeral "1" of FIG. 1B. The unknown image in FIG. 1F(a) may appear to a human observer as a shifted, poorly formed numeral one (i.e., "1"). In the convolutional process, the value of each pixel in the selected kernel, which is "+1" for illuminated pixels and "−1" for unilluminated pixels, is multiplied by each corresponding pixel in the unknown image. In FIG. 1F(a), five kernel pixels are illuminated, and four kernel pixels are unilluminated. Every pixel in the unknown image is unilluminated. Accordingly, when all nine multiplications are performed, five products are calculated to be "−1," and four products are calculated to be "+1." The nine products are summed, and the resulting value of "−1" is divided by nine. For this reason, the corresponding image of FIG. 1G(a) shows a resulting kernel value of "−0.11" for the kernel in the left-most, top-most section of the unknown image.

In FIGS. 1F(b), 1F(c), and 1F(d), the kernel pixel is sequentially moved rightward across the columns of the image. Since each pixel in the area of the first six columns and first three rows spanning the first six columns is also unilluminated, FIGS. 1G(b), 1G(c), and 1G(d) each show a calculated kernel value of "−0.11."

FIGS. 1F(e) and 1G(e) show a different calculated kernel value from the earlier calculated kernel values of "−0.11." In FIG. 1F(e), one of the illuminated kernel pixels matches one of the illuminated pixels in the unknown image. This match is shown by a darkened pixel in FIG. 1F(e). Since FIG. 1F(e) now has a different set of matched/unmatched characteristics, and further, since another one of the kernel pixels matches a corresponding pixel in the unknown image, it is expected that the resulting kernel value will increase. Indeed, as shown in FIG. 1G(e), when the nine multiplication operations are carried out, four unilluminated pixels in the kernel match four unilluminated pixels in the unknown image, one illuminated pixel in the kernel matches one illuminated pixel in the unknown image, and four other illuminated pixels in the kernel do not match the unilluminated four pixels in the unknown image. When the nine products are summed, the result of "+1" is divided by nine for a calculated kernel value of "+0.11" in the fifth kernel position.

As the kernel is moved further rightward in FIG. 1F(f), a different one of the illuminated kernel pixels matches a corresponding illuminated pixel in the unknown image. FIG. 1G(f) represents the set of matched and unmatched pixels as a kernel value of "+0.11."

In FIG. 1F(g), the kernel is moved one more column to the right, and in this position, every pixel in the kernel matches every pixel in the unknown image. Since the nine multiplications performed when each pixel of the kernel is multiplied by its corresponding pixel in the unknown image results in a "+1.0," the sum of the nine products is calculated to be "+9.0," and the final kernel value for the particular position is calculated (i.e., 9.0/9) to be "+1.0," which represents a perfect match.

In FIG. 1F(h), the kernel is moved rightward again, which results in a single illuminated pixel match, four unilluminated pixel matches, and a kernel value of "+0.11," as illustrated in FIG. 1G(h).

The kernel continues to be moved as shown in FIGS. 1F(i), 1F(j), 1F(k), and 1F(l), and in each position, a kernel value is mathematically calculated. Since no illuminated pixels of the kernel are overlayed on illuminated pixels of the unknown image in FIGS. 1F(i) to 1F(l), the calculated kernel value for each of these positions is "−0.11." The kernel values are shown in FIGS. 1G(i), 1G(j), 1G(k), and 1G(l) as "−0.11" in the respective four kernel positions.

FIG. 1H illustrates a stack of maps of kernel values. The topmost kernel map in FIG. 1H is formed when the twelfth kernel of the numeral "1" in FIG. 1B is moved into each position of the unknown image. The twelfth kernel will be recognized as the kernel used in each of FIGS. 1F(a) to 1F(l) and FIGS. 1G(a) to 1G(l). For each position where the selected kernel is conceptually overlayed on the unknown image, a kernel value is calculated, and the kernel value is stored in its respective position on the kernel map.

Also in FIG. 1H, other filters (i.e., kernels) are also applied to the unknown image. For simplicity in the discussion, the 29th kernel of the numeral "1" in FIG. 1B is selected, and the 61st kernel of the numeral "1" in FIG. 1B is selected. For each kernel, a distinct kernel map is created. The plurality of created kernel maps may be envisioned as a stack of kernel maps having a depth equal to the number of filters (i.e., kernels) that are applied. The stack of kernel maps may also be called a stack of filtered images.

In the convolutional process of the CNN system 10, a single unknown image is convolved to create a stack of filtered images. The depth of the stack is the same as, or is otherwise based on, the number of filters (i.e., kernels) that are applied to the unknown image. The convolutional process in which a filter is applied to an image is also referred to as a "layer" because they can be stacked together.

As evident in FIG. 1H, a large quantity of data is generated during the convolutional layering process. In addition, each kernel map (i.e., each filtered image) has nearly as many values in it as the original image. In the examples presented in FIG. 1H, the original unknown input image is formed by 100 pixels (10×10), and the generated filter map has 64 values (8×8). The simple reduction in size of the kernel map is only realized because the applied 9-pixel kernel values (3×3) cannot fully process the outermost pixels at the edge of the image.

FIG. 1I shows a pooling feature that significantly reduces the quantity of data produced by the convolutional processes. A pooling process may be performed on one, some, or all of the filtered images. The kernel map in FIG. 1I is recognized as the top-most filter map of FIG. 1H, which is formed with the 12th kernel of the numeral "1" in FIG. 1B.

The pooling process introduces the concepts of "window size" and "stride." The window size is the dimensions of a window such that a single, maximum value within the window will be selected in the pooling process. A window may be formed having dimensions of m-pixels by n-pixels wherein "m" and "n" are integers, but in most cases, "m" and "n" are equal. In the pooling operation shown in FIG. 1I, each window is formed as a 2-pixel-by-2-pixel window. In the pooling operation, a 4-pixel window is conceptually overlayed onto a selected portion of the kernel map, and within the window, the highest value is selected.

In the pooling operation, in a manner similar to conceptually overlaying a kernel on an unknown image, the pooling window is conceptually overlayed onto each portion of the kernel map. The "stride" represents how much the pooling window is moved after each pooling act. If the stride is set to "two," then the pooling window is moved by two pixels after each pooling act. If the stride is set to "three," then the pooling window is moved by three pixels after each pooling act.

In the pooling operation of FIG. 1I, the pooling window size is set to 2×2, and the stride is also set to two. A first pooling operation is performed by selecting the four pixels in the top-most, left-most corner of the kernel map. Since each kernel value in the window has been calculated to be "−0.11," the value from the pooling calculation is also "−0.11." The value of "−0.11" is placed in the top-most, left-most corner of the pooled output map in FIG. 1I.

The pooling window is then moved rightward by the selected stride of two pixels, and the second pooling act is performed. Once again, since each kernel value in the second pooling window is calculated to be "−0.11," the value from the pooling calculation is also "−0.11." The value of "−0.11" is placed in the second entry of the top row of the pooled output map in FIG. 1I.

The pooling window is moved rightward by a stride of two pixels, and the four values in the window are evaluated. The four values in the third pooling act are "+0.11," "+0.11," "+0.11," and "+0.33." Here, in this group of four kernel values, "+0.33" is the highest value. Therefore, the value of "+0.33" is placed in the third entry of the top row of the pooled output map in FIG. 1I. The pooling operation doesn't care where in the window the highest value is found, the pooling operation simply selects the highest (i.e., the greatest) value that falls within the boundaries of the window.

The remaining 13 pooling operations are also performed in a like manner so as to fill the remainder of the pooled output map of FIG. 1I. Similar pooling operations may also be performed for some or all of the other generated kernel maps (i.e., filtered images). Further considering the pooled output of FIG. 1I, and further considering the selected kernel (i.e., the twelfth kernel of the numeral "1" in FIG. 1B) and the unknown image, it is recognized that the highest values are found in the upper right-hand corner of the pooled output. This is so because when the kernel feature is applied to the unknown image, the highest correlations between the pixels of the selected feature of interest (i.e., the kernel) and the similarly arranged pixels in the unknown image are also found in the upper right-hand corner. It is also recognized that the pooled output has values captured in it that loosely represent the values in the un-pooled, larger-sized kernel map. If a particular pattern in an unknown image is being searched for, then the approximate position of the pattern can be learned from the pooled output map. Even if the actual position of the feature isn't known with certainty, an observer can recognize that the feature was detected in the pooled output. The actual feature may be moved a little bit left or a little bit right in the unknown image, or the actual feature may be rotated or otherwise not identical to the kernel feature, but nevertheless, the occurrence of the feature and its general position may be recognized.

An optional normalization operation is also illustrated in FIG. 1I. The normalization operation is typically performed by a Rectified Linear Unit (ReLU). The ReLU identifies every negative number in the pooled output map and replaces the negative number with the value of zero (i.e., "0") in a normalized output map. The optional normalization process by one or more ReLU circuits helps to reduce the computational resource workload that may otherwise be required by calculations performed with negative numbers.

After processing in the ReLU layer, data in the normalized output map may be averaged in order to predict whether or not the feature of interest characterized by the kernel is found or is not found in the unknown image. In this way, each value in a normalized output map is used as a weighted "vote" that indicates whether or not the feature is present in the image. In some cases, several features (i.e., kernels) are convolved, and the predictions are further combined to characterize the image more broadly. For example, as illustrated in FIG. 1H, three kernels of interest derived from a known image of a numeral "1" are convolved with an unknown image. After processing each kernel through the various layers, a prediction is made as to whether or not the unknown image includes one or more pixel patterns that show a numeral "1."

Summarizing FIGS. 1A-1I, kernels are selected from a known image. Not every kernel of the known image needs to be used by the CNN. Instead, kernels that are determined to be "important" features may be selected. After the convolution process produces a kernel map (i.e., a feature image), the kernel map is passed through a pooling layer, and a normalization (i.e., ReLU) layer. All of the values in the output maps are averaged (i.e., sum and divide), and the output value from the averaging is used as a prediction of whether or not the unknown image contains the particular feature found in the known image. In the exemplary case, the output value is used to predict whether the unknown image contains a numeral "1." In some cases, the "list of votes" may also be used as input to subsequent stacked layers. This manner of processing reinforces strongly identified features and reduces the influence of weakly identified (or unidentified) features. Considering the entire CNN, a two-dimensional image is input to the CNN and produces a set of votes at its output. The set of votes at the output are used to predict whether the input image either does or does not contain the object of interest that is characterized by the features.

The CNN system 10 of FIG. 1A may be implemented as a series of operational layers. One or more convolutional layers may be followed by one or more pooling layers, and the one or more pooling layers may be optionally followed by one or more normalization layers. The convolutional layers create a plurality of kernel maps, which are otherwise called filtered images, from a single unknown image. The large quantity of data in the plurality of filtered images is reduced with one or more pooling layers, and the quantity of data is reduced further by one or more ReLU layers that normalize the data by removing all negative numbers.

FIG. 1J shows the CNN system 10 of FIG. 1A in more detail. In FIG. 1J(a), the CNN system 10 accepts a 10-pixel-by-10-pixel input image into a CNN. The CNN includes a convolutional layer, a pooling layer, a rectified linear unit (ReLU) layer, and a voting layer. One or more kernel values are convolved in cooperation with the unknown 10×10 image, and the output from the convolutional layer is passed to the pooling layer. One or more max pooling operations are performed on each kernel map provided by the convolutional layer. Pooled output maps from the pooling layer are used as input to a ReLU layer that produces normalized output maps, and the data contained in the normalized output maps is summed and divided to determine a prediction as to whether or not the input image includes a numeral "1" or a numeral "0."

In FIG. 1J(b), another CNN system 10a is illustrated. The CNN in the CNN system 10a includes a plurality of layers, which may include convolutional layers, pooling layers, normalization layers, and voting layers. The output from one layer is used as the input to a next layer. In each pass through a convolutional layer, the data is filtered. Accordingly, both image data and other types data may be convolved to search for (i.e., filter) any particular feature. When passing through pooling layers, the input data generally retains its predictive information, but the quantity of data is reduced. Since the CNN system 10a of FIG. 1J(b) includes many layers, the CNN is arranged to predict that the input image contains any one of many different features.

One other characteristic of a CNN is the use of back propagation to reduce errors and improve the quality of the neural network to recognize particular features in the midst of vast quantities of input data. For example, if the CNN arrives at a prediction that is less than 1.0, and the prediction is later determined to be accurate, then the difference between the predicted value and 1.0 is considered an error rate. Since the goal of the neural network is to accurately predict whether or not a particular feature is included in an input data set, the CNN can be further directed to automatically adjust weighting values that are applied in a voting layer.

Back propagation mechanisms are arranged to implement a feature of gradient descent. Gradient descent may be applied on a two-dimensional map wherein one axis of the map represents "error rate," and the other axis of the map represents "weight." In this way, such a gradient-descent map will preferably take on a parabolic shape such that if an error rate is high, then the weight of that derived value will be low. As error rate drops, then the weight of the derived value will increase. Accordingly, when a CNN that implements back propagation continues to operate, the accuracy of the CNN has the potential to continue improving itself automatically.

The performance of known object recognition techniques that use machine learning methods is improved by applying more powerful models to larger datasets, and implementing better techniques to prevent overfitting. Two known large datasets include LabelMe and ImageNet. LabelMe includes hundreds of thousands of fully segmented images, and more than 15 million high-resolution, labeled images in over 22,000 categories are included in ImageNet.

To learn about thousands of objects from millions of images, the model that is applied to the images requires a large learning capacity. One type of model that has sufficient learning capacity is a convolutional neural network (CNN) model. In order to compensate for an absence of specific information about the huge pool of data, the CNN model is arranged with at least some prior knowledge of the data set (e.g., statistical stationarity/non-stationarity, spatiality, temporality, locality of pixel dependencies, and the like). The CNN model is further arranged with a designer selectable set of features such as capacity, depth, breadth, number of layers, and the like.

Early CNN's were implemented with large, specialized super-computers. Conventional CNN's are implemented with customized, powerful graphic processing units (GPUs). As described by Krizhevsky, "current GPUs, paired with a highly optimized implementation of 2D convolution, are powerful enough to facilitate the training of interestingly large CNNs, and recent datasets such as ImageNet contain enough labeled examples to train such models without severe overfitting."

FIG. 2 includes FIGS. 2A-2B.

FIG. 2A is an illustration of the known AlexNet DCNN architecture. As described by Krizhevsky, FIG. 1 shows the "delineation of responsibilities between [the] two GPUs. One GPU runs the layer-parts at the top of the figure while the other runs the layer-parts at the bottom. The GPUs communicate only at certain layers. The network's input is 150,528-dimensional, and the number of neurons in the network's remaining layers is given by 253,440-186,624-64,896-64,896-43,264-4096-4096-1000."

Krizhevsky's two GPUs implement a highly optimized two-dimensional (2D) convolution framework. The final network contains eight learned layers with weights. The eight layers consist of five convolutional layers CL1-CL5, some of which are followed by max-pooling layers, and three fully connected layers FC with a final 1000-way softmax, which produces a distribution over 1000 class labels.

In FIG. 2A, kernels of convolutional layers CL2, CL4, CL5 are connected only to kernel maps of the previous layer that are processed on the same GPU. In contrast, kernels of convolutional layer CL3 are connected to all kernel maps in convolutional layer CL2. Neurons in the fully connected layers FC are connected to all neurons in the previous layer.

Response-normalization layers follow the convolutional layers CL1, CL2. Max-pooling layers follow both the response-normalization layers as well as convolutional layer CL5. The max-pooling layers summarize the outputs of neighboring groups of neurons in the same kernel map. Rectified Linear Unit (ReLU) non-linearity is applied to the output of every convolutional and fully connected layer.

The first convolutional layer CL1 in the AlexNet architecture of FIG. 1A filters a 224×224×3 input image with 96 kernels of size 11×11×3 with a stride of 4 pixels. This stride is the distance between the receptive field centers of neighboring neurons in a kernel map. The second convolutional layer CL2 takes as input the response-normalized and pooled output of the first convolutional layer CL1 and filters the output of the first convolutional layer with 256 kernels of size 5×5×48. The third, fourth, and fifth convolutional layers CL3, CL4, CL5 are connected to one another without any intervening pooling or normalization layers. The third convolutional layer CL3 has 384 kernels of size 3×3×256 connected to the normalized, pooled outputs of the second convolutional layer CL2. The fourth convolutional layer CL4 has 384 kernels of size 3×3×192, and the fifth convolutional layer CL5 has 256 kernels of size 3×3×192. The fully connected layers have 4096 neurons each.

The eight layer depth of the AlexNet architecture seems to be important because particular testing revealed that removing any convolutional layer resulted in unacceptably diminished performance. The network's size is limited by the amount of memory available on the implemented GPUs and by the amount of training time that is deemed tolerable. The AlexNet DCNN architecture of FIG. 1A takes between five and six days to train on two NVIDIA GEFORCE GTX 580 3 GB GPUs.

FIG. 2B is a block diagram of a known GPU such as the NVIDIA GEFORCE GTX 580 GPU. The GPU is a streaming multiprocessor containing 32 unified device architecture processors that employ a flexible scalar architecture. The GPU is arranged for texture processing, shadow map processing, and other graphics-centric processing. Each of the 32 processors in the GPU includes a fully pipelined integer arithmetic logic unit (ALU) and floating point unit (FPU). The FPU complies with the IEEE 754-2008 industry standard for floating-point arithmetic. The GPU in this case is particularly configured for desktop applications.

Processing in the GPU is scheduled in groups of 32 threads called warps. Each of the 32 threads executes the same instructions simultaneously. The GPU includes two warp schedulers and two instruction dispatch units. In this arrangement, two independent warps can be issued and executed at the same time.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

In an exemplary architecture, two or more (e.g., eight) digital signal processor (DSP) clusters are formed in a system on chip (SoC). Each DSP cluster may include two or more DSP's, one or more multi-way (e.g., 4-way) multi-byte (e.g., 16 kB) instruction caches, one or more multi-byte (e.g., 64 KB) local dedicated memory (e.g., random access memory (RAM)), one or more multi-byte shared memory (e.g., 64 kB shared ram), one or more direct memory access (DMA) controllers, and other features. A reconfigurable dataflow accelerator fabric may be included in the exemplary architecture to connect large data producing devices (e.g., high-speed cameras, audio capture devices, radar or other electromagnetic capture or generation devices, and the like) with complementary electronic devices such as sensor processing pipelines, croppers, color converters, feature detectors, video encoders, multi-channel (e.g., 8-channel) digital microphone interfaces, streaming DMAs, and one or more (e.g., eight) convolution accelerators.

The exemplary architecture may include, in the SoC, one or more (e.g., four) static random access memory (SRAM) banks or some other architecture memory with multi-byte (e.g., 1 Mbyte) memory, one or more dedicated bus ports, and coarse-grained, fine-grained, or coarse- and fine-grained power gating logic. The exemplary architecture is arranged to sustain, without the need to access external memory, acceptably high throughput for convolutional stages fitting DCNN topologies such as AlexNet without pruning or larger topologies, and in some cases, particularly larger topologies if fewer bits are used for activations and/or weights. Power is saved in the absence of a need for such external memory accesses.

When state-of-the-art DCNNs are implemented on conventional, non-mobile hardware platforms, it is known that such DCNNs produce excellent results. Such DCNNs, however, require deeper topologies with many layers, millions of parameters, and varying kernel sizes. These additional features require very high bandwidth, high power, and other computing resource costs that heretofore were unavailable in embedded devices. The devices and methods presented herein have achieved, however, sufficient bandwidth, sufficient power, and sufficient computing resources to provide acceptable results. Such results are in part due to an improved efficiency achieved with a hierarchical memory system and efficient reuse of local data. Accelerating DCNN convolutional layers account for up to 90% and more of total operations calls for the efficient balancing of the computational versus memory resources for both bandwidth and area to achieve acceptably high throughput without hitting any associated ceilings.

In the exemplary architecture a design time configurable accelerator framework (CAF) includes unidirectional links transporting data streams via a configurable, fully connected switch to, from, or to and from source devices and sink devices. The source and sink devices may include any one or more of DMA's, input/output (I/O) interfaces (e.g., multimedia, satellite, radar, etc.), and various types of accelerators including one or more convolution accelerators (CA).

The reconfigurable dataflow accelerator fabric allows the definition of any desirable, determined number of concurrent, virtual processing chains at run time. A full-featured back pressure mechanism handles data flow control, and stream multicasting enables the reuse of a data stream at multiple block instances. Linked lists may be formed to control a fully autonomous processing of an entire convolution layer. Multiple accelerators can be grouped or otherwise chained together to handle varying sizes of feature map data and multiple kernels in parallel.

A plurality of CA's may be grouped to achieve larger computational entities, which provides flexibility to neural network designers by enabling choices for desirable balancing of available data bandwidth, power, and available processing resources. Kernel sets may be partitioned in batches and processed sequentially, and intermediate results may be stored in on-chip memory. Various kernel sizes (e.g., up to 12×12), various batch sizes (e.g., up to 16), and parallel kernels (e.g., up to 4) can be handled by a single CA instance, and any size kernel can be accommodated with the accumulator input. The CA includes a line buffer to fetch a plurality (e.g., up to 12) of feature map data words in parallel with a single memory access. A register based kernel buffer provides a plurality (e.g., up to 36 read ports), while a plurality (e.g., 36) of multi-bit (e.g., 16-bit) fixed point multiply-accumulate (MAC) units perform a plurality (e.g., up to 36) of MAC operations per clock cycle. An adder tree accumulates MAC results for each kernel column. The overlapping, column-based calculation of the MAC operations allows an acceptably optimal reuse of feature maps data for multiple MACs, which reduces power consumption associated with redundant memory accesses. Configurable batch size and a variable number of parallel kernels provide a neural network designer with flexibility to trade-off the available input and output bandwidth sharing across different units and the available computing logic resources.

In some cases, the configuration of a CA is defined manually for each DCNN layer; in other cases, a CA configuration may be defined automatically using, for example, a holistic tool that starts from a DCNN description format such as Caffe' or TensorFlow. In some embodiments of the exemplary architecture, each CA may be configured to support on-the-fly kernel decompression and rounding when the kernel is quantized nonlinearly with 8 or fewer bits per weight with top-1 error rate increases up to 0.3% for 8 bits.

In some embodiments of the exemplary architecture, each 32-bit DSP is arranged to perform any one or more instructions of a set of specific instructions (e.g., Min, Max, Sqrt, Mac, Butterfly, Average, 2-4 SIMD ALU) to accelerate and support the convolutional operations of a DCNN. A dual load with 16b saturated MAC, advanced memory buffer addressing modes, and zero latency loop control executed in a single cycle while an independent two-dimensional (2D) DMA channel allows the overlap of data transfers. The DSP's perform pooling (e.g., max pooling, average pooling, etc.), nonlinear activation, cross-channel response normalization, and classification representing a selected fraction of the total DCNN computation in an architecture that is flexible and amenable to future algorithmic evolutions. DSP's in the exemplary architecture can operate in parallel with CA's and data transfers, while synchronizing operations and events using interrupts, mailboxes, or other such mechanisms for concurrent execution. DSP's may be activated incrementally when the throughput targets call for it, thereby leaving ample margins to support additional tasks associated with complex applications. Such additional tasks may include any one or more of object localization and classification, multisensory (e.g., audio, video, tactile, etc.) DCNN based data-fusion and recognition, scene classification, or any other such applications. In one embodiment built by the inventors, the exemplary architecture is formed in a test device fabricated with a 28 nm fully depleted silicon on insulator (FD-SOI) process thereby proving the architecture effective for advanced real world power constrained embedded applications such as intelligent Internet of Things (IoT) devices, sensors, and other mobile or mobile-like devices.

In a first embodiment, a system on chip (SoC) that implements a deep convolutional neural network architecture, the SoC includes a system bus, a plurality of addressable memory arrays coupled to the system bus, at least one applications processor core coupled to the system bus, and a configurable accelerator framework coupled to the system bus. The configurable accelerator framework is an image and deep convolutional neural network (DCNN) co-processing system. The SoC also includes a plurality of digital signal processors (DSPs) coupled to the system bus, wherein the plurality of DSPs coordinate functionality with the configurable accelerator framework to execute at least one DCNN.

In at least some cases of the first embodiment, the plurality of digital signal processors include a plurality of DSP clusters coupled to the system bus, and each DSP cluster of the plurality of DSP clusters includes at least two separate DSPs. The SoC may include a global DSP cluster crossbar switch coupled to each of the plurality of DSP clusters and to the system bus. The SoC may also include a DSP cluster crossbar switch, a first local DSP crossbar switch and a second local DSP crossbar switch, each coupled to the DSP cluster crossbar switch, a first DSP, a first instruction cache, and a first DSP memory, each coupled to the first local DSP crossbar switch, and a second DSP, a second instruction cache, and a second DSP memory, each coupled to the second local DSP crossbar switch.

In at least some cases of the first embodiment having the plurality of DSP clusters coupled to the system bus, each DSP cluster includes a DSP cluster crossbar switch, a first local DSP crossbar switch and a second local DSP crossbar switch arranged such that each is coupled to the DSP cluster crossbar switch. Each DSP cluster also includes a first DSP coupled to the first local DSP crossbar switch, a second DSP coupled to the second local DSP crossbar switch, a shared DSP cluster memory coupled to the DSP cluster crossbar switch, and a direct memory access coupled between the shared DSP cluster memory and the system bus.

In at least some cases of the first embodiment, the configurable accelerator framework includes a reconfigurable stream switch coupled to the system bus and a plurality of convolution accelerators coupled to the stream switch.

In at least some cases of the first embodiment wherein the configurable accelerator framework includes a reconfigurable stream switch coupled to the system bus and a plurality of convolution accelerators coupled to the stream switch, the stream switch is configurable at run-time and reconfigurable during the execution of the at least one DCNN, and in others of these cases, each of the plurality of convolution accelerators is configurable at run-time and reconfigurable during the execution of the at least one DCNN.

In at least some cases of the first embodiment wherein the configurable accelerator framework includes a reconfigurable stream switch coupled to the system bus and a plurality of convolution accelerators coupled to the stream switch, the plurality of DSPs perform non-convolution functions of the at least one DCNN and coordinate with the stream switch and the plurality of convolution accelerator to execute the at least one DCNN.

In a second embodiment, a mobile computing device includes an imaging sensor that captures images, and a system on chip (SoC) that implements a deep convolutional neural network architecture. The SoC includes an SoC bus, an on-chip memory coupled to the SoC bus, and a configurable accelerator framework coupled to the SoC bus. The configurable accelerator framework includes a reconfigurable dataflow accelerator fabric that receives the captured images from the imaging sensor for deep convolutional neural network (DCNN) processing by at least one convolution accelerator. The mobile computing device also includes a plurality of digital signal processor (DSPs) clusters coupled to the SoC bus. The plurality of DSP clusters is arranged to coordinate functionality with the configurable accelerator framework to execute the DCNN.

In at least some cases of the second embodiment, each DSP cluster of the plurality of DSP clusters includes at least two separate DSPs arranged for communication with each other and for communication with the SoC bus via a DSP cluster crossbar switch. And in at least some cases, the mobile computing device also includes a global DSP cluster crossbar switch coupled to each of the plurality of DSP clusters and to the system bus.

In at least some cases of the second embodiment, the mobile computing device also includes a global DSP cluster crossbar switch coupled to each of the plurality of DSP clusters and to the system bus. In at least some other cases, the mobile computing device includes a DSP cluster crossbar switch, a first local DSP crossbar switch and a second local DSP crossbar switch, each coupled to the DSP cluster crossbar switch, a first DSP, a first instruction cache, and a first DSP memory, each coupled to the first local DSP crossbar switch, and a second DSP, a second instruction cache, and a second DSP memory, each coupled to the second local DSP crossbar switch.

In at least some cases of the second embodiment, each DSP cluster includes a DSP cluster crossbar switch, a first local DSP crossbar switch and a second local DSP crossbar switch, each coupled to the DSP cluster crossbar switch, a first DSP coupled to the first local DSP crossbar switch, a second DSP coupled to the second local DSP crossbar switch, a shared DSP cluster memory coupled to the DSP cluster crossbar switch, and a direct memory access coupled between the shared DSP cluster memory and the system bus.

In at least some cases of the second embodiment, the reconfigurable dataflow accelerator fabric is configurable at run-time and reconfigurable during the execution of the DCNN. In at least some cases, the at least one convolution accelerator is configurable at run-time and reconfigurable during the execution of the DCNN. And in at least some cases, at least some DSP clusters of the plurality of DSP clusters are arranged to perform non-convolution functions of the DCNN and arranged to coordinate with the reconfigurable dataflow accelerator fabric and the at least one convolution accelerator to execute the DCNN.

In a third embodiment system on a chip (SoC) includes a communication bus, a memory coupled to the communication bus, and a configurable accelerator framework coupled to the communication bus. The configurable accelerator framework has a reconfigurable stream switch coupled to the communication bus and a plurality of convolution accelerators coupled to the stream switch. The plurality of convolution accelerators is arranged to perform convolution operations on image data during execution of a deep convolutional neural network (DCNN). The SoC also includes a plurality of digital signal processors (DSPs) coupled to the communication bus. The plurality of DSPs is arranged to coordinate non-convolution operations with the configurable accelerator framework to execute the DCNN.

In at least some cases of the third embodiment, the plurality of DSPs are in clusters, each cluster having at least two separate DSPs, and each cluster including a cluster communication bus coupled to the communication bus. In at least some of these cases, the SoC also includes a global DSP communication bus coupled to the communication bus and coupled to the cluster communication bus of each cluster. Here, each cluster further includes a first local DSP communication bus and a second local DSP communication bus, each of the first and second local DSP communication buses coupled to the cluster communication bus. Each cluster also includes a first DSP coupled to the first local DSP communication bus, a second DSP coupled to the second local DSP communication bus, a shared cluster memory coupled to the cluster communication bus, and a direct memory access coupled between the shared cluster memory and the communication bus.

The tools and methods discussed in the present disclosure set forth one or more aspects of a design time parametric, run-time reconfigurable hardware accelerator interconnect framework that supports data-flow based processing chains.

The innovation described in the present disclosure is new and useful, and the innovation is not well-known, routine, or conventional in the silicon fabrication industry. Some portions of the innovation described herein may use known building blocks combined in new and useful ways along with other structures and limitations to create something more than has heretofore been conventionally known. The embodiments improve on known computing systems which, when un-programmed or differently programmed, cannot perform or provide the specific reconfigurable framework features claimed herein.

The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately.

There is no prevailing, accepted definition for what constitutes an abstract idea. To the extent the concepts discussed in the present disclosure may be considered abstract, the claims present tangible, practical, and concrete applications of said allegedly abstract concepts.

The embodiments described herein use computerized technology to improve the technology of silicon fabrication and reconfigurable interconnects, but other techniques and tools remain available to fabricate silicon and provide reconfigurable interconnects. Therefore, the claimed subject matter does not foreclose the whole, or any substantial portion of, silicon fabrication or reconfigurable interconnect technological area.

These features, along with other objects and advantages which will become subsequently apparent, reside in the details of construction and operation as more fully described hereafter and claimed, reference being had to the accompanying drawings forming a part hereof.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 1 includes FIGS. 1A-1J;

FIG. 1E illustrates six portions of the right-side, known image of FIG. 1D;

FIG. 1I shows a pooling feature that significantly reduces the quantity of data produced by the convolutional processes;

FIG. 2 includes FIGS. 2A-2B;

FIG. 6 includes FIGS. 6A-6D;

DETAILED DESCRIPTION

It has been recognized by the inventors that known deep conventional neural network (DCNN) systems are large and require significant amounts of power to implement. For these reasons, conventional DCNN systems are not found in mobile devices, and in cases where DCNN mobile systems are attempted, the systems have many shortcomings.

In order to deploy these technologies in everyday life, making them pervasive in mobile and wearable devices, the inventors have further recognized that hardware acceleration plays an important role. When so implemented as described herein, hardware acceleration provides a mobile DCNN with the ability to work in real time with reduced power consumption and with embedded memory, thereby overcoming limitations of conventional fully programmable solutions.

The high-performance, energy efficient hardware accelerated DCNN processor described herein includes an energy efficient set of DCNN hardware convolution accelerators that support kernel decompression, fast data throughput, and efficient mathematical operation. The processor also includes an on-chip reconfigurable data transfer fabric that improves data reuse and reduces on-chip and off-chip memory traffic, and a power efficient array of DSPs that support complete, real-world computer vision applications.

FIGS. 3-6 and the accompanying detailed description thereof illustrate and present elements of an exemplary system on chip (SoC) 110 configurable as a high-performance, energy efficient hardware accelerated DCNN processor. The SoC 110 is particularly useful for neural network applications. One significant challenge of neural networks is their computational complexity. This challenge is substantially overcome in the exemplary SoC 110 by integrating an architecturally efficient stream switch 500 (FIG. 5) and a set of convolution accelerators 600 (FIG. 6), which perform a convolution of input feature data with kernel data derived from the training of the neural network.

Figure 2A:
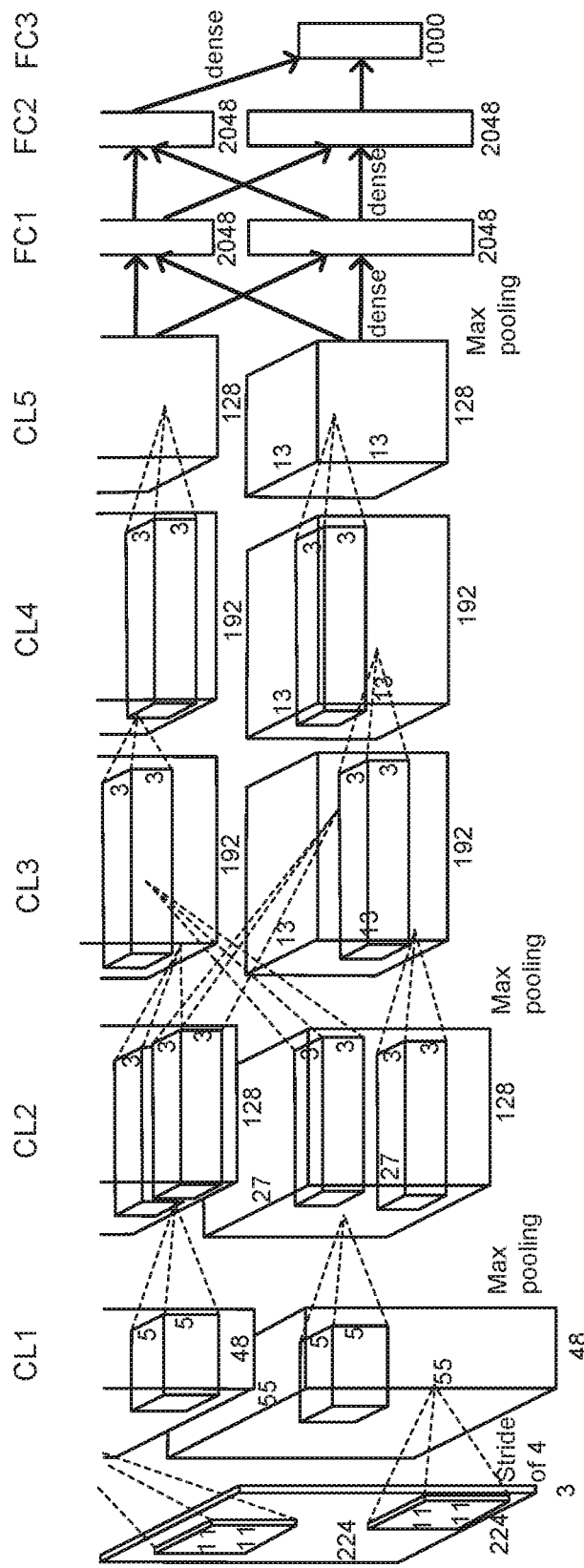
FIG. 2A is an illustration of the known AlexNet DCNN architecture.
Figure 2B:
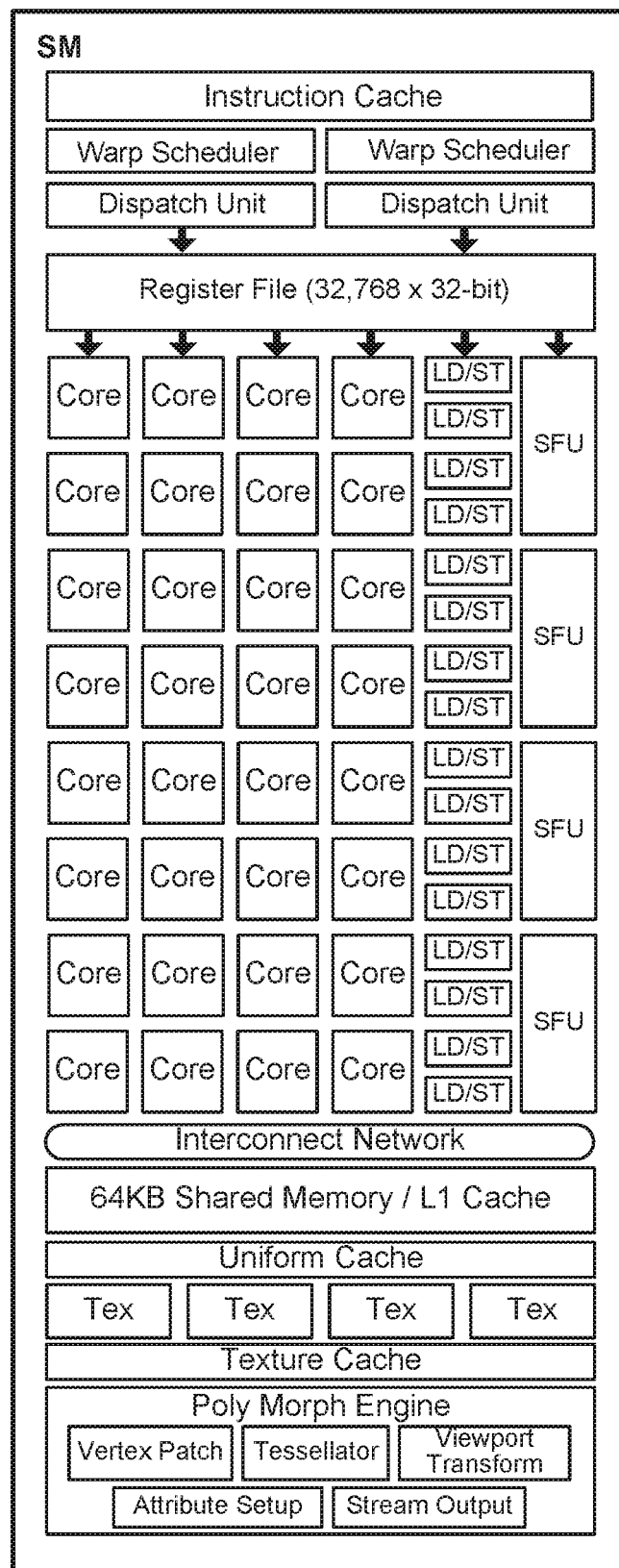
FIG. 2B is a block diagram of a known GPU.

Convolutional neural networks often consist of multiple layers. The known AlexNet (FIG. 2A) has five convolutional layers and three fully connected layers. Operations of the exemplary SoC 110 of FIGS. 3-6, and particular operations and exemplary parameters, configurations, and limitations of the convolution accelerators 600 of FIG. 6, are now discussed with respect to a non-limiting model implementation of a neural network along the lines of AlexNet.

Each convolutional layer of an AlexNet neural network includes a set of inter-related convolution calculations followed by other, less complex computations (e.g., max pooling calculations, non-linear activation calculations, and the like). The convolution processing stages perform large quantities of multiply-accumulate (MAC) operations applied to large data sets. In this context the convolution accelerators 600 are expressly configured to increase the speed and efficiency of the convolution calculations while also reducing the power consumed.

The convolution accelerators 600 may be arranged as described herein to implement low power (e.g., battery powered) neural networks in an embedded device. The convolution accelerators 600 can perform the substantial number of operations required to process a convolutional neural network in a time frame useable for real-time applications. For example, a single processing run of the known neural network AlexNet used for object recognition in image frames requires more than 700 million multiply-accumulate (MMAC) operations for a frame having a size of 227×227 pixels. A reasonable video data stream from a camera sensor provides 15 to 30 frames per second at a resolution of multiple mega-pixels per frame. Although the required processing performance is beyond the limits of conventional embedded central processing units (CPUs), such operations have been demonstrated by the inventors in an exemplary embodiment of SoC 110 at a power dissipation level sustainable by an embedded device.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, have not been shown or described in detail to avoid unnecessarily obscuring descriptions of the embodiments.

The present invention may be understood more readily by reference to the following detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

Prior to setting forth the embodiments however, it may be helpful to an understanding thereof to first set forth definitions of certain terms that are used hereinafter.

A semiconductor practitioner is generally one of ordinary skill in the semiconductor design and fabrication art. The semiconductor practitioner may be a degreed engineer or another technical person or system having such skill as to direct and balance particular features of a semiconductor fabrication project such as geometry, layout, power use, included intellectual property (IP) modules, and the like. The semiconductor practitioner may or may not understand each detail of the fabrication process carried out to form a die, an integrated circuit, or other such device.

Figure 3:
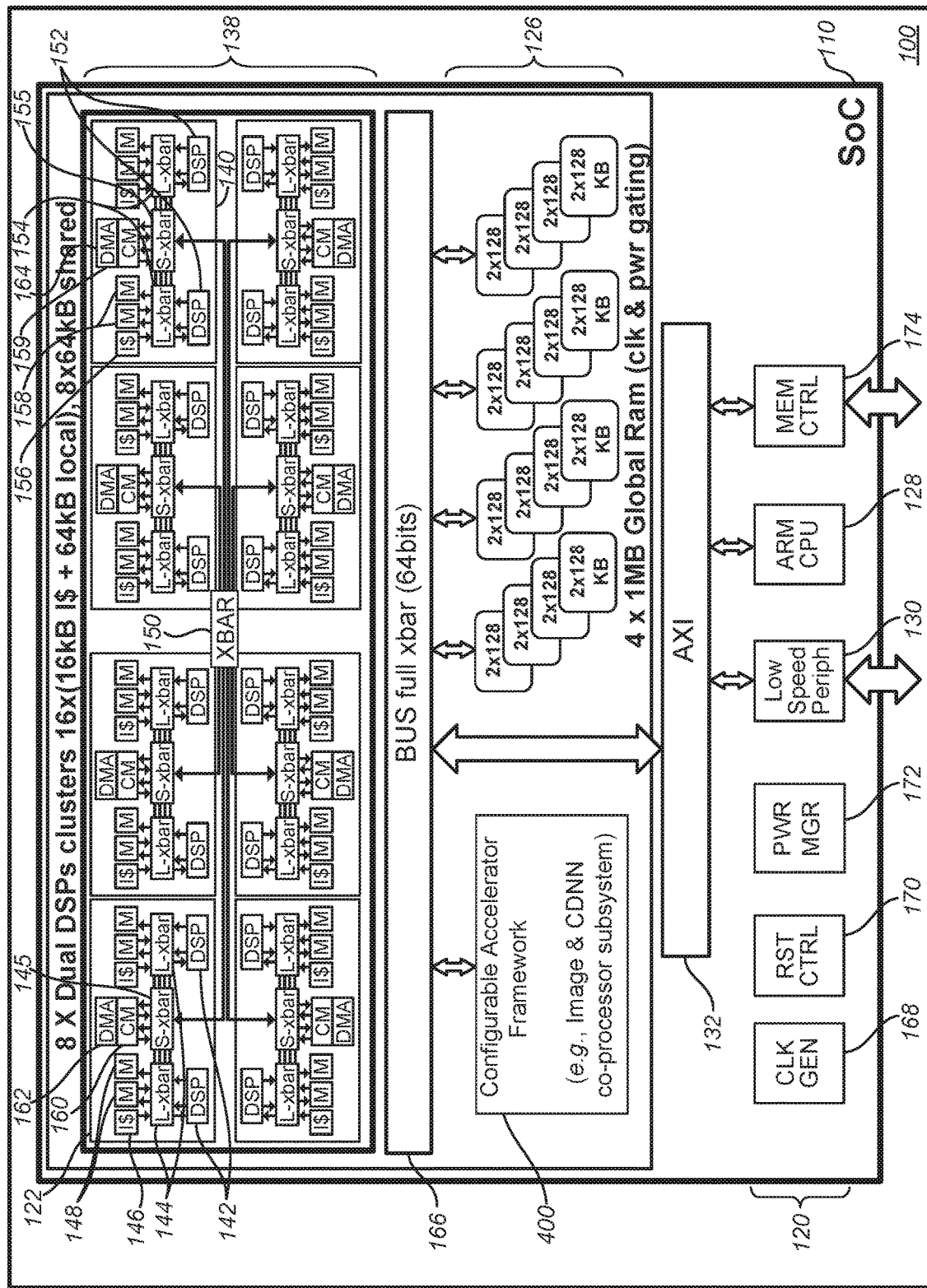
FIG. 3 is an exemplary mobile device having integrated therein a DCNN processor embodiment illustrated as a block diagram.

FIG. 3 is an exemplary mobile device 100 having integrated therein a DCNN processor embodiment illustrated as a block diagram. The mobile DCNN processor is arranged as a system on chip (SoC) 110, however other arrangements are also contemplated. The exemplary mobile device 100 of FIG. 3 may be configured in any type of mobile computing device such as a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hover-board, other personal or commercial transportation device), industrial device, or the like. Accordingly, the mobile device 100 includes other components and circuitry that is not illustrated, such as, for example, a display, a network interface, memory, one or more central processors, camera interfaces, audio interfaces, and other input/output interfaces. In some cases, the exemplary mobile device 100 of FIG. 3 may also be configured in a different type of low-power device such as a mounted video camera, an Internet-of-Things (IoT) device, a multimedia device, a motion detection device, an intruder detection device, a security device, a crowd monitoring device, or some other device.

In reference to FIGS. 3-6, which schematically show part of an exemplary mobile device 100 and system on chip (SoC) 110, at least part of the SoC 110, and additionally more or fewer circuits of the SoC 110 and mobile device 100, may be provided in an integrated circuit. In some embodiments, all of the elements shown in FIGS. 3-6 may be provided in an integrated circuit. In alternative embodiments, one or more of the arrangements shown in FIGS. 3-6 may be provided by two or more integrated circuits. Some embodiments may be implemented by one or more dies. The one or more dies may be packaged in the same or different packages. Some of the components shown in FIGS. 3-6 may be provided outside of an integrated circuit or die.

The SoC 110 device of FIGS. 3-6 may be fixed at design time in terms of one or more of topology, maximum available bandwidth, maximum available operations per unit time, maximum parallel execution units, and other such parameters. Some embodiments of the SoC 110 may provide re-programmable functionality (e.g., reconfiguration of SoC modules and features to implement a DCNN) at run-time. Some or all of the re-programmable functionality may be configured during one or more initialization stages. Some or all of the re-programmable functionality may be configured on the fly with no latency, maskable latency, or an acceptable level of latency.

An implementation of an exemplary mobile device 100 having an exemplary mobile DCNN processor arranged as a system on chip (SoC) 110 is considered. The illustrated SoC 110 includes a plurality of SoC controllers 120, a configurable accelerator framework (CAF) 400 (e.g., an image and DCNN co-processor subsystem), an SoC global memory 126, an applications (e.g., a host) processor 128, and a plurality of DSPs 138, each of which are communicatively coupled, directly or indirectly, to a primary (e.g., system) communication bus 132 and a secondary communications (e.g., DSP) bus 166.

In some embodiments, and as illustrated, the plurality of DSPs 138 are arranged in a plurality of DSP clusters, such as a first DSP cluster 122, a second DSP cluster 140, and several other DSP clusters that are not referenced for simplification of the illustration. The individual DSP clusters in the plurality of DSPs 138 are described in more below.

The configurable accelerator framework (CAF) 400 is communicatively coupled to the system bus 166, which provides a mechanism for the convolution accelerators of the CAF 400 to access the SoC global memory 126 as needed and to communicate with the DSPs 138 as needed. The CAF 400 is described in more detail below.

The SoC 110 includes various SoC controllers 120, some of which control the SoC 110, and others of which control one or more peripheral devices. SoC controllers 120 include an applications (e.g., a host) processor 128 (e.g., an ARM processor or some other host processor), a clock generator 168 (e.g., a clock manager), a reset controller 170, and a power manager 172 to provide additional support, control, and management of various timing, power consumption, and other aspects of the SoC 110 and other components. Other SoC controllers 120 that control peripherals include a low speed peripheral I/O interface 130 and an external memory controller 174 to communicate with or otherwise access external chips, components, or memory of the exemplary device 100 in which the SoC 110 is embedded.

The applications processor 128 may act as an intermediate module or as an interface to other programs or components of the exemplary electronic device 100 with which the SoC 110 is integrated. In some embodiments, the applications processor 128 may be referred to as an applications processor core. In various embodiments, the applications processor 128 loads an SoC configuration file at boot time and configures DSPs 138 and the CAF 400 according to the configuration file. As the SoC 110 processes one or more batches of input data (e.g., an image), the applications processor 128 may coordinate the reconfiguration of the CAF 400 or DSPs 138 based on the configuration file, which itself may be based on the DCNN layers and topology. The SoC 110 also includes a primary communications bus 132 (e.g., an AXI-Advanced eXtensible Interface) that facilitates communications between the SoC controllers 120 and the DSPs 138 and between the SoC controllers 120 and the CAF 400. For example, the DSPs 138 or the CAF 400 can communicate, via the primary communications bus 132 with the applications processor 128, one or more peripheral controllers/peripheral communications interface (low speed peripheral I/O) 130, an external memory (not shown) via an external memory controller 174, or other components. The SoC controllers 120 may also include other supporting and cooperative devices such as a clock manager (e.g., a clock generator) 168, a reset controller 170, a power manager 172 to provide additional timing and power management to the SoC 110, and other components.

As mentioned above, the plurality of DSPs 138 may be arranged in a plurality of DSP clusters, such as DSP clusters 122, 140. Again, the SoC 110 may include other DSP clusters, but they are not referenced here for simplification of the illustration.

Each DSP cluster 122, 140 includes a plurality (e.g., two) of DSPs 142, 152, a plurality (e.g., two) of local DSP crossbar switches 144, 154, and a DSP cluster crossbar switch 145, 155. Each DSP 142, 152 in a particular cluster communicates with each other via the DSP cluster crossbar switch 145, 155. Each DSP 142, 152 has access to a corresponding instruction cache 146, 156, and local DSP memory 148, 158 via its corresponding local DSP crossbar switch 144, 154. In one non-limiting embodiment, each instruction cache 146, 156 is a 4-way 16 kB instruction cache and each local DSP memory 148, 158 is 64 kB of local RAM storage for its corresponding DSP. Each DSP cluster 122, 140 also includes a shared DSP cluster memory 160, 159 and a cluster DMA 162, 164 for accessing the SoC global memory 160, 159.

Each DSP cluster 122, 140 is communicatively coupled to a global DSP cluster crossbar switch 150 via the DSP cluster crossbar switch 145, 155 to enable each DSP 142, 152 in each DSP cluster 122, 140 to communicate with one another and other components on the SoC 110. The global DSP cluster crossbar switch 150 enables each DSP to communicate with other DSPs in the plurality of DSP clusters 138.

Additionally, the global DSP cluster crossbar switch 150 is communicatively coupled to a system bus 166 (e.g., secondary communications bus, xbar-SoC crossbar switch, or the like), which enables each DSP to communicate with other components of the SoC 110. For example, each DSP 142, 152 can communicate with one or more components (e.g., one or more convolution accelerators) of the CAF 400 or access an SoC global memory 126 via the system bus 166. In some embodiments, each DSP 142, 152 can communicate with the SoC memory 126 via the DMA 162, 164 of its corresponding DSP cluster 122, 140. Moreover, DSP 142, 152 may communicate with the controllers 120 or other modules of the SoC 110 as needed via the system bus 166. Each DSP accesses the system bus 166 via its local DSP crossbar switch 144, 154, its DSP cluster crossbar switch 145, 155, and the global DSP cluster crossbar switch 150.

The plurality of DSPs 138 can be assigned or allocated to perform specific instructions to accelerate other operations of the DCNN. These other operations may include non-convolutional operations performed during a DCNN process, which are in some cases primarily performed by the CAF 400. Examples of these non-convolutional operations include, but are not limited to, max or average pooling, nonlinear activation, cross-channel response normalization, classification representing a small fraction of the total DCNN computation but more amenable to future algorithmic evolutions, or other operations, e.g., Min, Max, Sqrt, Mac, Butterfly, Average, 2-4 SIMD ALU.

DSPs 138 can operate concurrently (e.g., in parallel) with the operations of CAs in the CAF 400 and concurrently (e.g., in parallel) with data transfers, which may be synchronized by way of interrupts, mailboxes, or some other synchronization mechanism for concurrent execution. DSPs 138 may be activated incrementally when the throughput targets require it, leaving ample margins to support additional tasks associated with complex applications, such as object localization and classification, multisensory (e.g., audio, video, tactile, etc.) DCNN-based data-fusion and recognition, scene classification, and other such tasks. DSPs 138 may in some cases include a dual load with multi-bit (e.g., 16b) saturated MAC, advanced memory buffer addressing modes, and zero latency loop control features. DSPs 138 may execute in a single cycle while an independent 2D DMA channel allows the overlap of data transfers.

In various embodiments, the SoC memory 126 includes a plurality of memory components for storing data that is accessible to the components of the CAF 400 or the DSPs 138. In at least one embodiment, the SoC memory 126 is configured in a hierarchical-type memory structure. In one non-limiting example, the SoC memory 126 includes four SRAM banks each with 1 MByte, dedicated bus port, and fine-grained power gating. This memory helps to increase and sustain an acceptably maximum throughput for convolutional stages that fit particular DCNN topologies such as AlexNet without pruning. In addition, or in the alternative, SoC memory 126 may also sustain larger topologies if fewer bits are used for activations and/or weights without the need to access external memory to save power.

In at least one exemplary case, SoC 110 is arranged such that access to SoC memory 126 by processing logic in the CAF 400 will consume on average 50 picojoules per word (50 pJ/word) of power, which is substantially less than access to memory that is off-board of the SoC 110. For example, access to off-chip memory will consume on average 640 pJ/word. Conversely, in at least some embodiments of the present disclosure, processing logic in the CAF 400 will only access local SRAM onboard the CAF 400, and in these cases, access to memory will, on average, consume 5 pJ/word or less. Accordingly, the design of CAF 400 permits very acceptably low power consumption, which is desirable for embedded devices.

In at least one embodiment, the configurable accelerator framework (CAF) 400 may be organized as an image and DCNN co-processor subsystem of the SoC 110. As described herein, the CAF 400 includes a reconfigurable dataflow accelerator fabric connecting high-speed camera interfaces with any one or more of sensor processing pipelines, croppers, color converters, feature detectors, video encoders, eight channel digital microphone interface, streaming DMAs and a plurality of convolution accelerators. Additional details regarding the CAF 400 are described in conjunction with FIG. 4. Briefly, the CAF 400 receives incoming image data, such as from the camera interface, or other sensors, and distributes the incoming data to the various components of the CAF 400 (e.g., convolution accelerators, which are described in more detail in conjunction with FIG. 6) and/or one or more of the plurality of DSPs 138 to employ the DCNN and recognize objects in the incoming images.

Various DCNNs utilize deeper topologies with many layers, millions of parameters, and varying kernel sizes, which results in escalating bandwidth, power, and area costs challenges. These various DCNNs may also be implemented with the SoC 110 described herein. An acceptable efficiency can be achieved with a hierarchical memory system and efficient reuse of local data. Accelerating DCNN convolutional layers may, in some cases, utilize up to and even more than 90% of total operations calls. The CAF 400 implemented in the SoC 110 permits an efficient balancing of computational resources versus memory resources (e.g., bandwidth and physical area/layout) such that an acceptable maximum throughput can be achieved without hitting any associated ceilings.

The CAF 400 utilizes unidirectional links to transport data streams via a configurable, fully connected switch to or from different kinds of source or sink components. For example, the configurable fully connected switch, which is described in more detail in conjunction with FIG. 5, can transport data via direct memory accesses (DMAs) to the SoC global memory 126, I/O interfaces (e.g., cameras), and various types of accelerators (e.g., convolution accelerator (CA)). In some cases, the CAF 400 is configured at boot time based on information received from a particular SoC configuration tool, and the CAF 400 is re-configured during run time based on defined DCNN layers and topology or information received from one or more DSPs 138, applications processor 128, or the like.

The CAF 400 allows for the definition of a selectable number of concurrent, virtual processing chains at run time. The CAF 400 also includes a full featured back pressure mechanism to control data flow to the various components of the framework. The CAF 400 is arranged for stream multicasting operations, which enable the reuse of a data stream at multiple block instances. Linked lists control the fully autonomous processing of an entire convolution layer. Multiple accelerators grouped or chained together handle varying sizes for feature maps data and multiple kernels in parallel. Grouping the convolutional accelerators (CAs) 600 to achieve larger computational entities enables choosing an acceptably optimal balancing of the available data bandwidth, budget power, and available processing resources. Each CA 600 includes a line buffer to fetch up to a predetermined number (e.g., 12) of feature map data words in parallel with a single memory access.

In each CA (600), a register-based kernel buffer provides multiple read ports (e.g., 36), while multiple fixed-point multiply-accumulate (MAC) units (e.g., 36 16-bit MAC units) perform multiple MAC operations per clock cycle (e.g., up to 36 operations per clock cycle). An adder tree accumulates MAC results for each kernel column. The overlapping, column based calculation of the MAC operations allows an acceptably optimal reuse of the feature maps data for multiple MACs, thus reducing power consumption associated with redundant memory accesses.

Kernel sets are partitioned in batches processed sequentially and intermediate results can be stored in the SoC global memory 126. Various kernel sizes (e.g., up to 12×12), various batch sizes (e.g., up to 16), and parallel kernels (e.g., up to 4) can be handled by a single CA 600 instance but any size kernel can be accommodated with the accumulator input.

The configurable batch size and a variable number of parallel kernels enable acceptably optimal trade-offs for the available input and output bandwidth sharing across different units and the available computing logic resources.

A different acceptably optimal configuration of CAs 600 in the CAF 400 is determined for each DCNN layer. These configurations may be determined or adjusted using a holistic tool that starts with a DCNN description format, such as Caffe' or TensorFlow. The CA 600 supports on-the-fly kernel decompression and rounding when the kernel is quantized nonlinearly with 8 or fewer bits per weight with top-1 error rate increases up to 0.3% for 8 bits.

Figure 4:
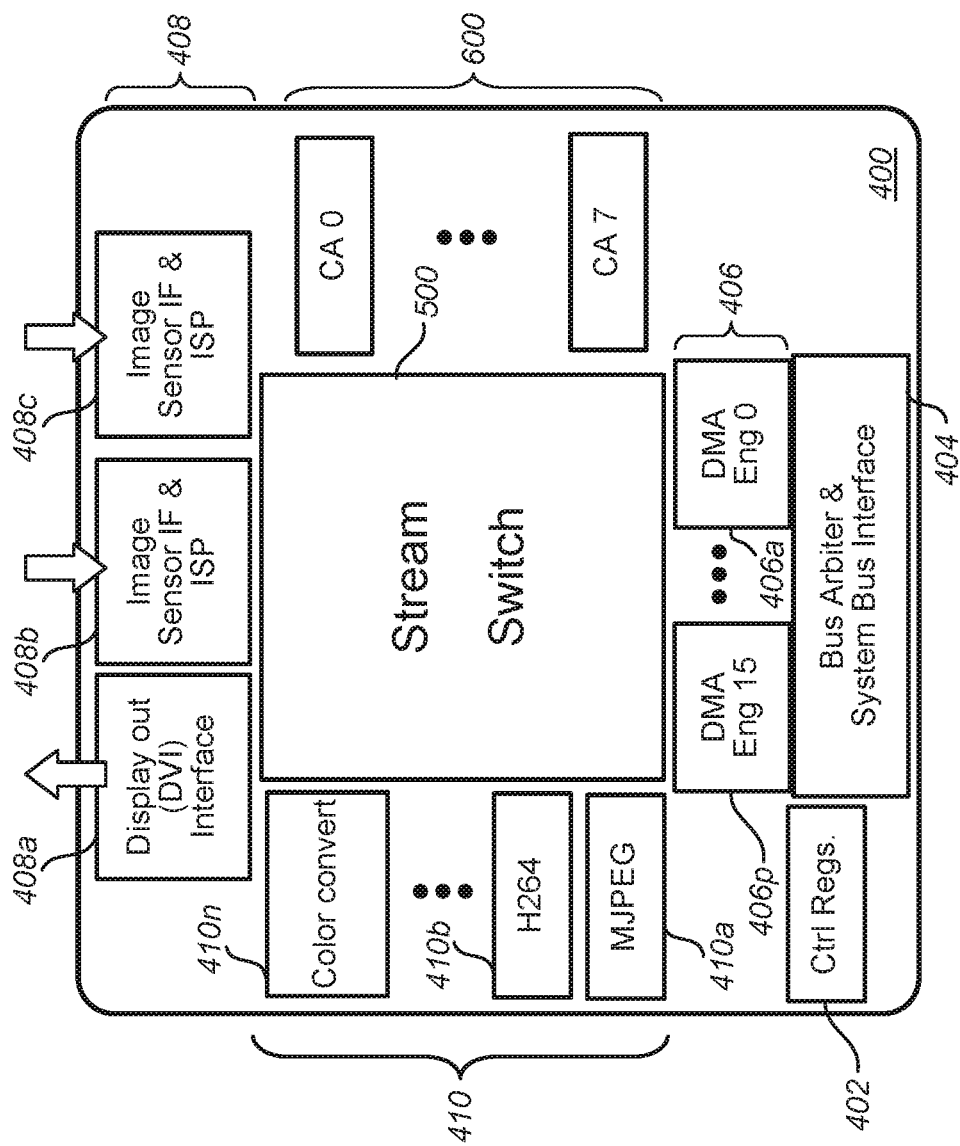
FIG. 4 is an embodiment of configurable accelerator framework (CAF)

FIG. 4 is an embodiment of configurable accelerator framework (CAF) 400, such as the image and deep convolutional neural network (DCNN) co-processor subsystem 400 of FIG. 3. The CAF 400 may be configured for image processing, audio processing, prediction analysis (e.g., games of skill, marketing data, crowd behavior prediction, weather analysis and prediction, genetic mapping, disease diagnosis, and other scientific, commercial, and such processing) or some other type of processing; particularly processing that includes convolutional operations. The CAF 400 includes a stream switch 500 that provides a design time parametric, run-time reconfigurable accelerator interconnect framework to support data-flow based processing chains.

When integrating known hardware data path accelerators, the inventors have recognized that system designers must often choose between tightly coupled or loosely coupled architectures. Based on this choice, particular programmable elements (e.g., processors, DSPs, programmable logic controllers (PLC's), and other programmable devices) deployed in such a device (e.g., a system on chip) would be required to adopt a suitable, but limiting programming model. Often, the functionality and specific processing tasks associated with some of these hardware blocks can be supported by way of a semi-static data-flow graph that traditionally has been implemented with hardwired data paths. This is undesirable and limiting, however, because the hardwired data paths provide little if any flexibility at run-time, and instead, hardwired data paths are generally restricted to the path foreseen during system design.

To overcome these limitations, a reconfigurable data transfer fabric of the stream switch 500, as described in the present disclosure, improves logic block (IP) reuse, data reuse, and the reuse of other components and logic, which allows a reduction of on-chip and off-chip memory traffic, and which provides a much greater flexibility to leverage the same logic blocks in different application use cases. Integrated in the stream switch 500 is a plurality of unidirectional links arranged to transport data streams via a configurable fully connected switch to, from, and to and from different kinds of data sources, data sinks, and data sources and data sinks such as direct memory access (DMA) controllers, I/O interfaces (e.g., cameras), and various types of accelerators.

The CAF 400 may be arranged with a number of configurable modules. Some modules are optional, and some modules are required. Many optional modules are commonly included in embodiments of a CAF 400. One required module of a CAF 400 is, for example, the stream switch 500. Another required module is, for example, a set of CAF control registers 402. Other modules may be required as well. Optional modules of the CAF 400 include a system bus interface module 404, a selected number of DMA controllers 406, a selected number of external device interfaces 408, a selected number of processing modules 410, and a selected number of convolution accelerators (CAs) 600.

The stream switch 500 is a unidirectional interconnection structure formed with a plurality of unidirectional "stream links." The stream links are arranged to transport multibit data streams from accelerators, interfaces, and other logic modules to the stream switch 500 and from the stream switch 500 to accelerators, interfaces, and other logic modules. The transported data may take any desired format such as a stream of raster scan image frames, a stream of macroblock oriented images, audio streams, raw data blocks, or any other format. The stream switch 500 can also transport messages, commands, or other like control information along a processing chain forwarded by each unit to one or more or more targeted units where the control information is processed. The control information may be used to signal events, to reconfigure the processing chain itself, or to direct other operations.

In some embodiments, the CAF 400 uses a single clock domain. In some embodiments, the CAF 400 employs a plurality of clock domains. For example, certain blocks in the CAF 400 may operate according to a slower clock derived from a main clock of the CAF 400. In cases where particular modules of a CAF 400 operate with different clock properties (e.g., frequency, phase, etc.) each stream link that crosses a clock boundary may be equipped with one or more dedicated or shared resynchronization circuits. Such resynchronization circuits may be formed with asynchronous first-in-first-out (FIFO) registers, sampling registers, and other components.

In addition to transporting data, or in the alternative to transporting data, each stream link may also be used to pass control information. The control information may include start tags, end tags, and other control information such as line type information used for raster scan based image data.

Continuing in the description of FIG. 4, in addition to the stream switch 500, the CAF 400 may also include a system bus interface module 404. The system bus interface module 404 provides an interface to other modules of SoC 110. As shown in the exemplary embodiment of FIG. 3, the CAF 400 is coupled to the secondary communication bus 166. In other cases, the CAF 400 may be coupled to the primary communication bus 132 or some other communication mechanism. Control information may be passed unidirectionally or bidirectionally through the system bus interface module 404 of the CAF 400. Such interface is used to provide a host processor (e.g., DSP of DSP cluster 130, applications processor 128, or another processor) access to all of the CAF control registers 402, which are used to control, operate, or otherwise direct particular features of the framework. In some embodiments, each DMA controller 406, external device interface 408, processing module 410, and convolution accelerator 600 has an interface to the configuration network with a defined set of configuration registers (e.g., formed in CAF control registers 402).

In some cases, the CAF control registers 402 include other structures configured to control operations of one or more modules in a CAF 400. For example, an interrupt controller may be included. An interrupt controller collects all interrupt signals which are generated in the accelerators, DMA engines and external interfaces. Dedicated configuration registers are used to define which interrupts are forwarded to which external processor for further actions. A clock and reset control unit may be configured and directed to distribute, gate, and eventually divide a main clock signal. The clock and reset control unit may also forward an individual clock and reset signal to a selected number of convolution accelerators 600, DMA engines 406, a system bus interface module 404, processing modules 410, external device interfaces 408, and the like. A debug support unit may be configured to collect probe signals in the CAF 400 or SoC 110. The debug support unit may also be configured to provide a configurable number of stream input ports connected to an analyzer unit and provide a set of event counters to assist system debugging.

The system bus interface module 404 may, in some cases, also perform arbitration tasks. Since the system bus interface module 404 provides the main data connection between the CAF 400 and the rest of the SoC 110 system, control information passing into or out from the CAF 400 may be arbitrated. The arbitration may follow a round-robin scheme, a least recently used scheme, a weighted priority scheme, or some other scheme.

The CAF 400 includes a plurality of DMA controllers 406. In FIG. 4, sixteen DMA controllers 406a to 406p are illustrated, but some other number of DMA engines may be included in other embodiments of SoC 110 according to one or more choices made by a semiconductor practitioner at design time.

The plurality of DMA engines 406 may be communicatively coupled via a bus port link or some other data communication mechanism to one or multiple bus arbiters integrated in, or otherwise associated with, the system bus interface module 404. In some cases, the system bus interface module 404 includes multiple bus interfaces to improve the bandwidth. In an exemplary embodiment, the CAF 400 has at least two arbiters and at least two bus interfaces integrated in the system bus interface 404. The arbiters in this case support various run-time selectable arbitration schemes such as round robin and multiple levels of priorities to enable an acceptably optimal use of the available bandwidth.

The DMA engines 406 are arranged to provide bidirectional channels for input data flow, output data flow, or input and output data flow. In these cases, substantial quantities of data is passed into the CAF 400, out from the CAF 400, or into and out from the CAF 400. For example, in some cases, one or more DMA engines 406 are used to pass streaming video data from memory or from a data source device (e.g., a high-definition (HD) video camera) that produces substantial quantities of video data. Some or all of the video may be passed in from the source device, in from or out to SoC global memory 126, and the like.

Each DMA engine 406 may include one or more input buffers (not shown), one or more output buffers (not shown), or both input and output buffers. Each DMA engine 406 may include packing logic (not shown) to pack data, unpack data, or both pack data and unpack data. Each DMA engine 406 may also include a set of defined configuration registers that direct any one or more of source address information, destination address information, quantity-to-transfer information, stride, endianness, compression, and the like. In some cases, the configuration registers are arranged to facilitate linked lists that the DMA engines 406 use to sequentially transfer selected quantities of data.

Figure 5:
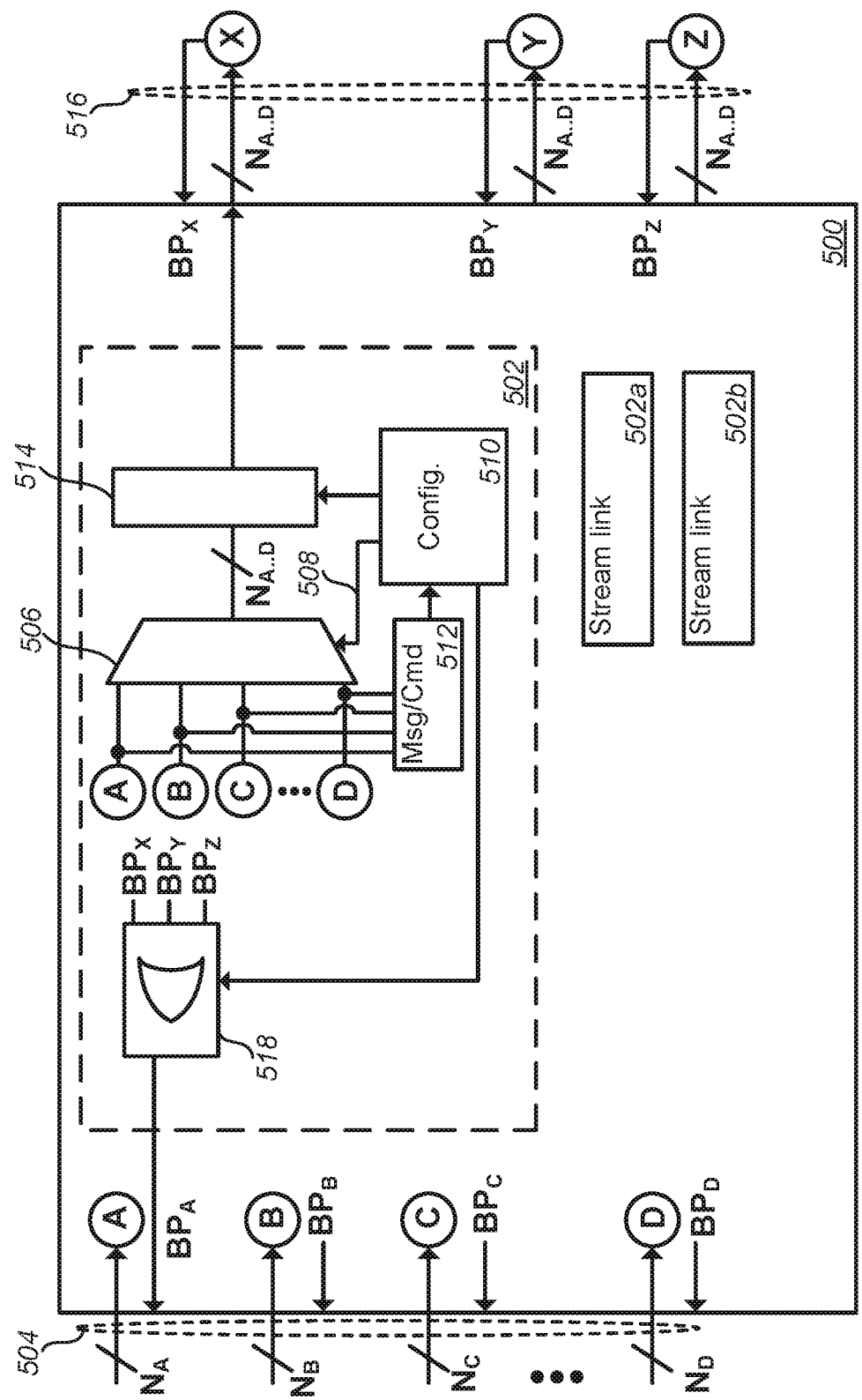
FIG. 5 is a stream switch embodiment.

In one exemplary embodiment, one or more DMA engines 406 are connected to the stream switch 500 with one input port 504 (FIG. 5) and one output stream port 516 (FIG. 5). The DMA engines 406 can be configured in either input or output mode. The DMA engines 406 can be configured to pack and send data to any address location accessible on the primary communication bus 132, the secondary communication bus 166, or some other address location. The DMA engines 406 can also additionally or alternatively be configured to unpack fetched data and translate the unpacked data into a data stream.

The DMA engines 406 may be arranged to support various packing features, various data formats, multi-dimensional (e.g., 2D, 3D, and the like) addressing schemes, data subsampling, arbitrary bit width data extraction, linked list control, and event monitoring. The data retrieved from memory and data stored in memory can be processed and stored, respectively, at any selected bit width with configurable gaps between and before/after each data value (e.g., each pixel value). In some embodiments, DMA engines are also configurable or otherwise operable such that each line, each macro block, each frame, or each other unit quantity of data may have individual offsets in memory. Extensive prefetching and block transfers can be implemented using DMA engines 406 to acceptably optimize latency and utilization of the provided bus bandwidth. In some embodiments, linked command lists are implemented, and such lists may enable processor independent reconfiguration of the DMA engines 406. In these cases, each list entry may be programmed or otherwise arranged to contain a configuration context that is executed until a certain selectable event is detected such as an end of a frame, an end of N frames, a CMD message received, and the like. In these linked list cases, the link address in each list entry may be used to autonomously fetch a next context.

The CAF 400 of FIG. 4 includes a design-time selectable, run-time configurable plurality of external device interfaces 408. The external device interfaces 408 provide a connection to external devices which produce (i.e., source devices) or consume (i.e., sink devices) data. In some cases, the data that passes through an external device interface 408 includes streaming data. The amount of streaming data that is passed through an external device interface 408 may be predetermined in some cases. Alternatively, the amount of streaming data passed through an external device interface 408 may be indeterminate, and in such cases, the external device may simply produce or consume data whenever the particular external device is enabled and so directed.

The plurality of external device interfaces 408 are selected by a semiconductor practitioner when the device (e.g., CAF 400, SoC 110, or mobile device 100) is designed. The number, parameters, and features of the external device interfaces 408 may be selected based on the determined or prospective use of the CAF 400. The external device interfaces 408 may be arranged for coupling (e.g., one or more of physical coupling, electrical coupling, communications, control, power, and the like). The external device interfaces 408 may be arranged for coupling to image sensors, digital microphones, display monitors, or other source and sink devices. The external device interfaces 408 manage or otherwise handle synchronization with other clock domains. The external device interfaces 408 may in some cases convert internal data streams to standard interface formats such as ITU-R BT.656 (ITU656) and vice versa. Various types of external device interfaces 408 comply with a parallel camera interface protocol (e.g., ITU656), a serial camera interface protocol (e.g., CCIR2), a digital output interface protocol (e.g., DVI), a multimedia protocol, a raw data input/output interface protocol, and any other desirable protocol. A selectable number (e.g., two, four, eight, sixteen) of device interfaces 408 can be automatically integrated in the CAF 400 framework.

CAF 400 of FIG. 4 includes a digital visual interface (DVI) external device interface 408a, a first image sensor interface and image signal processor (ISP) external device interface 408b, and a second image sensor interface and ISP external device interface 408c. Other interfaces are also contemplated, though for simplicity in illustration, only three external device interfaces 408 are shown. The DVI external device interface 408a is arranged for coupling to a DVI port of a particular monitor such as a liquid crystal display (LCD) based monitor. The DVI external device interface 408a may include some or all of configuration logic (e.g., registers, memory, processor, state machine, and the like), a pixel clock and synchronization signal generator circuit, data packing logic, and a single or dual port first-in-first-out (FIFO) buffer. The pixel clock and synchronization signal generator circuit may generate and pass single data rate mode clock signals, double date rate (DDR) mode clock signals. The DVI external device interface 408a may in some cases support an 8/12/24 bit RGB/YUV single or double date rate interface.

The first and second image sensor interface and ISP external device interfaces 408b, 408c may comport to one or more video data protocols including ITU-R BT.656-4 YUV (YCbCr) 4:2:2, RGB565, RGB444, and RGB444zp. The first and second image sensor interface and ISP external device interfaces 408b, 408c may include some or all of configuration logic (e.g., registers, memory, processor, state machine, and the like), single or dual port FIFO buffer features, data unpacking logic, data conversion features, color resampling features, and other features.

A plurality of processing modules 410 are integrated in the CAF 400. Three processing modules 410 are illustrated for simplicity, but another selected number (e.g., two, four, eight, sixteen) of processing modules 410 may also be integrated in a CAF 400 at design time by a semiconductor practitioner. The processing modules 410 may be selected to perform particular processing features on one or more types of data. The processing modules may each include a determined set of configuration registers programmable by default, at boot time, or at run time to direct operations of the associate processing module 410. A first processing module 410 is an MPEG/JPEG processing module 410a arranged to perform certain video (i.e., MPEG) processing and certain image (i.e., JPEG) processing. A second processing module 410 is an H264 processing module 410b, which is arranged to perform particular video encoding/decoding operations. A third processing module 410 is a color converter processing module 410n, which is arranged to perform color-based operations on certain multimedia data.

In many cases, the DMA controllers 406, the external device interfaces 408, the processing modules 410, the convolution accelerators 600, and other modules integrated in a CAF 400 are IP modules selected from a library by a semiconductor practitioner at design time. The semiconductor practitioner may specify the number of modules, features of particular modules, bus widths, power parameters, layout, memory availability, bus access, and many other parameters.

Table 2 is a non-exhaustive exemplary list of IP modules in a library that may be incorporated into CAF 400. In many cases, as new modules are designed, and as existing modules are modified, the new IPs will be added to a library such as the library of Table 2.

TABLE 2

CAF Library of IP modules

| Functional Unit | Application |
| --- | --- |
| RGB/YUV Sensor Interface | Interface |
| Bayer Sensor Interface | Interface |
| Video Out Interface (DVI) | Interface |
| Enhanced I/O (Sensor Interface, Video Out, Overlay) | Interface |
| ISP (Image Signal Processor) | Signal Processing |
| Mini ISP (Image Signal Processor) | Signal Processing (Bayer -> RGB) |
| GP Color Converter Unit | General Purpose |
| Image Cropper and Resizer Unit | General Purpose |
| Morph Filter Unit | General Purpose |
| Background Remove Unit (+shadow remove) | Background/Foreground segmentation |
| Reference Frame Update Unit | Background/Foreground segmentation |
| JPEG Encoder | Encoder |
| JPEG Decoder | Decoder |
| H264 Encoder | Encoder |
| H264 Encoder | Encoder (Baseline, Intra Only) |
| Rectification and Lens Distortion Correction | Stereo Vision |
| Census Transformation Unit (BRIEF) | Stereo Vision |
| Stereo Vision Depth Map Generator | Stereo Vision |
| Feature Point Detector (FAST) | Feature Detection |
| Feature Detection (Viola Jones) | Face Detection (e.g., Integral Image, ISA Extension) |
| Feature Detection (Optical Flow) | Facial Tracking |
| Feature Point Extractor (DoG + SIFT) | Feature Detection - Difference of Gaussian plus Scale Invariant Feature Transform |
| Feature Extraction | Edge Extraction (Sobel, Canny) |
| Clock and Interrupt Manager | System Control |
| Debug Support Unit | Debug |
| GP IO Unit | General Purpose |
| 3D convolution accelerator for neural networks | Processing |

In FIG. 4, eight convolution accelerators 600 are represented, CA0 to CA7. In other CAF 400 embodiments, a different number of convolution accelerators are formed. The number of convolution accelerators 600 and the particular features available in each convolution accelerator 600 are in some cases based on parameter values selected by a semiconductor practitioner at design time.

The convolution accelerators (CA's) 600 are data processing units with a selected number (e.g., one, two, four, eight) of input and output stream link ports. One or more configuration registers (e.g., a set of configuration registers) are arranged to control operations of the CA 600. In some cases, configuration registers are included in the CAF control registers 402, and in these or other cases, certain configuration registers are formed as part of the CA 600.

One or more convolution accelerator template modules may be included in an IP modules library such as the library described with respect to Table 2. In these cases, data stored in the IP modules library includes relevant building blocks that reduce the work required to build a new accelerator that implements an accelerator's core functionality. A predefined set of configuration registers can be extended. Configurable FIFOs formed or otherwise located at the stream link ports can be used to absorb data rate fluctuations and provide some buffering margin required to relax certain flow control constraints in a processing chain.

Typically each CA 600 either consumes data, generates data, or both consumes data and generates data. Data that is consumed passes through a first stream link 500, and data that is streamed passes through a second stream link 500. In several embodiments, CA's have no direct access to memory address space accessible by the primary communications bus 132 (FIG. 3), the secondary communications bus 166 (FIG. 3), or other bus addresses. However, if random memory access to data passed on a system bus is required, a CA 600 may also use an optional bus port interface, which may be along the lines of the system bus interface module 404 of FIG. 4, which is used for several things including permitting DMA engines to access memory locations on the system bus. As discussed above, some CA 600 implementations are part of a library, which can be used in other CAF 400 embodiments to simply instantiate the CA 600 in a global system definition file.

In some cases, the CAF 400 is configured at design time with a centralized configuration file. In the centralized configuration file, a selected number and type of accelerators, interfaces, DMA engines, interconnections, and other features are defined. The centralized configuration file is so arranged to contain the relevant information that is used to automatically generate synthesizable register transfer language (RTL) code, corresponding test-benches for verification, scripts that are used to run a logic synthesis on one or more selected CMOS and FPGA technologies, and other features. The IP library used to create a CAF 400 may include for each accelerator or interface the associated RTL code and configuration scripts. A parametric template for new accelerators and external interfaces may also be provided to simplify the extension of the data base with new units. After the definition of a new CAF 400 system in the centralized configuration file, the generation process in some cases is started with a single command, and all RTL files, test-benches, and implementation scripts for logic synthesis and verification are generated.

After the CAF 400 is designed and fabricated, in SoC 110 for example, the CAF 400 may be configured and re-configured at run time for any desired operation. In some cases, the CAF is arranged for multimedia processing (e.g., streaming video, streaming audio), motion processing, or other types of data analysis processing.

FIG. 5 is a stream switch embodiment 500 in more detail. The stream switch 500 includes a user-selectable, design-time configurable first number of stream link input ports 504 and a user-selectable, design-time configurable second number of stream link output ports 516. In some cases, there is the same number of input ports as there are output ports. In other cases, there are more input ports than output ports, and in still other cases, there are more output ports than input ports. The number of input ports and the number of output ports are defined at design time.

At run-time, stream switch 500 communicatively couples input stream link ports to output stream link ports according to configuration data written to certain ones of the CAF control registers 402 (FIG. 4). In the embodiment, one or more of the input stream link ports may be desirably arranged to concurrently forward received data streams to one or multiple (multicast) output ports on the same clock cycle. Thus, one input stream link port can be communicatively coupled (e.g., electrically connected for the passage of data) to one or more output stream link interfaces, which results in a physical replication of the input data stream.

In some CAF 400 embodiments, the conductors of a stream link are arranged as indicated in Tables 3 and 4. In some cases, the particular configuration of one or more stream links are directed by values in certain ones of the CAF control registers 402.

TABLE 3

Layout of an exemplary stream link

| Signal Name | Direction | Width | Description |
|---|---|---|---|
| DATA0 | Out | 8-10 bit | Color Data Val. 0 |
| DATA1 | Out | 8-10 bit | Color Data Val. 1 |
| DATA2 | Out | 8-10 bit | Color Data Val. 2 |
| HENV | Out | 1 bit | Data Valid |
| FIRST | Out | 1 bit | First Pixel of Current Line |
| LAST | Out | 1 bit | Last Pixel of Current Line |
| LINETYPE | Out | 5 bit | Line Type |
| STALL | In | 1 bit | Stall Signal |

TABLE 4

Types of data passed on an exemplary stream link

| Line Type Value | Description |
|---|---|
| 0 | NULL |
| 1 | RAW Start of Frame |
| 2 | RAW End of Frame |
| 3 | RAW Blanking |
| 4 | |
| 5 | RAW: Normal Black |
| 6 | RAW: Last Black |
| 7 | RAW: Not Used |
| 8 | RAW: Not Used |
| 9 | RAW: Normal Dark |
| 10 | RAW: Last Dark |
| 11 | RAW: Not Used |
| 12 | RAW: Not Used |
| 13 | RAW: Normal Active |
| 14 | RAW: Last Active |
| 15 | RAW: Not Used |
| 16 | SPECIAL DATA: File Transfer |
| 17 | SPECIAL DATA: Reserved |
| 18 | SPECIAL DATA: Reserved |
| 19 | SPECIAL DATA: Reserved |
| 20 | MSG: Generic |
| 21 | MSG: Not Used |
| 22 | MSG: Not Used |
| 23 | MSG: Not Used |
| 24 | CMD Add Channel |
| 25 | CMD: Delete Channel |
| 26 | CMD: Switch Channel |
| 27 | CMD: Reserved |
| 28 | CMD: FU Generic CMD |
| 29 | CMD: FU Run |
| 30 | CMD: FU Stop |
| 31 | CMD: FU Flash |

Table 3 shows the physical layout and definition of an exemplary stream link embodiment. As indicated particularly in Table 3, the stream link provides a straightforward, unidirectional interface to transport data streams and control information associated with the data streams. In such embodiments, a single control signal, which may in some cases be propagated on a single dedicated or shared data path, provides flow control. Some conductors of the stream link are used to pass data (e.g., data0, data1, data2); some other conductors include a data validity indicator, a first pixel indicator, a last pixel indicator, a line type definition, and a stall signal. The stall signal is used as a back pressure (e.g., flow control) mechanism as described herein. In the stream link embodiment of Table 3, image data, command data, control information, messages, and the like are passed in a frame-based protocol along the processing chain though the stream switch 500.

Table 4 shows an exemplary embodiment of various line type definitions.

In the stream switch 500 embodiment of FIG. 5, one stream link 502 embodiment is shown in detail. Other stream links 502a, 502b, are also illustrated without detail for simplicity in the illustration. The stream links 502a, 502b are generally arranged along the lines of the stream link 502, and for the sake of clarity in the disclosure any of the illustrated stream links may be identified as stream link 502.

In the stream switch 500, each output port 516 is associated with a particular stream link 502. In FIG. 5, for example, output port X is associated with stream link 502. In addition, one or more input ports 504 are associated with each stream link. In some cases, for example, each and every input port 504 is associated with each and every stream link. In this way, each input port 504 may pass data to any and all output ports 516 at the same time or at different times.

Individual communication path conduits of the stream link are unidirectional. That is, signals on each communication path conduit flow in only one direction. In some cases, a plurality of communication path conduits unidirectionally accept data received from an input port and pass the data to one or more output ports. In these cases, and in other cases, a single communication path conduit unidirectionally receives command information (e.g., flow control information) from an output port and passes the command information to one or more input ports. In some other cases, the command information received from an output port and passed to one or more input ports is passed on two or more communication path conduits.

In the stream switch 500 embodiment of FIG. 5, a selected number (e.g., four, eight, sixteen, etc.) of input ports 504 have been formed in the stream switch 500 according to one or more design-time decisions of a semiconductor practitioner. Four input ports 504 are illustrated and identified as input port A, input port B, input port C, and input port D, but some other number of input ports 504 may also be formed. The first input port A includes a determined number of unidirectional communication path conduits $N_A$, wherein the determined number may be 16, 32, 40, 64, or some other integer. Along these lines, input ports B, C, D include a same or different determined number of unidirectional communication path conduits $N_B$, $N_C$, $N_D$, respectively. In some cases, $N_A = N_B = N_C = N_D$. In other cases, different input ports may have different numbers of unidirectional communication path conduits.

In some cases, one or more of the input ports may also include a synchronization mechanism (not shown). The synchronization mechanism may include a register, a small buffer, one or more flip flops, or some other synchronization mechanism. The synchronization mechanism may be used to coordinate the passage of data from source devices or to sink devices that operate according to different clock signals (e.g., different frequency, different phase, etc.).

As shown in the detailed stream link 502 of FIG. 5, the set of unidirectional communication path conduits from a plurality of input ports 504 are passed into a data switch 506. In some cases, the set of unidirectional communication path conduits from every input port 504 are passed into the data switch 506. In other cases, the unidirectional communication path conduits of one or more, but less then all, input ports 504 are passed into a data switch 506 of a particular stream link 502. The data switch 506 may include multiplexor logic, demultiplexor logic, or some other form of switching logic.

As shown in FIG. 5, data passed into stream link 502 from a plurality of input ports 504 may be concurrently present at input nodes of the data switch 506. A selection mechanism 508 is arranged to determine which input data is passed through the data switch 506. That is, based on the selection mechanism 508, the input data from one of input ports A, B, C, D is passed through the data switch 506 to an output of the data switch 506. The output data will be passed on $N_A$ ... $_D$ unidirectional communication path conduits, which will match the number of unidirectional communication path conduits of the selected input port.

The selection mechanism 508 is directed according to stream switch configuration logic 510. The stream switch configuration logic 510 determines at run time which input port 504 shall supply data to the associated output port, and based on the determination, the stream switch configuration logic 510 forms an appropriate selection signal that is passed to the data switch 506. The stream switch configuration logic 510 operates at run time and in real time. The stream switch 510 may take direction from CAF control registers, from a DSP of the DSP cluster 122 (FIG. 3), from the application processor 128, or from some other control device. In addition, the stream switch configuration logic 510 may also take direction from message/command logic 512.

In some stream switch 500 embodiments, certain specific messages that are passed through an input port 504, for example by an interface or an accelerator, are recognized by command logic 512 in one or more stream links 502 of the stream switch 500 and used to reprogram one or more stream links 502 in real time. In these or in other embodiments, the stream switch 500 is configured to merge data streams according to fixed patterns. For example, in at least one case, a stream switch 500 may be arranged to select and pass data to an output port 516 by switching between input streams passed on two or more input ports 504. For example, after each line, each frame, each N transactions, or by some other measure, the stream switch 500 may be configured to pass data from a different input port 504 to a selected output port 516.

Message/command logic 512 is arranged to monitor one or more bits passed on one or more unidirectional communication path conduits of one or more input ports. The message/command logic 512 may, for example, detect a command passed from an input data source. Such commands may follow a certain exemplary communication as indicated by Table 3 and Table 4. Based on the detected message or command, the message/command logic 512 is arranged to provide direction or particular actionable information to the stream switch configuration logic 510.

In one embodiment, for example, a first data input source is coupled to input port A, and a second data input source is coupled to input port B. The configuration logic may be directing the data switch 506 to pass data from the input port A to output port X. In such case, the first input source may embed a message in a line of streaming data that is detected by the message/command logic 512. The detected message may direct the stream switch configuration logic 510 to change the selection mechanism 508 so that data from input port B is passed to output port X. Subsequently, the second input source may embed a message in a line of streaming data that is recognized by the message/command logic 512 to force a return of the selection mechanism 508 to direct data from input port A to the output port X. Other patterns, commands, directions, and the like are of course contemplated. In this way, using commands or messages passed through the stream link 502, passed via CAF control registers 402 (FIG. 4), or passed in another way from another device (e.g., DSP, applications processor, or the like), stream switch 500 may reprogram one or more stream links 502 in real time. Data streams may be merged according to fixed patterns, dynamic patterns, learned patterns, or by some other direction.

Data passed from the data switch 506 may in some cases pass through one or more optional output synchronization logic stages 514. The output synchronization logic stages 514 may be used to store or otherwise buffer a selected amount (e.g., one or more bits, a few or many bytes, etc.) of data passed from a data source coupled to an input port 504 toward a data sink device coupled to an output port 516. Such buffering, synchronizing, and other such operations may be implemented when data source devices and data sink devices operate at different rates, different phases, using different clock sources, or in other manners that may be asynchronous to each other.

The stream switch 500 includes a back pressure stall signal mechanism, which is used to pass flow control information from a sink device to a source device. The flow control information is passed from a sink device to inform a data stream source device to lower its data rate. Lowering the data rate will help to avoid a data overflow in the sink device.

One portion of the back pressure stall signal mechanism includes a back pressure stall signal path that is included in each input port. The back pressure stall signal path is arranged as a back pressure unidirectional communication path conduit. In FIG. 5, four back pressure input port mechanisms are illustrated, $BP_A$, $BP_B$, $BP_C$, $BP_D$; one each for each of the illustrated input ports. In other embodiments, the back pressure mechanism of each input port may include one or more unidirectional communication path conduits. In some embodiments, the back pressure mechanism of each input port has the same number of unidirectional communication path conduits, which may be, for example, a single conduit. In these cases, for example, when a data source device coupled to the particular input port detects that a signal on the back pressure mechanism is asserted, the particular data source device will slow or stop the amount of data passed to the associated input port.

Each output port 516 includes another portion of a back pressure mechanism. One output port back pressure mechanism for each of the three illustrated output ports X, Y, Z, of FIG. 5 are illustrated, $BP_X$, $BP_Y$, $BP_Z$. In some cases, each output port back pressure mechanism includes a same number of unidirectional communication path conduits (e.g., one). In other cases, at least one output port has a back pressure mechanism with a different number of unidirectional communication path conduits than another back pressure mechanism of another output port.

The output port back pressure mechanism conduits are passed to combinatorial back pressure logic 518 in each stream link 502. In FIG. 5, back pressure logic 518 receives back pressure control signals $BP_X$, $BP_Y$, $BP_Z$. The combinatorial back pressure logic 518 also receives control information from the stream switch configuration logic 510. The combinatorial back pressure logic 518 is arranged to pass relevant flow control information back through the input port back pressure mechanism of an input port 504 to a particular data source device.

In one exemplary use of the back pressure mechanism of stream switch 500, a data source device (not shown) is coupled to data input A. First stream switch 502 is arranged to pass data from input port A to output port X. Concurrently, second stream link 502a is arranged to pass data from input port A to output port Y. If a first data sink device (not shown) that is coupled to output port X is becoming overwhelmed, then the first output port X may assert a flow control signal on $BP_X$. The asserted flow control signal is passed back to combinatorial back pressure logic 518, and since the stream switch configuration logic 510 is passing data from input port A to output port X, the combinatorial back pressure logic 518 is permitted to pass the flow control signal on $BP_X$ to the input port A, which will direct the first data source to slow or stop its data flow. A similar process may also take place if the second data sink device (not shown) that is coupled to output port Y is at risk of losing data. In contrast, since the first data source device (not shown) coupled to input port A is not passing data to output port Z, a flow control signal asserted on control signal on $BP_Z$ will not be passed back through input port A.

Figure 6A:
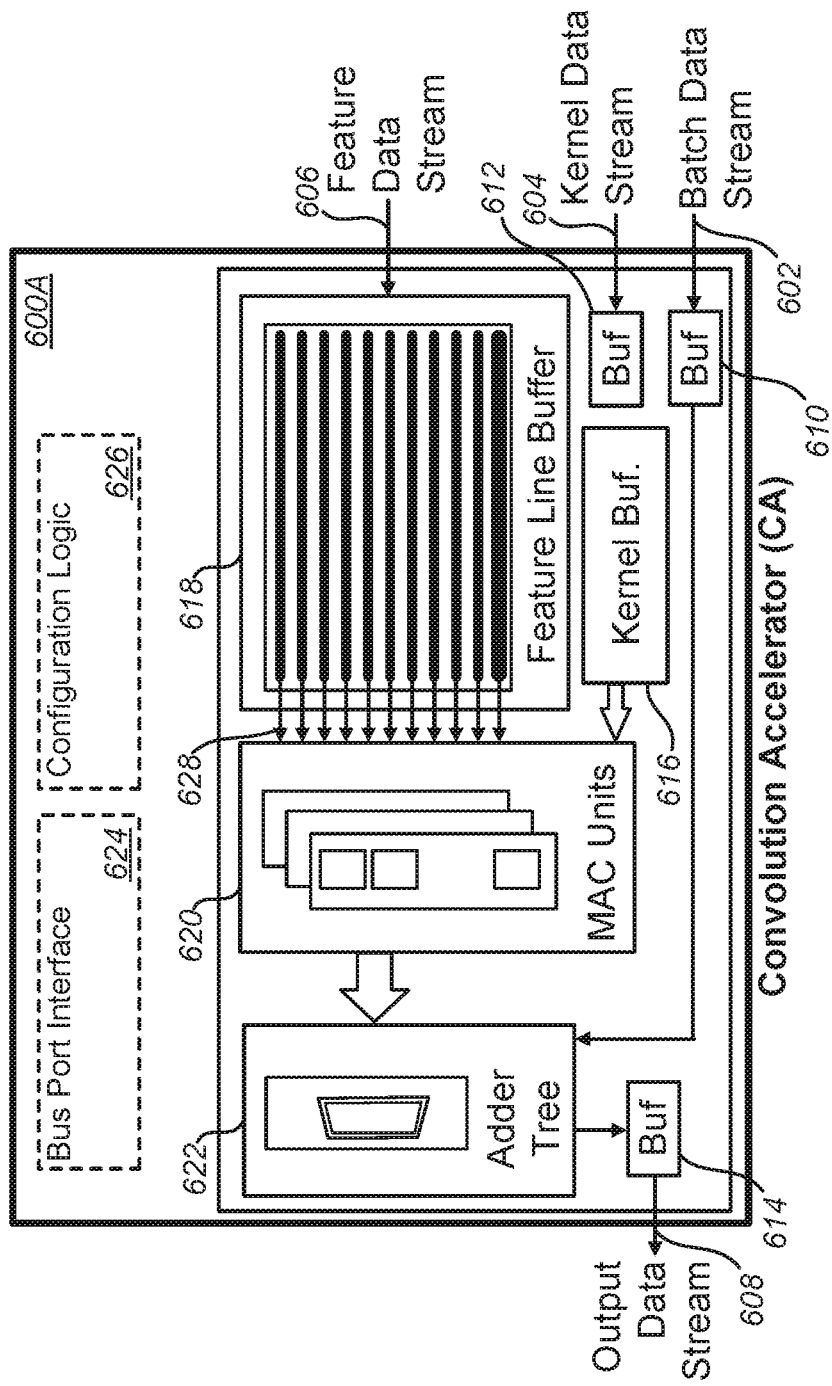
FIG. 6A is a first convolution accelerator (CA) embodiment.
Figures 6B, 6C:
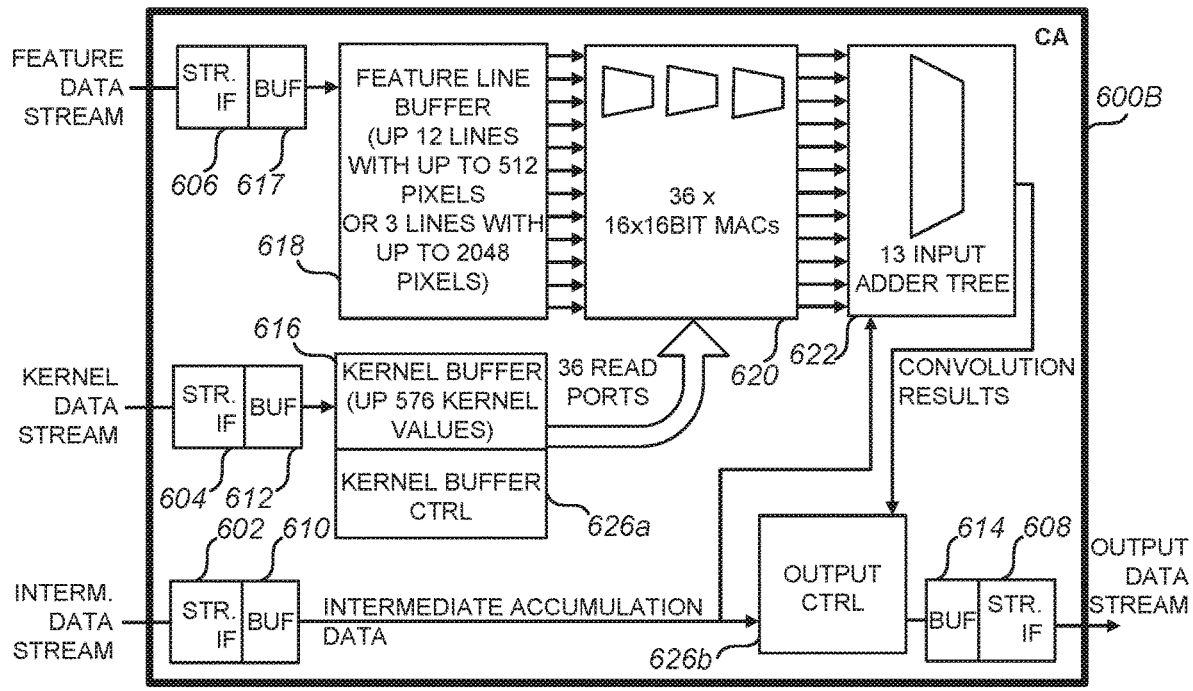
FIG. 6B is a second convolution accelerator (CA) embodiment.
FIG. 6C is a set of organizational parameters of the second CA embodiment of FIG. 6B.
Figure 6D:
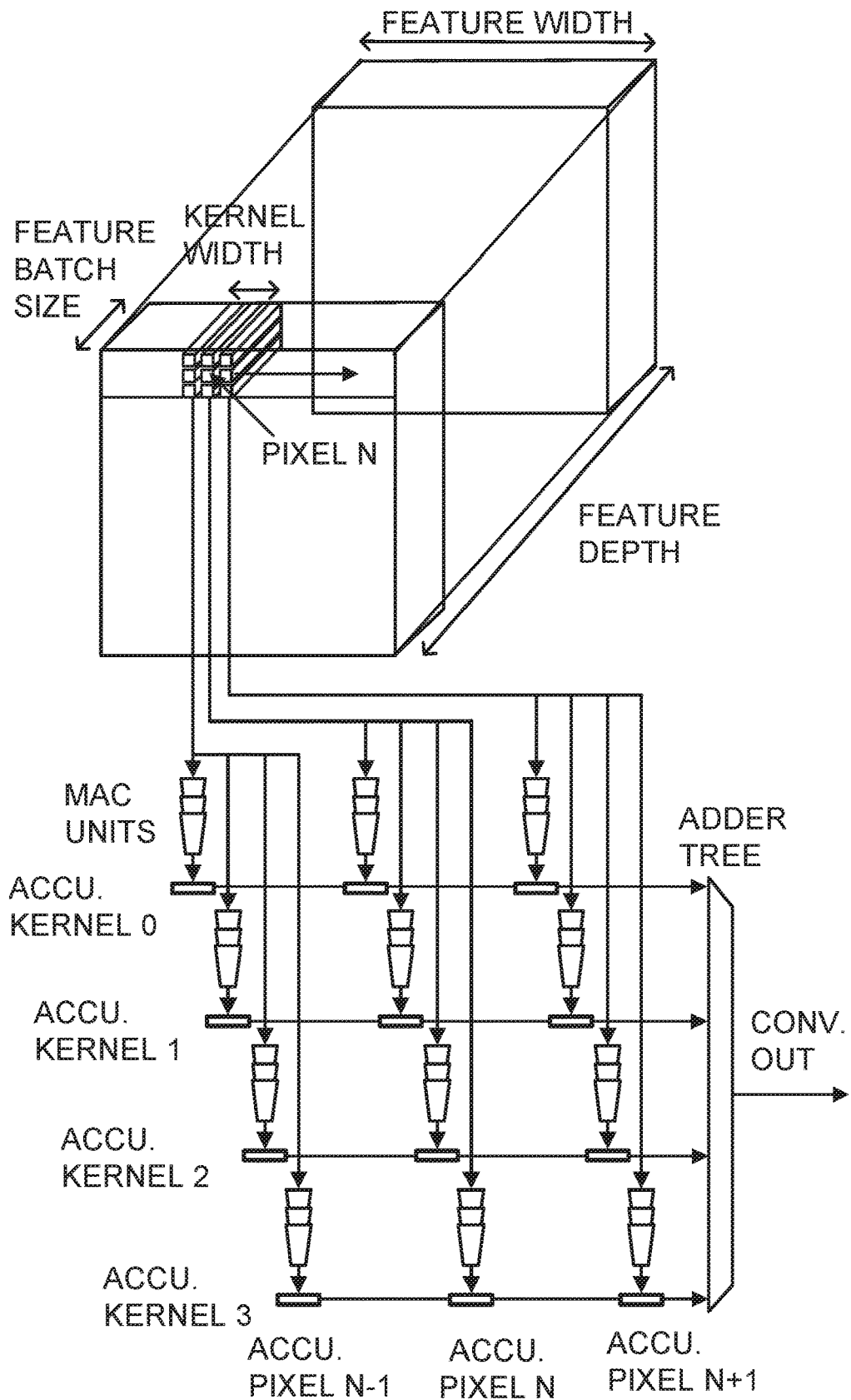
FIG. 6D is a block diagram illustrating an exemplary convolution operation.

FIG. 6 includes FIGS. 6A-6D.

FIG. 6A is a first convolution accelerator (CA) embodiment 600A. The CA 600A may be implemented as any one or more of the convolution accelerators 600 of FIG. 4.

The CA 600A includes three input data interfaces and one output data interface that are each arranged for coupling to a stream switch 500 (FIG. 5). A first CA input data interface 602 is arranged for coupling to a first stream switch output port 516, a second CA input data interface 604 is arranged for coupling to a second stream switch output port 516, and a third CA input data interface 606 is arranged for coupling to a third stream switch output port 516. A CA output data interface 608 is arranged for coupling to a selected stream switch input port 504. The specific stream switch 500 port that each CA input data interface 602, 604, 606 and output data interface 608 is coupled to may be determined by default, at boot time, or at run time, and the specific coupling may be programmatically changed at run time.

In an exemplary embodiment, the first CA input data port 602 is arranged to pass a stream of batch data into the CA 600A, the second CA input data port 604 is arranged to pass a stream of kernel data into the CA 600A, and the third CA input data port 606 is arranged to pass a stream of feature data into the CA 600A. The output data port 608 is arranged to pass an output data stream from the CA 600A.

The CA 600A includes several internal memory buffers. The internal memory buffers may share a common memory space in some embodiments. In other embodiments, some or all of the internal memory buffers may be separate and distinct from each other. The internal memory buffers may be formed as registers, flip flops, static or dynamic random access memory (SRAM or DRAM), or in some other structural configuration. In some cases, the internal memory buffers may be formed using a multiport architecture that lets, for example, one device perform data "store" operations in the memory while another device performs data "read" operations in the memory.

A first CA internal buffer 610 is physically or virtually arranged in line with the first CA input data interface 602. In this way, batch data streamed into the CA 600A may be automatically stored in the first CA internal buffer 610 until the data is passed to a particular math unit in the CA 600A such as an adder tree 622. The first CA internal buffer 610 may be fixed with a size that is determined at design time. Alternatively, the first CA internal buffer 610 may be defined with a variable size that is determined programmatically at boot time or run time. The first CA internal buffer 610 may be 64 bytes, 128 bytes, 256 bytes, or some other size.

A second CA internal buffer 612 and a third CA internal buffer 614 are formed along the lines of the first CA internal buffer 610. That is, the second and third CA internal buffers 612, 614 may each have their own fixed size that is determined at design time. Alternatively, the second and third CA internal buffers 612, 614 may have a variable size that is determined programmatically at boot time or run time. The second and third CA internal buffers 612, 614 may be 64 bytes, 128 bytes, 256 bytes, or some other size. The second CA internal buffer 612 is physically or virtually arranged in line with the second CA input data interface 604 to automatically store streamed kernel data until the kernel data is passed to a dedicated fourth CA internal buffer 616 that is dedicated to storing kernel buffer data. The third CA internal buffer 614 is physically or virtually arranged in line with the adder tree 622 to automatically store summed data until it can be passed through the CA output interface 604.

The fourth CA internal buffer 616 is a dedicated buffer arranged to desirably store kernel data and apply the stored kernel data to a plurality of CA multiply-accumulate (MAC) units 620.

The fifth CA internal buffer 618 is a feature line buffer that is arranged to receive streamed feature data passed through the third CA input interface 606. Once stored in the feature line buffer, the feature data is applied to the plurality of CA MAC units 620. Feature and kernel buffer data applied to the CA MAC units 620 is mathematically combined according to the convolutional operations described herein, and the resulting output products from the CA MAC units 620 are passed to the CA adder tree 622. The CA adder tree 622 mathematically combines (e.g., sums) the incoming MAC unit data and batch data passed through the first CA input data port.

In some cases, the CA 600A also includes an optional CA bus port interface 624. The CA bus port interface 624, when it is included, may be used to pass data into or out from the CA 600A from SoC global memory 126 or some other location. In some cases, the applications processor 128, a DSP of the DSP cluster 122, or some other processor directs the passage of data, commands, or other information to or from the CA 600A. In these cases, the data may be passed through the CA bus port interface 624, which may itself be coupled to the primary communications bus 132, the secondary communication bus 166, or some other communications structure.

In some cases, the CA 600A may also include CA configuration logic 626. The CA configuration logic 626 may be fully resident with the CA 600A, partially resident with the CA 600A, or remote from the CA 600A. The configuration logic 600A may, for example, be fully or partially embodied in the CAF control registers 402, the SoC controllers 120, or some other structures of the SoC 110.

FIG. 6B is another convolution accelerator (CA) embodiment 600B. The CA 600B may be implemented as any one or more of the convolution accelerators 600 of FIG. 4. The convolution accelerator 600B of FIG. 4 is structured along the lines of CA 600A (FIG. 6A) in an illustration having different details. In some cases, for simplicity, certain features of CA 600A of FIG. 6A are shown differently or are not shown at all in CA 600B of FIG. 6B. Where the same features are shown in both FIG. 6A and FIG. 6B, the same reference identifiers are used.

FIG. 6C is a set of organizational parameters of the second CA 600B embodiment of FIG. 6B. The parameters illustrated in FIG. 6C present a non-exhaustive, non-limiting set of features that represent capabilities of the CAF 400 (FIG. 4) having one or more convolution accelerators as described herein with respect to FIG. 6.

The CA 600B of FIG. 6B is used in an exemplary descriptive method of operating CA 600B. To simplify the discussion, CA 600A and CA 600B are individually and collectively referred to as CA 600.

The CA 600 is configured to autonomously perform the convolution of an entire layer of a convolutional neural network such as AlexNet. To implement this configuration, the CA 600 is arranged to exploit the substantial parallelism that is available in the CAF 400.

Processing in a convolutional neural network uses a huge data bandwidth, which is provided at least in part by SoC global memory 126. Despite the availability of fast, on-chip memory, the large bandwidth and footprint requirements of such memory makes it desirable to reduce the number of accesses made to SoC global memory 126 and the amount of neural network data stored in the SoC global memory 126. Another reason to reduce the amount of data stored and frequency of access to the SoC global memory 126 is that the SoC global memory 126 is shared amongst several devices. It is undesirable, for example, to slow down an application being executed by the applications processor 128 of the SoC 110 while the CAF 400 is accessing SoC global memory 126. In addition, it is also undesirable to starve the neural network of data in order to provide prioritized access to the SoC global memory 126 by the applications processor 128. What's more, the strict memory access requirements of the SoC global memory 126 are not necessarily conducive to flexible convolution accelerators 600 arranged to handle various kernel dimensions and various feature dimensions. And in addition still, power dissipation is also desirably reduced by when access to the SoC global memory 126 is correspondingly reduced.

Some data that is input to a convolutional neural network is called feature data. Feature data in many cases consists of two or more channels of two-dimensional data structure. In some neural networks that perform image recognition, for example, feature data comprises image frames and associated pixel data of the image frames. In some of these cases, three channels of image frame data are used, and each of the three channels represents a different color of the red-green-blue (RGB) color space.

In some embodiments, the kernels are derived from the training of the neural network. Kernels may have any two-dimensions, but in some cases, kernel data may have a dimension in the range of 3-pixels-by-3-pixels (3×3) up to 11-pixels-by-11-pixels (11×11). In these cases, the kernel depth is often identical to the number of channels of the feature data set that will be processed.

The feature data and the kernel data may use a selected number representation such as fixed-point numbers, floating-point numbers, or some other convention. The feature data and kernel data may use any acceptable level of precision. In many but not all embedded applications, floating-point number systems are not selected because computations using floating-point number systems are too computationally expensive. In some cases, using a fixed-point number system having, for example, 16-bit precision or less for kernel data and feature data, provides a reasonable tradeoff between hardware complexity and accuracy degradation of the neural network. In still other cases, a floating-point number system may be deployed using modified fixed-point computations.

To process a kernel of a convolution layer, each value (i.e., each pixel) of the input feature at a first position (e.g., upper right corner, upper left corner, or some other position) is multiplied with each corresponding value of the kernel, and the products are summed to generate one output result. The output result is immediately or later passed to an input of one or more subsequent tasks such as max pooling and non-linear activation. With respect to FIGS. 6B and 6C, values of an input feature from a fifth CA internal buffer 618

(e.g., a feature line buffer) and values of a kernel from a fourth CA internal buffer 616 (e.g., a kernel buffer) are multiplied and accumulated in a CA MAC unit 620, and the products are passed to summing logic of CA adder tree 622. The MAC process is repeated for each pixel in the horizontal direction and the vertical direction to generate the output for one kernel.

Figure 1A:
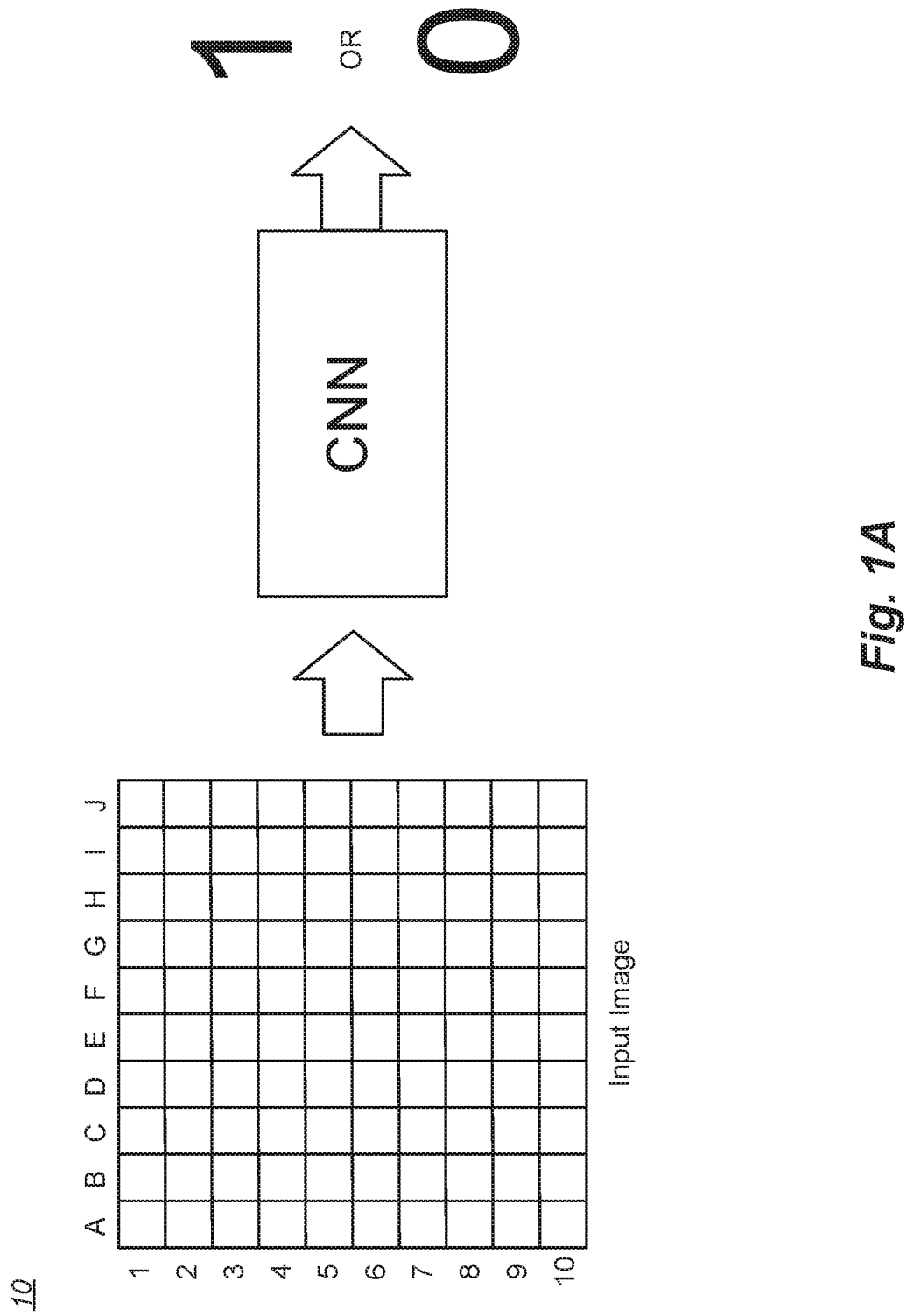
FIG. 1A is a simplified illustration of a convolutional neural network (CNN) system.
Figure 1B:
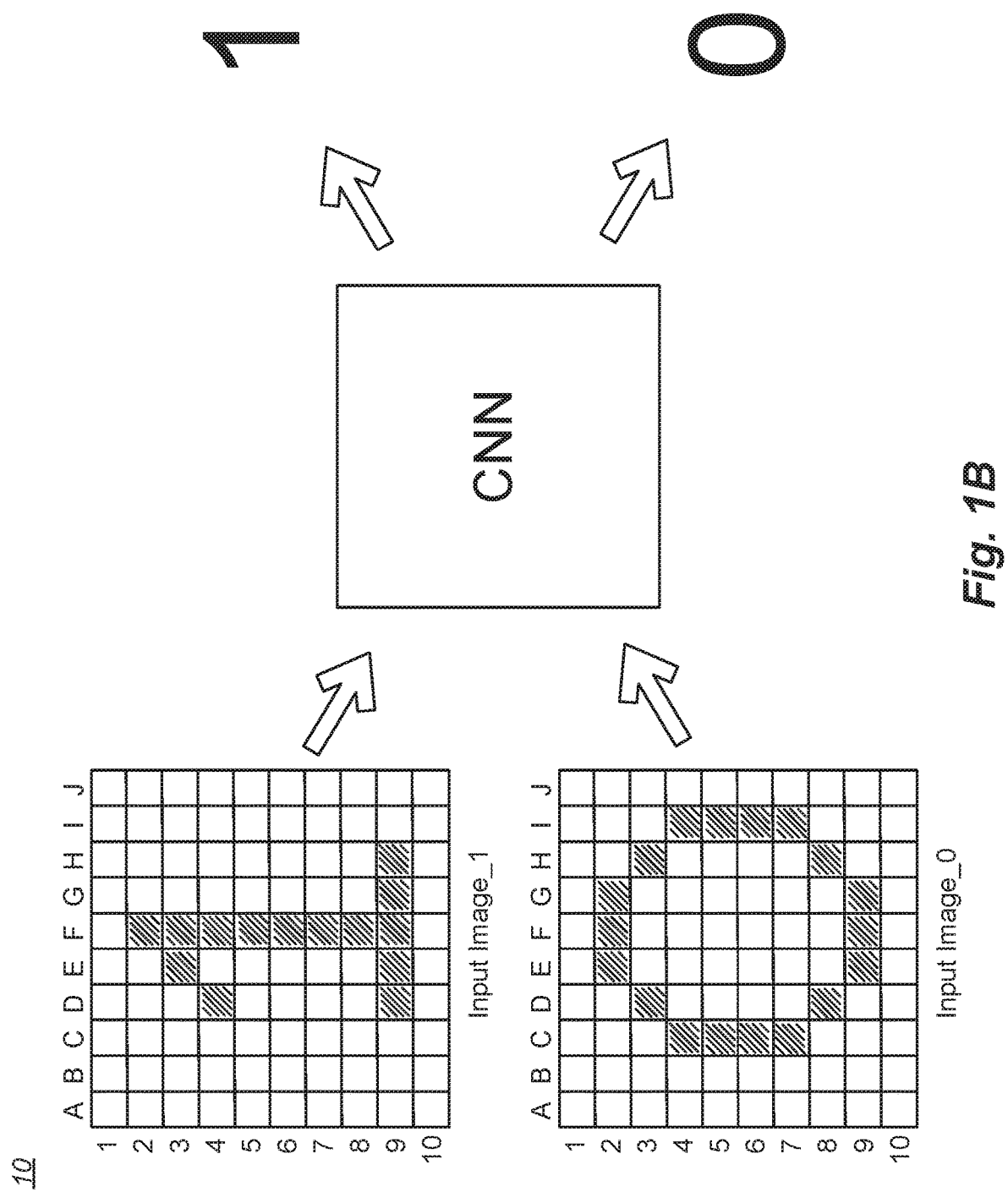
FIG. 1B illustrates the CNN system of FIG. 1A determining that a first pixel pattern illustrates a "1" and that a second pixel pattern illustrates a "0"
Figure 1C:
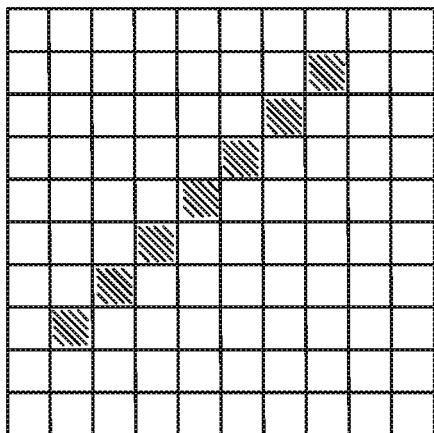
FIG. 1C shows several variations of different forms of ones and zeroes.
Figure 1C:
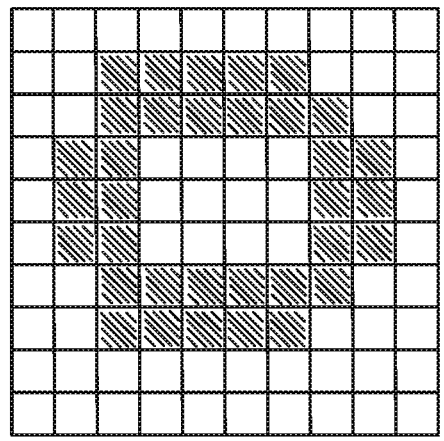
Figure 1C:
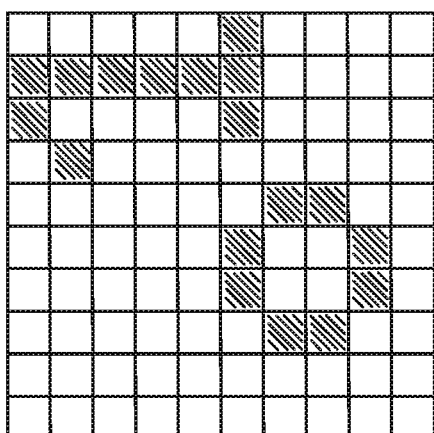
Figure 1C:
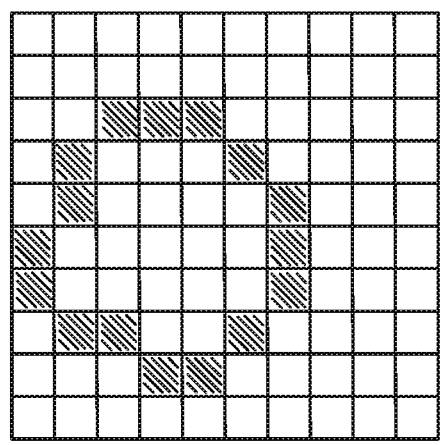
Figure 1C:
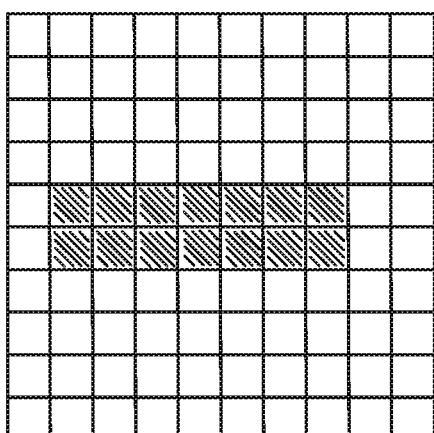
Figure 1C:
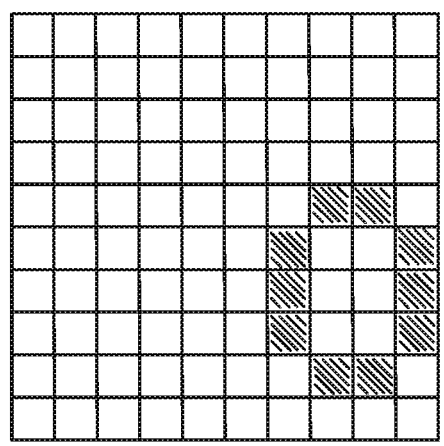
Figure 1D:
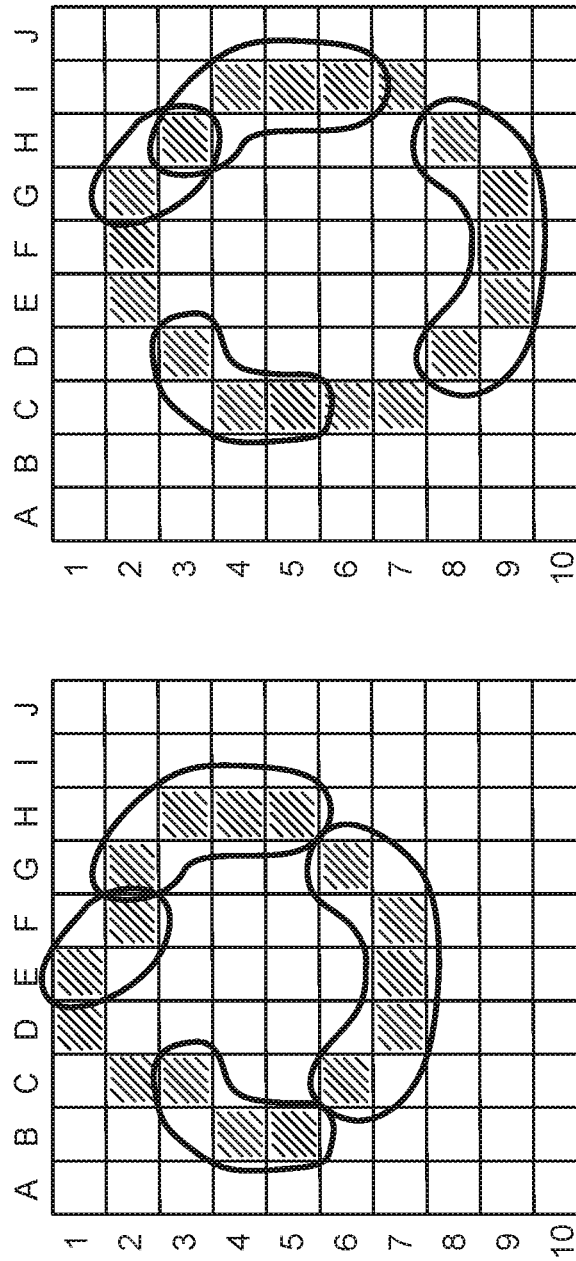
FIG. 1D represents a CNN operation that analyzes (e.g., mathematically combines) portions of an unknown image with corresponding portions of a known image.
Figure 1E:
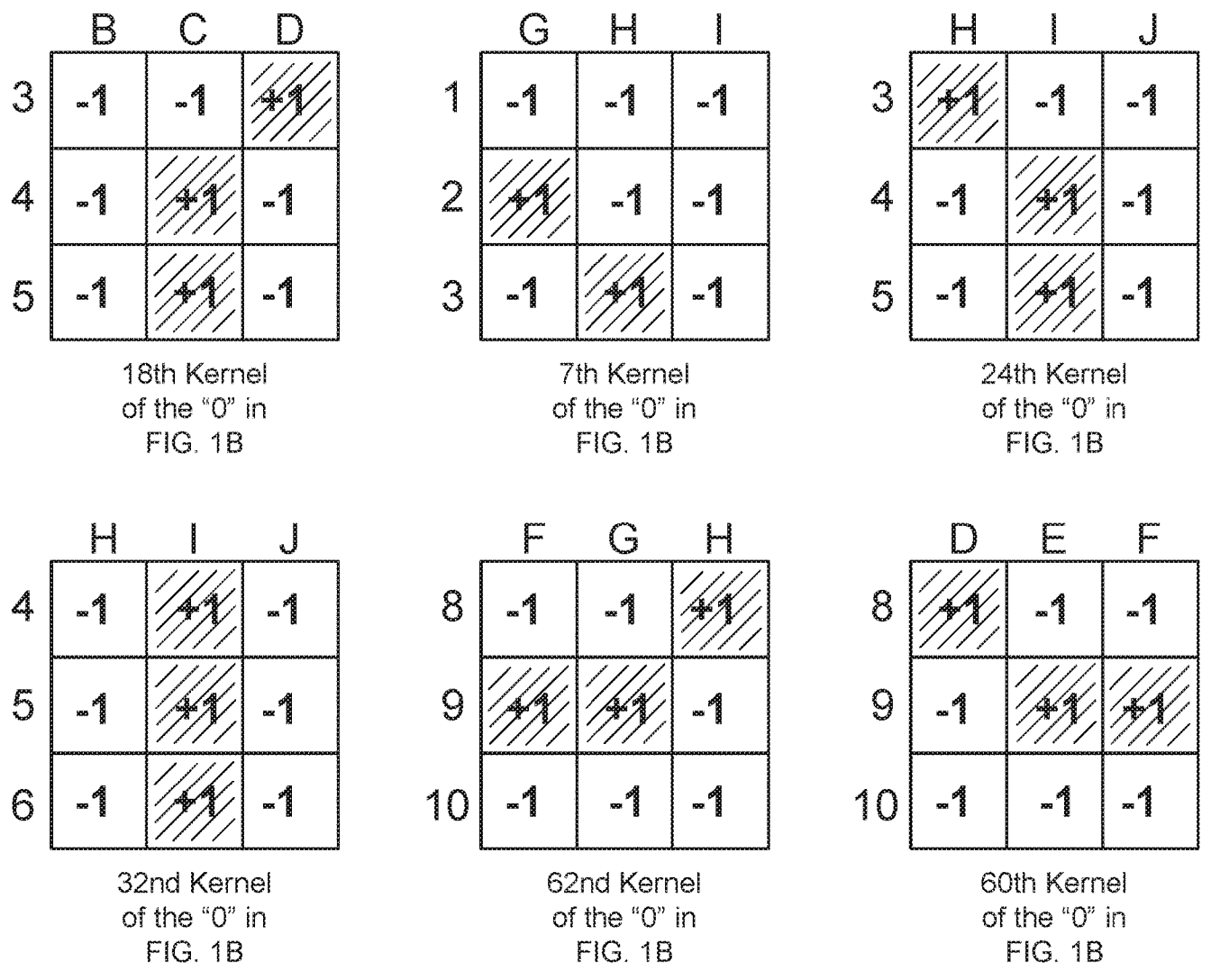
Figure 1F:
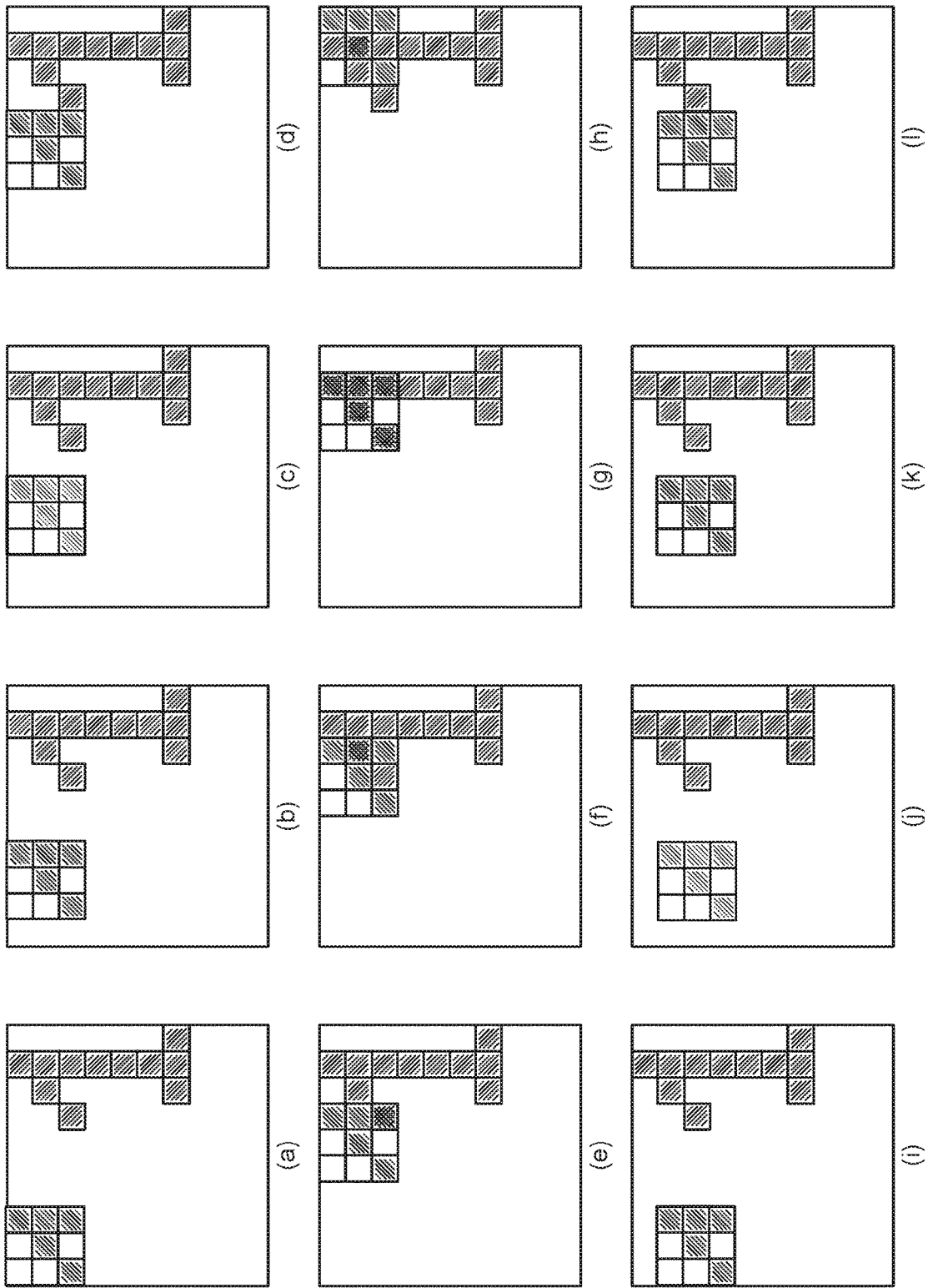
FIG. 1F illustrates 12 acts of convolution in a filtering process.
Figure 1G:
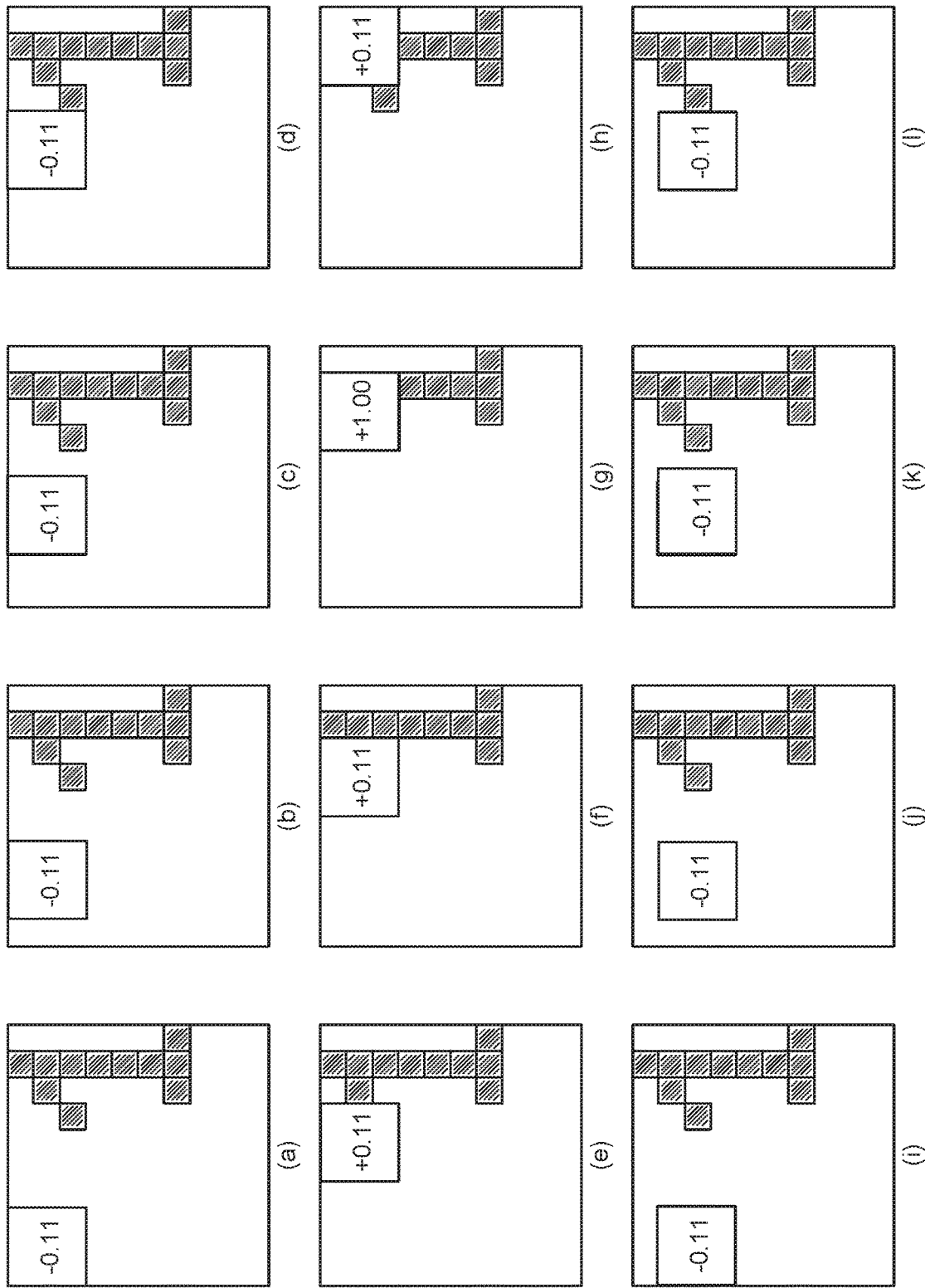
FIG. 1G shows the results of the 12 convolutional acts of FIG. 1F.
Figure 1H:
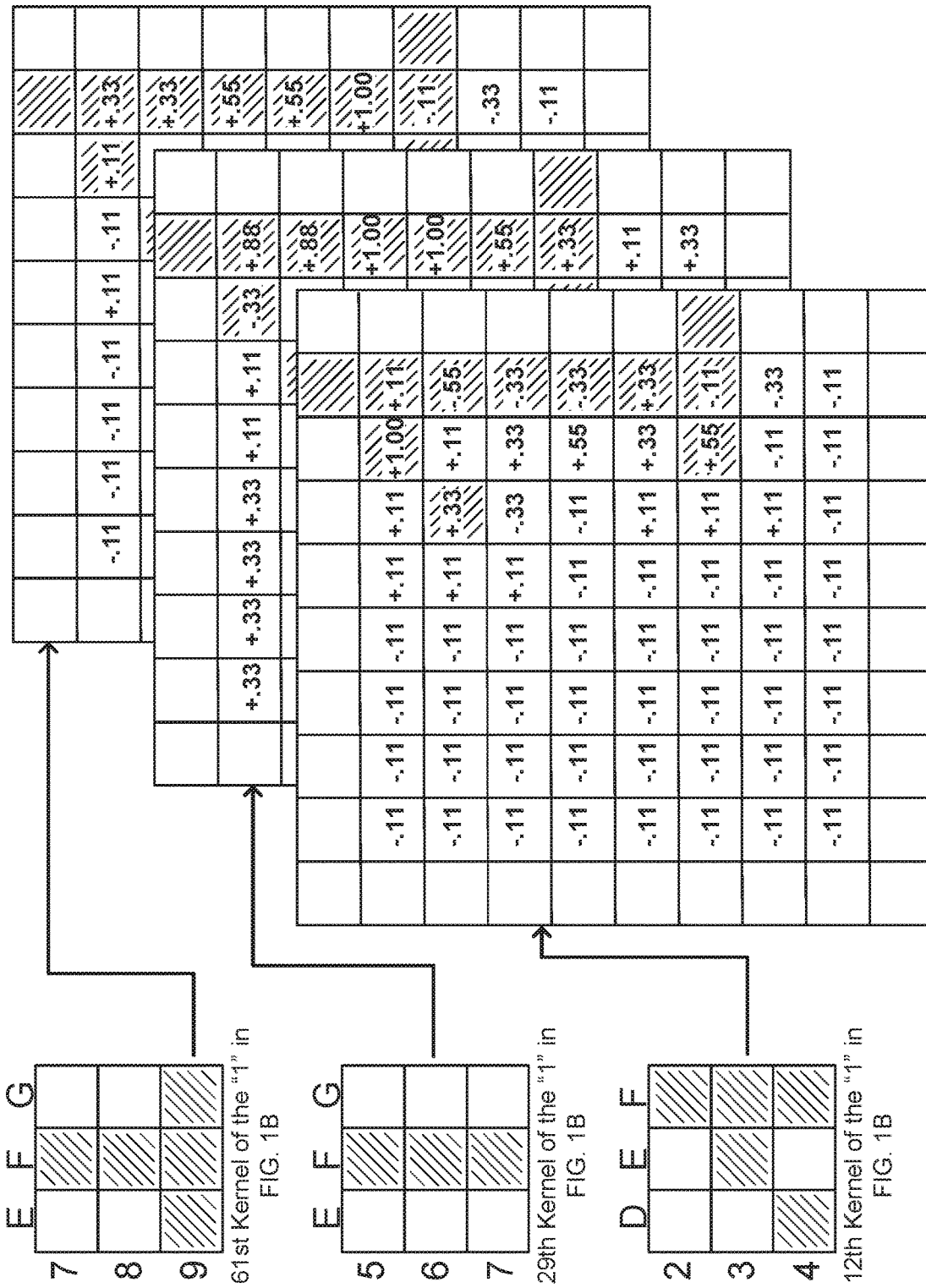
FIG. 1H illustrates a stack of maps of kernel values.
Figure 1I:
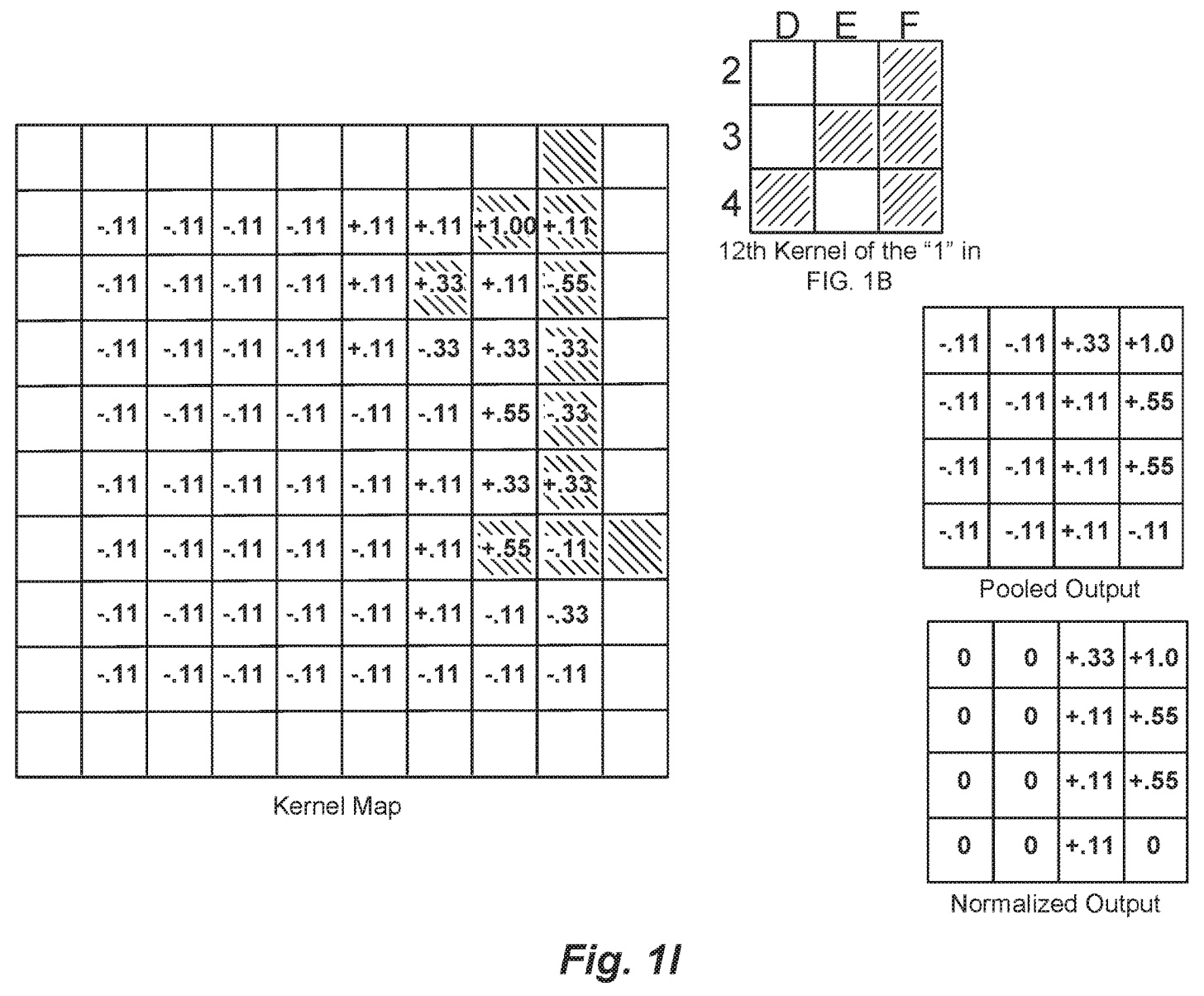
Figure 1J:
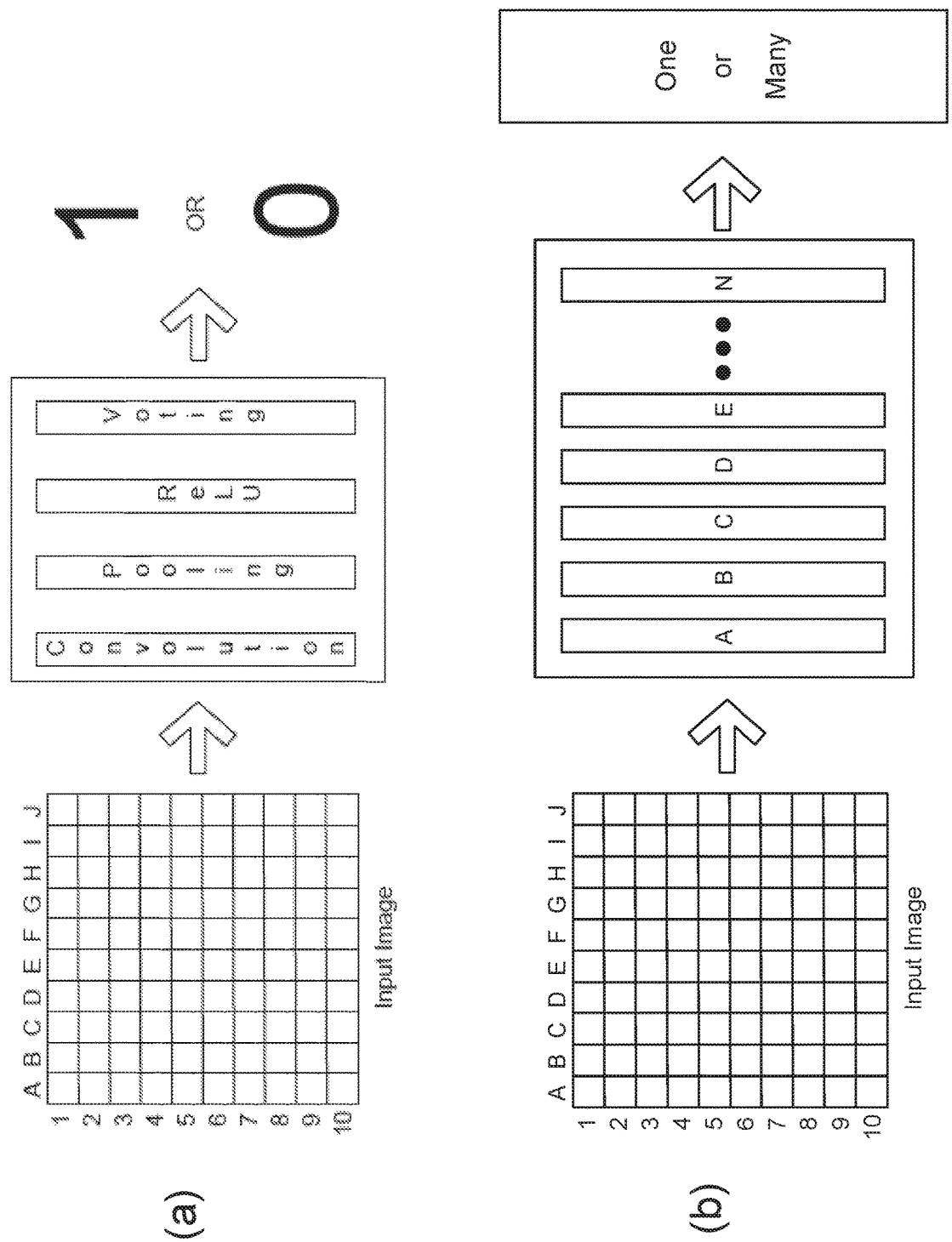
FIG. 1J shows the CNN system of FIG. 1A in more detail.

As the kernel traverses feature pixels in the horizontal and vertical directions (e.g., FIGS. 1F, 1G), the kernel advances in the horizontal direction, the vertical direction, or the horizontal and vertical directions by a selected amount of displacement. Horizontal and vertical displacement is selected by a designer of the neural network that is implemented by the CA 600. The displacement, which is also called the "stride," may be between one pixel and several pixels in horizontal direction, vertical direction, or horizontal and vertical directions. In some cases there are also padding rows, padding columns, or padding rows and padding columns added to the input feature data. The configuration logic 626 of FIG. 6A (e.g., kernel buffer control logic 626a of FIG. 6B) of CA 600 may be configured by loading particular register values such that the desired stride, padding, and the like are implemented.

Considering a neural network along the lines of AlexNet, after max pooling and non-linear activation operations are performed on the convolution output data, the feature input data for the next layer is generated. In some cases, the feature output data from one or more convolution accelerators 600 is passed back through the stream switch 500 to one or more other convolution accelerators 600. This type of process chaining permits data to be reused and may thereby avoid at least some inefficient, power-consuming, time-delaying memory storage operations.

Table 5 represents certain kernel and feature dimensions configurable in CAF 400 to implement a neural network along the lines of AlexNet.

In cases where it is not possible to provide local buffers in a CA 600 that are able to keep an entire kernel and feature size for all layer, the CAF 400 may also exploit the configurable convolution accelerators 600 to split feature and kernel data into batches, which may differ from one network layer to the next network layer. For example, one feature or kernel batch may keep the two-dimensional size of the input feature or kernel, but the batch may divide the number of channels by an integer number. Thus, for example the feature data of Layer 3 (Table 5) can be divided by 16, which will generate 16 feature batches of 13×13×16 pixels and 16 kernel batches of 3×3×16 for one kernel. One advantage of this data splitting is that a large set of repetitive operations can be assigned to a batch with a reasonably sized local storage in buffers 610-618 of the respective CA 600. A similar approach can be used for Layer 2a with a batch size of eight (8). When a batch size of eight (8) is used in Layer 2a, the CA 600 will perform convolution operation on six (6) feature batches with 27×27×8 pixels and kernel batches with 5×5×8 values.

To complete the batch calculations, the results of all batches of a kernel are summed to determine a final result for the entire kernel. That is, for each batch calculation, a set of intermediate results are stored and summed with the results of a next batch of the kernel. In some cases, the intermediate quantity of data is stored in local buffer memory (e.g., first CA internal buffer 610). In some cases, the intermediate data is passed through the stream switch 500 to the input of another CA 600 or another accumulator. In some other cases, the intermediate quantity of data is determined to be too large for storage in the CAF 400. In these cases, the intermediate data is streamed from the CA 600 to the SoC global memory 126 during and after one set of batch operations, and the intermediate data is fetched back again in a subsequent set of batch operations. In cases where intermediate data is passed back to the SoC global memory

TABLE 5

Kernel and feature dimensions of an exemplary neural network

| Layer | 1 | 2a | 2b | 3 | 4a | 4b | 5a | 5b |
|---|---|---|---|---|---|---|---|---|
| Feature | 227 × 227 | 27 × 27 | 27 × 27 | 13 × 13 | 13 × 13 | 13 × 13 | 13 × 13 | 13 × 13 |
| Feature | 3 | 48 | 48 | 256 | 192 | 192 | 192 | 192 |
| Stride | 4 × 4 | 1 × 1 | 1 × 1 | 1 × 1 | 1 × 1 | 1 × 1 | 1 × 1 | 1 × 1 |
| Padding | 0 × 0 | 2 × 2 | 2 × 2 | 1 × 1 | 1 × 1 | 1 × 1 | 1 × 1 | 1 × 1 |
| Kernel | 11 × 11 | 5 × 5 | 5 × 5 | 3 × 3 | 3 × 3 | 3 × 3 | 3 × 3 | 3 × 3 |
| Number | 96 | 128 | 128 | 384 | 192 | 192 | 128 | 128 |
| Output | 55 × 55 | 27 × 27 | 27 × 27 | 13 × 13 | 13 × 13 | 13 × 13 | 13 × 13 | 13 × 13 |
| Output | 96 | 128 | 128 | 384 | 192 | 192 | 128 | 128 |

The configurability of the CAF 400 permits each CA 600 to receive the "right" data values at the "right" instance in time so that a large number of MAC operations are performed in parallel. The configuration is a made possible, at least in part, using local buffers 610-618 in the CA 600 to buffer data for an acceptable number of operations before the data needs to be replaced by new data for new calculations. As indicated in Table 5, feature data and kernel data dimensions vary depending on the processing layer, the type of network, and for other reasons. Based on these network-centric variables, conventional processing hardware with processing capabilities that are fixed at design time cannot be used to implement neural networks. In contrast, flexible buffering capabilities of each CA 600, which permit in some cases buffers to be changed in dimension, may be exploited to expand the level of parallelism in a neural network.

126, the intermediate data may be passed using bus port interface 624, a DMA controller 406, or some other data transfer circuitry.

When a DMA controller 406 passes a data stream of a feature and kernel batch, the DMA controller may first transmit all channel values in the batch for one pixel before beginning a transmission of the next pixel data in the same line. At the end of a line, the DMA controller 406 may restart this procedure at the beginning of the next line until the entire kernel batch is transmitted. This procedure can be seen as a transformation of feature X-pixels-by-Y-pixels (X×Y) with batch size N in a feature with Y lines, and X-pixels-by-N-pixels (X×N) per line with a stride of N and batch size 1. The corresponding kernel with the dimension H-pixels-by-V-pixels (H×V) may be translated in a kernel with V lines where each line has H-values-by-N-values (H×N) per line with a stride of N pixels. For example, a 3×3 batch size 8 may be translated to a batch of 24×3 with a stride of 8.

Translating and processing a kernel or feature batch as described above provides valuable advantages. For example, configuring a CA 600 to translate and process translated data in this way allows a selected number N of MAC units 620 in a cluster to produce one output value per cycle as long as the horizontal H dimension of the kernel divided by the horizontal stride is less than or equal to the selected number N. In a neural network along the lines of AlexNet Layer 1, for example, where H=11, and Stride=4, then H/Stride≤3. Therefore, three (3) MACs 620 per cluster are sufficient to process this kernel. In CA 600 implementations having twelve (12) clusters with three (3) MAC units each, the twelve (12) cluster configuration covers the greatest horizontal dimension of a kernel supported by the CA 600. In this case, the three (3) MAC units are sufficient to handle the horizontal dimension of a kernel without any stalls when the equation (H/Stride≤3) is valid, which is the case in Table 5, Layers 1, 3, 4, 5.

In other cases, however, in order to be able to handle kernels with ratios larger than three (3), for example, the CA 600 may be configured to chain a selected number N of two or more MAC clusters 620 together to produce one output value per cycle. With this configuration, the greatest vertical dimension V of a kernel is divided by the selected number N of chained MAC clusters. For example, in a case of a kernel dimension of 5×5, where Stride=1, then H/Stride≤3*N with 12/N V). Thus, the 5×5 kernel of Layer 2 in Table 5 can be handled by chaining two MAC clusters. In CAF 400, this feature may be automatically applied when multiple clusters of the same kernel are assigned to the same processing row.

Another advantage of the kernel or feature batch translating and processing described above is associated with the bandwidth taken to transfer an intermediate batch of data. In these cases, the bandwidth for an intermediate batch and the output data may be reduced by a factor equal to the horizontal stride of the input feature. As explained before, the horizontal stride is identical to the batch size used to subdivide the third dimension of large kernels. Therefore, a batch size N divides the intermediate batch and output data bandwidth by N. Accordingly, calculating P kernels in parallel multiplies the intermediate batch and output data bandwidth by the factor P. Since using a large batch size consumes more local buffer space, which may be limited, a tradeoff may be found for the batch size to balance the available buffer space with the bandwidth consumed to stream the intermediate data to SoC global memory 126.

Considering again the convolution accelerator 600 of FIGS. 4, 6A-6B, the CA 600 has three CA input interfaces 602, 604, 606, respectively, arranged for coupling to a stream link 502 of stream switch 500 and one CA output interface 608 arranged for coupling to a stream link 502 of stream switch 500. The first CA input interface 602 is used to pass (e.g., receive) intermediate results of a previous batch calculation of a same kernel; the second CA input interface 604 is used to pass (e.g., receive) kernel data; and the third CA input interface 606 is used to pass (e.g., receive) feature data. The CA output interface 608 is used to pass (e.g., transmit) a data stream with batch calculation results. The batch calculation results will later be fetched again for a subsequent batch calculation or, in the case of the last batch, the batch calculation results will be used as final results of an entire kernel calculation.

In some embodiments, the CA 600 of FIGS. 4, 6A, 6B is arranged to use one single clock domain. In other embodiments, two or more clock domains may be fixedly or configurably applied to one or more convolution accelerators 600. Using a single clock domain may simplify the design of a CA 600. In some cases, the SoC 110 may operate using a clock frequency of 1 GHz. Timing analysis on behalf of the inventors in an embodiment of the SoC 110 using 28 nm CMOS technology has verified that a 1 GHz clock speed is reasonably achievable by the calculation blocks in an exemplary CA 600 embodied in an exemplary CAF 400. Faster and slower clock speeds are also contemplated.

The processing executed in each CA 600 may be directed according to one or more configuration registers. The configuration registers may be embodied in the CA configuration logic 626, the CAF control registers 402, or in other registers associated with each CA 600. In some embodiments, the configuration registers may be accessed and programmed by a host processor such as applications processor 128, a DSP of DSP cluster 122, a command passed into the stream switch 500 and processed by message/command logic 512, or by some other circuitry. The configuration registers may define various processing parameters of the CA 600 such as kernel size, the number of kernels processed in parallel, the configuration (e.g., size, dimensions, etc.) of CA internal buffers 610-618, the shifting of input and output data, kernel decompression, and other parameters. Table 6 presents an exemplary set of configuration registers of a convolution accelerator 600.

Table 6 Shows Configuration Registers of a Convolution Accelerator

| Register | Additional Parameters |
|---|---|
| Control | Enable/Disable, clk, config file |
| Kernel Format | Line interleaving; kernel buffer width |
| Data Sampling | First/start tags, last/end tags, frame tags |
| Date Format | Frame size, pixel size, data layout |
| Cluster Enable | MACs grouping |
| Kern Nr 7-0 | Kernel #; kernel nr of cluster x [7-0] |
| Kern Nr 11-8 | Kernel #; kernel nr of cluster x [11-8] |
| Kern Nr 11-8; | Line #; Buffer line for cluster x [11-8] |
| Kernel Filter | DMA source sharing |
| Kernel Lookup Control | Table location, size, type of index |
| Result Sum/Join | Adder width, branching, batch control |

Depending on values stored in the configuration registers (e.g., Table 6), a CA 600 will manage data input, data output, data shifting, and result normalization (e.g., saturation, rounding, etc.). The CA 600 will also apply pixel strides, line strides, and the CA 600 will account for padding values with additional columns, rows, or columns and rows. The CA 600 may optionally filter kernel batches if, for example, multiple accelerators are supplied with data through a single DMA controller 406. The CA 600 may optionally enable and perform kernel decompression.

Depending on the geometry of feature data, the kernel size, and the available MAC units 620, a CA 600 may process multiple kernels in parallel. When a convolution process starts, a CA 600 will accept a sufficient amount of feature data lines and the kernels required to perform the convolution process before the process is started. The convolution processing may be performed column-wise and by running two or more CA MAC units 620 in parallel.

FIG. 6D is a block diagram illustrating an exemplary convolution operation. In the block diagram, a 3-pixel-by- 3-pixel (3×3) kernel having a stride of one (1) is convolved. The following acts are performed.

At the start of a line in first cycle, a first CA MAC unit 620 of each of three clusters (i.e., three $1^{st}$ MAC units) performs calculations of the first column for the first output value of the first line.

At the next cycle, the second column is convolved by each of the first CA MAC units 620 of each cluster. Concurrently, a second CA MAC unit 620 of each of the three clusters (i.e., three $2^{nd}$ MAC units) performs the calculations of the first column for the second output value of the first line.

In a third clock cycle, each first CA MAC unit 620 of the three clusters performs the third column calculation for the first output value, each second CA MAC unit 620 of the three clusters performs the second column calculation for the second output value, and each third CA MAC unit 620 of the three clusters performs the first column calculations for the third output value of the line.

When processing the 3×3 kernel at a fourth clock cycle, each first CA MAC unit 620 of the three clusters restarts at the fourth input value with the first column calculation for the fourth output value, and so on with each second and third CA MAC units 620.

The calculation sequence illustrated in FIG. 6D performs such that on every cycle, one 3×3 pixel kernel batch is convolved, which provides a significant reuse of data values fetched from fifth CA internal buffer 618 (e.g., the feature line buffer). FIG. 6D shows how four 3×3 pixel kernels with 36 MAC operations per cycle are performed using only a single access to the feature strip buffer per calculated output value.

The fifth CA internal buffer 618 (e.g., the feature line buffer) of FIGS. 6A, 6B is considered in more detail. In some embodiments, feature data is passed from SoC global memory 126, through a DMA controller 406, through a stream link 502 of the stream switch 500, and to the third CA input interface 606 of an exemplary CA 600. The feature data may be comprised as an image frame, wherein each line of feature data has a first tag and a last tag, and the image frame also has a line tag on the first line and a line tag on the last line.

When the feature data is received at the third CA input interface 606 of the exemplary CA 600, the configuration logic 626 or other logic of the CA 600 checks and validates that the data stream format is correct. Thus, if the data stream starts with a Start of Frame (SOF) line tag and an active first signal, then the CA 600 determines it is receiving a first pixel of a new frame of feature data. Alternatively, if the data stream does not include the SOF line tag or active first signal, the data may be flagged as illegal, the data may be discarded, or other processing may be performed. When valid feature data is detected, the data is stored in the fifth CA internal buffer 618 (e.g., the feature strip buffer) line by line. In the exemplary case now described, the fifth CA internal buffer 618 feature strip buffer stores up to 12 lines of an input feature frame with 16-bit wide pixel values. In other cases, a different number of lines, a different width, or feature data having different characteristics may be stored.

The fifth CA internal buffer 618 feature line buffer provides concurrent access to a column of feature data values, which in the present example has up to 12 feature data values. When the fifth CA internal buffer 618 feature strip buffer is full, a stall signal is generated by the third CA input interface 606, which is propagated back to the attached DMA controller 406. In this case, the flow of data passed by the DMA controller 406 may be slowed, stopped, or otherwise controlled until the stall signal is released.

The maximum depth of the fifth CA internal buffer 618 feature strip buffer may be determined at design time and further configured at run time. In an exemplary CA 600 embodiment, the fifth CA internal buffer 618 feature line buffer has an upper limit depth of 512 entries. Such depth may in some cases limit the upper feature width applied to large kernels (e.g., kernels larger than six-pixels-by-six-pixels (6×6)) to a corresponding number. In the example, the upper feature width applied to large kernels may be limited to 512 pixels. In the case of smaller kernels (e.g., kernels smaller than or equal to six-pixels-by-six-pixels (6×6)), the upper feature width may be increased. In the current example, the upper feature width for smaller kernels may be doubled to 1024 pixels and may reach an upper width of 2048 pixels for features with kernels that have a size smaller than or equal to three-pixels-by-three-pixels (3×3).

The physical fifth CA internal buffer 618 feature strip buffer may be implemented with dual ported memory. Alternatively, the fifth CA internal buffer 618 feature strip buffer may be implemented with a single port memory by executing two single ported memory cuts that are written and read at alternate cycles. In this way, the single port memory may operate as a "pseudo dual ported memory" with concurrent read and write access. One advantage of the fifth CA internal buffer 618 feature stripe buffer is that its configuration permits a plurality (e.g., 12 or some other number) of feature data values to be loaded with a single memory access, thereby reducing overall power consumption of the CA 600.

The fourth CA internal buffer 616 (e.g., the kernel buffer) of FIGS. 6A, 6B is considered in more detail. In some embodiments, kernel data is passed from SoC global memory 126, through a DMA controller 406, through a stream link 502 of the stream switch 500, and to the second CA input interface 604 of an exemplary CA 600. The kernel data may be transferred as a RAW data stream having only a first tag and a last tag. That is, the kernel data is not formed as line data, so no line tags are embedded in the kernel data when it is transferred.

When the kernel data is received at the second CA input interface 604 of the exemplary CA 600, the configuration logic 626 or other logic of the CA 600 checks and validates that the data stream format (e.g., first/start tag, last/end tag) is correct. If the data stream format is not correct (e.g., a start or end tag is detected as missing), then the CA 600 may flag the data as illegal, the data may be discarded, or other processing may be performed. Alternatively, if the data stream is validated, the data is forwarded to the fourth CA internal buffer 616 kernel buffer.

In embodiments where the CA 600 is configured to process multiple kernels, streams of kernel data may be repeatedly received and stored until all kernel batches are available. In at least one exemplary embodiment, the fourth CA internal buffer 616 kernel buffer is configured to store up to 576 16-bit wide kernel values. This non-limiting but exemplary size may in some cases correspond to four (4) 3-pixel-by-3-pixel (3×3) kernel batches having a batch size of 16. In other cases, the fourth CA internal buffer 616 kernel buffer is arranged to store four (4) 11-pixel-by-11-pixel (11×11) kernels having a batch size of one (1), two 5-pixel-by-5-pixel (5×5) kernels having a batch size of 4, or some other configuration.

The fourth CA internal buffer 616 kernel buffer in at least one exemplary embodiment is divided into 12 rows and 48 columns. Other configurations are also contemplated. In the exemplary embodiment, each row of the fourth CA internal buffer 616 kernel buffer is connected to one cluster of three (3) CA MAC units 620. Such configuration provides three (3) read ports to select three (3) registers of the 48 kernel values in the same row.

In many but not all embodiments, every kernel register is not connected to every CA MAC unit 620. In these cases, it is recognized that when such full connections are implemented, there is potentially exponential growth of the multiplexer complexity with the number of registers that can be selected (e.g., 36×1:48 may be manageable whereas 36×1: 576 may be too complex).

Using the exemplary configuration described herein, the fourth CA internal buffer 616 kernel buffer may include, in some cases, replicated values (e.g., 5-pixel-by-5-pixel (5×5) kernels due to the chaining of two CA MAC unit 620 clusters). This configuration may still be desirable, however, because it heavily reduces hardware complexity of the fourth CA internal buffer 616 kernel buffer providing 36 16-bit wide read ports.

In some embodiments, a plurality of small kernels (e.g., H-pixels-by-V-pixels (H×V)) may be processed in parallel with a batch size (B) that satisfies the equation H*B<48. In these embodiments, the number of parallel processes may be limited by the kernel buffer width, the feature buffer width, or both the kernel buffer width and the feature buffer width.

In embodiments described herein, kernels that are processed using in line interleaving and kernels used for pre-buffering may be stored in a horizontal sequence. Pre-buffering of kernel batches can be useful to reduce the setup time at the startup of a new batch calculation.

In some cases, a convolution accelerator 600 will wait to until all kernels are loaded in the fourth CA internal buffer 616 kernel buffer and at least V−1 lines and H pixels are loaded in the fifth CA internal buffer 618 feature strip buffer. Here, "V" is a vertical dimension of the kernel. If two or more convolution accelerators 600 receive kernel data from a single DMA controller 406, then the kernel loading may take more time than the loading of the feature data. In these cases, kernel pre-buffering as described herein may eliminate this issue, particularly if enough kernel buffer space is configured and available.

Kernel data of a neural network can occupy a significant portion of on-chip memory. Increasing the size of on-chip memory increases the size of a chip, and correspondingly increases power consumption, which is undesirable. Since efficient, real time use of the neural network may rely on kernel data being loaded at a very high bandwidth, off-chip storage of kernel data is also undesirable. To address these shortcomings, kernel data may be compressed such that any performance degradation (e.g., time penalty, data loss) caused by decompression of the kernel data is acceptable.

One efficient decompression method is a simple lookup of the decompressed value in a table where the compressed value is used as an index. In one exemplary embodiment, the configuration logic 626 (e.g., kernel buffer control 626a) of a CA 600 manages a decompression lookup table formed in buffer space or other memory accessible by the CA 600. In a case where a lookup table includes 256 16-bit entries, a stream of 8-bit values received by the CA 600 can be decompressed into corresponding 16 bit kernel values. The width of compressed kernel data may be configured at run-time. Decompression can be performed when the decompression feature is enabled, which may also be at run-time, and when compressed kernel data arrives at the second CA input interface 604. Prior to startup of the CA 600, data that will populate the lookup table may be passed to the CA 600 via the CA bus port interface 624. Alternatively, in some embodiments, lookup table data may also be received via the second CA input interface 604 or via some other data transport mechanism.

The CA MAC units 620 of FIGS. 6A, 6B, are considered in more detail. Feature data from the fifth CA internal buffer 618 feature strip buffer is forwarded to a set of CA MAC units 620. In one exemplary embodiment, the CA MAC units 620 are arranged to include a stack of 12 MAC clusters of which each MAC cluster contains three (3) MAC units and wherein each MAC unit is capable of performing one 16-bit MAC operation per cycle. Other configurations are of course considered. For example, the CA MAC units 620 may include more of fewer than 36 MAC units, the included MAC units may or may not be arranged as clusters, and the included MAC units may operation of wider data, narrower data, or with different timing.

A highly connected CA feature buffer switch 628 is formed between the MAC clusters of CA MAC unit 620 and the fifth CA internal buffer 618 feature strip buffer. In some embodiments, the CA feature buffer switch 628 includes a set of programmable multiplexers. The CA feature switch 628 allows various ones of the MAC units of CA MAC 620 (e.g., each MAC cluster) to select a particular output port (e.g., one of the 12 output ports) of the fifth CA internal buffer 618 feature strip buffer. The selected output port will correspond to a particular feature lines or row.

In cases where small kernels are processed in parallel (e.g., the case discussed herein of 4 times 3×3), two or more MAC units (e.g., two or more MAC clusters) may select a same feature row of the fifth CA internal buffer 618 feature line buffer. For example, when the exemplary embodiment is considered, the first, second, and third MAC clusters will handle the first kernel; the fourth, fifth, and sixth clusters will handle the second kernel, and so on. In cases where larger kernels are processed, all MAC units (e.g., all clusters) may be used to calculate the result of one single kernel, and only one kernel is handled at a time. Some exceptions may apply, and the CAF 400 described herein is arranged to handle the exceptions. For example, in the exemplary neural network of Table 5, which is along the lines of AlexNet, a first layer includes an 11-pixel-by-11-pixel (11×11) kernel. Since the kernel in this case has a vertical dimension of 11 pixels, all of the MAC clusters of the exemplary CA MAC unit 620 (e.g., which has 12 MAC clusters) except one are used to perform the calculations. In a horizontal direction of this example, however, only 3 MAC units are required due to the stride of four (4) pixels. Accordingly, 33 MAC units can perform the calculations in parallel. On the other hand, due to the vertical stride of four (4) in this example from Layer 1 of Table 5, the MAC units will be in an idle state after the processing of one output line and until another three lines of feature data have been received and loaded into the fifth CA internal buffer 618 feature stripe buffer.

To address the undesirable idle states, the highly configurable CA 620 may optionally include an additional line interleaving mode. The additional line interleaving mode may be configured to apply multiple kernels to the same feature in a line-interleaved fashion. This line interleaving of feature data enables the CA 620 to process four 11×11 kernels in parallel on the same feature data.

The CA adder tree 622 of FIGS. 6A, 6B is considered in more detail. In exemplary operations as described herein, the CA adder tree 622 builds a sum of results provided by CA MAC units 620 at each cycle. The CA MAC units 620 perform multiplication and accumulation in a horizontal direction, and the CA adder tree 622 generates a sum in a vertical direction. The CA adder tree 622 has a width that may be configured at run-time based on the vertical size of the kernel. The configurable width of CA adder tree 622 operations can be divided in sub-branches if two or more kernels are calculated in parallel.

In addition to results from the CA MAC units 620, the CA adder tree 622 may also sum intermediate batch results received on the first CA input interface 602. In some cases, when two or more kernels are processed in parallel and the lines are not interleaved, data from the CA adder tree 622 is passed through the CA output interface 608 as a fixed sequence. That is, in the fixed sequence, the result for a first kernel may be passed through the CA output interface 608, then the result for a second kernel, and so on. In this case, the output data can be handled in a manner similar to the way that batch size is used for kernel data and input feature data. For example, if four (4) kernels are processed in parallel, the output feature data will be processed as if a batch size equals four (4). Correspondingly in these cases, intermediate data passed through the first CA input interface 602 will also maintain a same sequence.

The CA output interface 608 of FIGS. 6A, 6B is considered in more detail. In some cases, the CA output interface 608 includes or otherwise cooperates with CA configuration logic 626 (e.g., output control 626b) to form or otherwise process a raw data stream. The configuration logic may embed certain tags, flags, or other information in the stream of raw data (e.g., a first tag, a last tag, and the like). The raw data passed through the CA output interface 608 is passed through or otherwise generated by the CA adder tree 622.

As described herein, the CA output interface 608 is arranged for coupling to a stream link 502 of a stream switch 500. In the case of a stall signal passed through the stream switch 500 and received by the CA output interface 608, the stall or a corresponding representative signal will be passed to the CA adder tree 622. The stall signal will cause the CA 600 to slow or stop its processing until the stall signal is cleared. For example, a single register may pause or temporarily disable the CA 600. Alternatively, or in addition, the processing of the CA MAC units 60, the data fetching from the fifth CA internal buffer 618 feature line buffer, and the data fetching from the fourth CA internal buffer 616 kernel buffer may also be paused or otherwise suspended until the stall signal is cleared.

At run time in a system according to FIGS. 3-6, the CAF 400 may be configured with a selected number of defined, concurrent virtual processing chains. In this way, the CAF 400 provides a clear advantage over conventional systems because the CAF 400 can re-use data. That is, by defining concurrent virtual processing chains, streaming data does not need to be repeatedly transported over a system bus or temporarily stored in external memories before it can be reused by a "next" accelerator or interface. The full-featured back pressure mechanism provided in the CAF 400 manages data flow control, and stream multicasting permits the concurrent presentation of the same data (i.e., multiple instances of the same data) at multiple devices. In the case of stream "forks," where data is replicated to two or more destinations, a back pressure signal (e.g., stall signal) is regenerated with a combinatorial back pressure logic 518 that combines back pressure signals from each enabled destination device coupled to a stream link 502.

Considering the exemplary mobile device 100 embodiment of FIG. 3, at the startup of a particular video processing application, the host processor (e.g., application processor 128, a DSP 142 of DSP cluster 140, or another processor) configures one or more processing chains by programming the stream switch 500. The programming may be carried out by storing particular values in particular ones of the CAF control registers 402 (FIG. 4). The programming may be performed by default, at boot time, or at run time.

The processing chains generally include a first interface that sources streaming data to the stream switch, a first configuration of the stream switch that passes the streaming data to one or more accelerators, and a second configuration of the stream switch that passes processed data generated by the one or more accelerators to a second interface. More complex processing chains may of course be formed using various combinations of these acts.

For example, a simple processing chain is formed by configuring an input port 504 of stream switch 500 to pass streaming video data from an image sensor, image stream processor, or some other streaming data source. The stream switch 500 is then configured to pass the streaming video data to a first application specific accelerator (e.g., morph filter, JPEG encoder, background remover, feature point detector, etc.) or a first general purpose accelerator (e.g., color converter, image scaler/cropper, convolution accelerator, etc.). The stream switch 500 is then configured to pass output data from the first application specific or general purpose accelerator to a second interface. The second interface may be, for example, another accelerator, a DMA engine, or some other device.

Considering more complex processing chains, the CAF 400 framework permits chains with forks, joining streams with only one external interface, joining streams with multiple interfaces, chains with forks and hops, and other complex processing chains. In some cases, the more complex processing chains will be arranged to respect certain optional limitations. These optional limitations may, for example, be related to certain external interfaces that cannot control their bandwidth without losing data.

In one case, an image sensor connected to a camera interface provides a fixed average bandwidth. If a bottleneck occurs in a downstream (e.g., subsequent or later) block in the processing chain, data from the image sensor would not be stored or streamed, and instead, the data would be lost. One way to manage this possible data loss issue is to configure the camera sensor in such a way that an average bandwidth is provided which can be sustained at a worst case by all subsequent blocks in the processing chain. Another way to manage the possible data loss issue is to drop data in a controlled fashion, such as by dropping an entire frame and restarting at the start of a next frame, which may gracefully incur an acceptable impact on the functionality of the application. Yet one more way to manage the possible data loss issue is to provide reasonable buffer space from a shared pool of memory defined at design time and allocated at run time. Other techniques to manage possible data loss are also contemplated.

After the configuration of one or more processing chains, the host processor may be arranged to program the selected functionality in the configuration registers (e.g., registers of CAF control registers 402) of each block in the processing chain starting from the drain and progressing to the source of the chain. Stream input ports 504 of stream switch 500 elements that are not yet configured may be arranged to provide by default a stall single to any connected output stream port 516. Such programming may prevent a start of the particular processing chain before the entire processing chain is configured.

The run time configurability of the CAF 400 and the stream switch 500 integrated therein provides several advantages over conventional systems that are not so configurable. For example, using the CAF 400 architecture described herein, the design and integration of new accelerators and interfaces is significantly simplified. In addition, the reuse of existing accelerators is made easier. A CAF IP library as described herein (e.g., Table 2) may be extended with new accelerator modules, interface modules, and other modules. Many general purpose accelerators (e.g., color converter, image cropper, scaler, etc.) can also be reused at run time for multiple applications. Another advantage of the CAF 400 framework is an improved scalability. If more processing power is desired by a semiconductor practitioner, multiple identical accelerators can be integrated with very few lines of software definition that can be added in a system definition file. One more advantage of the present CAF 400 architecture is that one or more processing chains can be created, modified, or deleted at run time. Dedicated bypasses, multiplexors, or other logic is not required to remove or replace a unit in a processing chain, thereby providing increased flexibility to an algorithm designer. Still one more advantage of the CAF 400 is that data can be directly routed from a stream source device to a stream sink device without consuming memory space or bandwidth on a system bus. Multicasting features allow data streams to be easily replicated if desired without additional data fetching, and a large number of concurrently active streams and processing chains may be defined. The CAF architecture described herein advantageously permits completely host independent processing of complex tasks (e.g., an entire convolution layer) including the optional generation of interrupts if specific events occur. Yet one more advantage is realized by including simple unidirectional stream links 502 in the stream switch 500. Due to the unidirectional stream links 502, even large stream switches 500 remain architecturally efficient and scalable. For example, in some cases, a stream switch 500 having more than 50 input and output ports is compactly formed using only about 40 thousand gates, which is less than half the number of gates of one convolution accelerator. One last advantage mentioned herein is that, using the CAF 400 architecture, debugging and prototyping is drastically simplified due to the fact that each data stream can be replicated and routed to a debug module at any stage of the processing chain at run time. In this way, an algorithm designer or another software practitioner can, at run time, efficiently track, monitor, and debug or otherwise evaluate any processing chain in the system.

Figure 7:
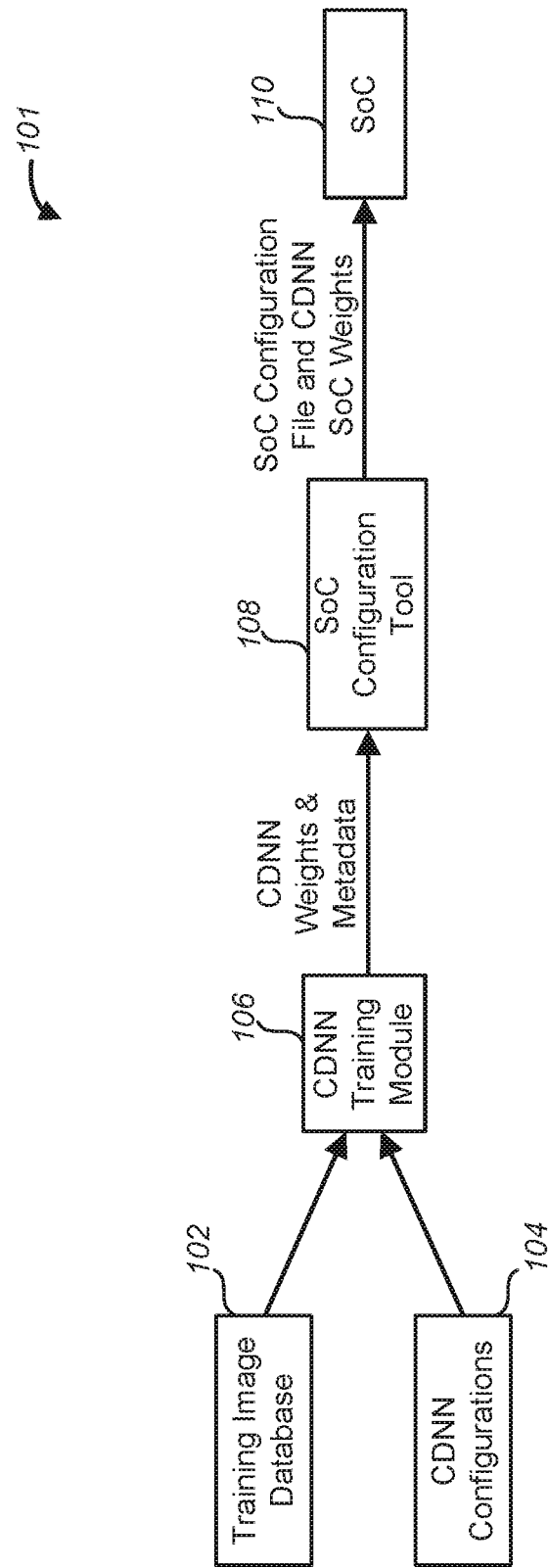
FIG. 7 is a high level block diagram illustrating the path of data for training a deep convolution neural network (DCNN) and configuring a system on chip (SoC) with the trained DCNN.

FIG. 7 is a high level block diagram illustrating the path of data for training a deep convolution neural network (DCNN) and configuring a system on chip (SoC) with the trained DCNN. System 101 includes a DCNN training module 106, an SoC configuration tool 108, and the SoC 110. The system 101 also includes a training image database 102 and DCNN configurations 104.

The training image database 102 includes a plurality of images that are used to train the DCNN. The images in the training image database 102 share a common characteristic or image recognition criteria that defines an object that the DCNN is to be trained to recognize. The object to recognize may be a specific object, or classes or sub-classes of objects. For example, the object may be a dog, a particular breed of dog, mammals, or animals in general. It should be understood that these examples are not to be limiting and other types of object may also be recognized. As an example, if the object to recognize is animals, then the image database 102 includes a plurality of images of different types of animals, such as lions, dogs, penguins, eagles, whales, dolphins, kangaroos, rabbits, squirrels, or other animals. In general, the more the training images encompass the common characteristics of the object, the more accurate the DCNN should be.

The DCNN configurations 104 include a plurality of different neural cell structures, a plurality of different neural network components, and a plurality of different types of deep learning frameworks that the user can choose from to design the DCNN. For example, the DCNN configurations 104 may include configuration information for any number of neural cell structures (e.g., backfed input cells, linear input cells, noisy input cells, hidden cells, probabilistic hidden cells, spiking hidden cells, linear output cells, match input/output cells, recurrent cells, memory cells, different memory cells, kernel cells, convolution or pool cells, and the like).

The DCNN configurations may also include configuration for various neural network component s (e.g., components of type perceptron, feed forward (FF), radial basis network (RBF), deep feed forward (DFF), Markov chain (MC), Hopfield network (HN), Boltzmann Machine (MB), restricted BM (RBM), deep belief network (DBN), recurrent neural network (RNN), long/short term memory (LSTM), gated recurrent unit (GRU), deep convolutional network (DCN), deconvolutional network (DN), deep convolutional inverse graphics network (DCIGN), auto encoder (AE), variational AE (VAE), denoising AE (DAE), sparse AE (SAE), generative adversarial network (GAN), liquid state machine (LSM), extreme learning machine (ELM), echo state network (ESN), deep residual network (DRN), Kohenen network (KN), support vector machine (SVM), neural Turing machine (NTM), and others). The DCNN configurations 104 may also include configuration information deep learning frameworks that include fully formed neural network implementations such as Caffe, AlexNet, Theano, TensorFlow, GoogleLeNet, VGG19, ResNet, or other deep learning frameworks.

Once the deep learning framework and the image database 102 are selected, the DCNN configuration information from the DCNN configurations 104 and the training images from the image database 102 are uploaded or provided to the DCNN training module 106.

The DCNN training module 106 executes or runs the deep learning framework with the provided training images to train the DCNN. This training generates DCNN weights and metadata. These weights define the trained neural network.

The DCNN weights and metadata are provided to the SoC configuration tool 108. The SoC configuration tool 108 utilizes the DCNN weights to generate and acceptably optimize the SoC configurable topology. For example, the SoC configuration tool 108 tests and validates the image dataset; provides fixed point analysis; performs acceptably optimal fixed point precision assignment (layer-wise); performs weights compression; and performs weights layout transformation. Other operations that the SoC configuration tool 108 performs include performing network description to network topology operations; memory management and buffer placement; DMA descriptor chains generation; and acceptably optimal mapping and scheduling of DCNN execution on configurable accelerator framework and DSP clusters. The SoC configuration tool 108 outputs an SoC configuration file and the DCNN SoC weights. The SoC configuration file identifies the various configurations of the SoC 110 (e.g., the configuration of one or more DSPs 138 on the SoC 110 and a configurable accelerator framework) for implementing the DCNN on the SoC 110.

The DCNN SoC weights are uploaded to and stored in the memory of the SoC 110. In some embodiments, the DCNN SoC weights may be provided to the SoC 110 via USB, wirelessly, or other data communication link. In various embodiments, the DCNN SoC weights are provided to the SoC 110 as part of a configuration file that is loaded by the SoC 110 at boot time of the SoC 110, which configures the SoC 110.

Figure 8A:
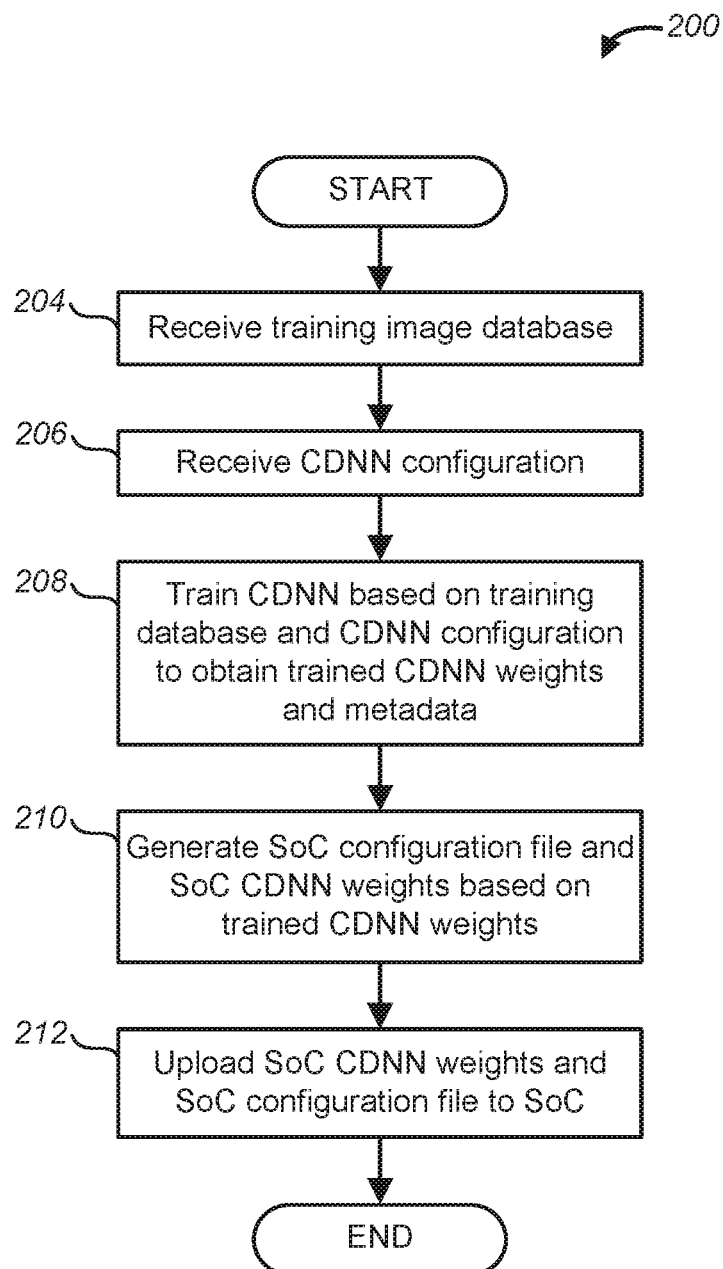
FIG. 8 includes FIGS. 8A-8B, which show flowcharts of the processes for designing and configuring the SoC (FIG. 8A) and utilizing the configured SoC to recognize object in an image (FIG. 8B).
Figure 8B:
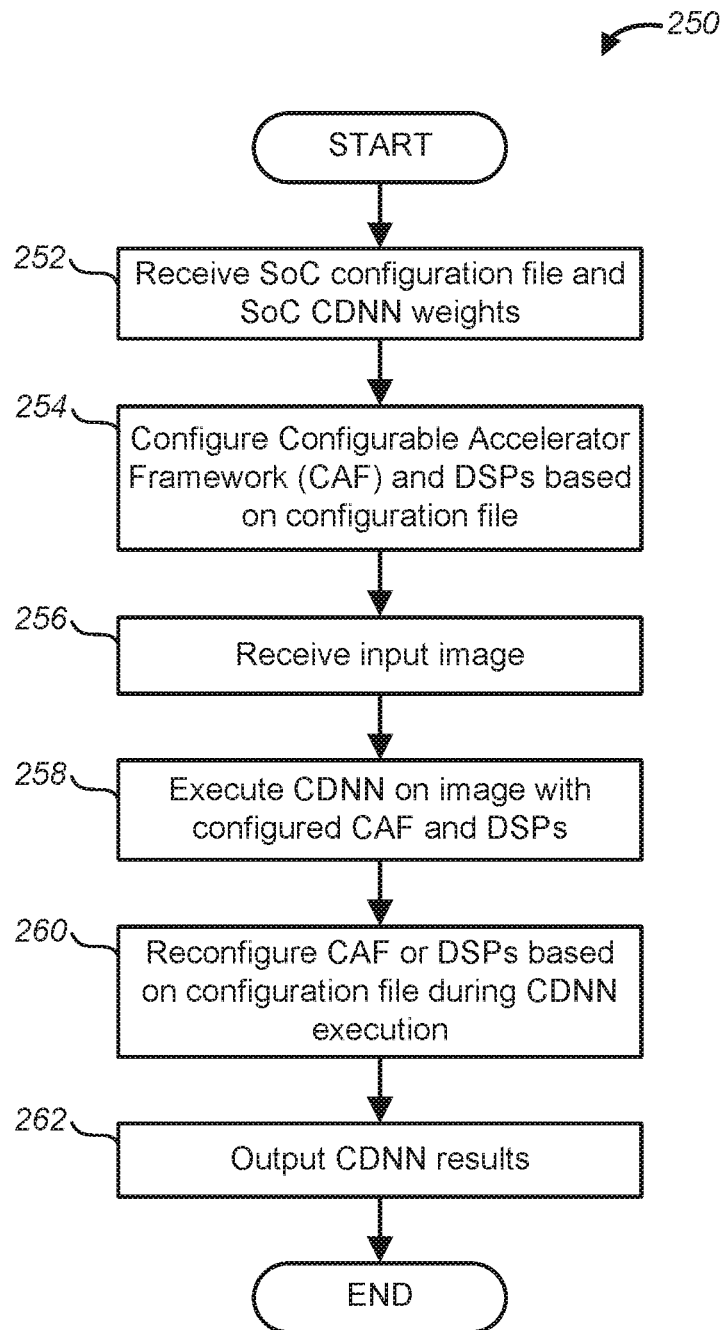

FIG. 8 includes FIGS. 8A-8B.

FIGS. 8A-8B show flowcharts of exemplary processes for designing and configuring the SoC 110 (FIGS. 3, 7) and for utilizing the configured SoC 110 to classify an image (FIG. 8B). Process 200 of FIG. 8A begins after a start block. At block 204 a training image database is received. The training database includes a plurality of images, each of which has at least one common characteristic or image feature that defines an object that the DCNN is to be trained to recognize (i.e., a trained object). For example, if the user uploads 500 images, and each image has a dog in it, then the trained object is a dog, even though the user does not specify.

Process 200 continues to block 206, where a DCNN configuration is received. As mentioned above, the user can select or define a deep learning framework that is used to train the DCNN.

Process 200 proceeds to block 208, where the DCNN is trained based on the images in the training database and the DCNN configuration. This DCNN training is known to one of skill in the art and outputs trained DCNN weights and other metadata.

Process 200 continues next at block 210, where an SoC configuration file and SoC DCNN weights are generated based on the trained DCNN weights. This generation process may include configuration and customization of the utilization of the DSPs 138 or the DSP clusters 122, 140 and the CAF 400 (including the CAs in the CAF 400), as mentioned above. In various embodiments, this configuration identifies a different CAF 400 configuration and DSP 138 utilization for each DCNN layer. Again the CAF 400 is an image and deep convolutional neural network co-processing system that works in conjunction with the DSPs 138 to execute the DCNN.

Process 200 proceeds to block 212, where the SoC configuration file and the SoC DCNN weights are uploaded to the SoC 110. The SoC 110 stores the SoC DCNN weights in its memory, such as SoC global memory 126, and when the SoC configuration file is loaded, the SoC 110 is enabled to perform image recognition on input image data.

After block 212, process 200 ends or otherwise returns to a calling process to perform other actions.

Process 250 of FIG. 8B begins after a start block. At block 252 an SoC configuration file and SoC DCNN weights are received, such as described above in conjunction with FIG. 8A. Again, this configuration file defines how the CAF 400 and DSPs 138 are to be configured during the processing of an image through the DCNN layers.

Process 250 proceeds to block 254, where the CAF 400 and the DSPs 138 are configured based on the received configuration file. This configuration can include initializing one or more DSPs 138 to perform a specific operation associated with the DCNN (e.g., max or average pooling, nonlinear activation, cross-channel response normalization, etc.). Similarly, the CAF 400 is configured such that the fully connected switch in the CAF 400 is configured to move data to or from appropriate source or sink components and one or more convolution accelerators are initialized to perform various actions (e.g., color converter, reference frame update, background/shadow remover, multiple state morph filtering, feature detection, image cropper and scaler/subsampler, etc.), as described in more detail above.

Process 250 continues at block 256, where an image is received. It should be recognized that a single still image may be received, or the image may be a single image frame in a video.

Process 250 proceeds next to block 258, where the trained DCNN is executed on the received image by employing the configured CAF 400 and DSPs 138 to perform their configured actions or functions.

Process 250 continues next to block 260, where, during the DCNN execution, the CAF 400 and/or the DSPs 138 are reconfigured based on the configuration file. Since each layer in the DCNN may perform different tasks or be acceptably optimized in different ways, the SoC configuration file identifies how the CAF 400 or the DSPs 138 are to be configured for each layer of the DCNN during the classification of an image.

Process 250 proceeds to block 262, where the DCNN results are output. In various embodiments, the results in this case may be a Boolean true or false, indicating whether the input image includes the trained object or not. In other embodiments, the results may be a number or other identifier of the probability that the image includes the object. In yet other embodiments, the results may identify a probability of a plurality of different objects.

After block 262, process 250 ends or otherwise returns to a calling process to perform other actions. In various embodiments, process 250 may loop to block 254 to reconfigure the SoC 110 for a new input image at block 256. This reconfiguration may be viewed as resetting the DCNN to employ on a new image to recognize the trained object.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the embodiments.

Unless the context requires otherwise, throughout the specification and claims which follow, the word "comprise," and variations thereof, such as "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system on chip (SoC) that implements a deep convolutional neural network architecture, the SoC comprising:
a system bus;
a plurality of addressable memory arrays coupled to the system bus;
at least one applications processor core coupled to the system bus;
a configurable accelerator framework coupled to the system bus, wherein the configurable accelerator framework is an image and deep convolutional neural network (DCNN) co-processing system that includes a plurality of convolution accelerators configured to perform convolutional operations; and
a plurality of digital signal processors (DSPs) coupled to the system bus, wherein the plurality of DSPs are configured to perform non-convolution data processing operations associated with processing of a DCNN kernel in parallel with execution of convolutional operations associated with processing of the DCNN kernel by the plurality of convolution accelerators of the configurable accelerator framework to execute the DCNN kernel, wherein the non-convolutional data processing operations associated with the DCNN kernel include one or more operations selected from a group of operations consisting of pooling, non-linear activation and cross-channel response normalization.

2. The SoC of claim 1, wherein the plurality of digital signal processors include a plurality of DSP clusters coupled to the system bus, and wherein each DSP cluster of the plurality of DSP clusters includes at least two separate DSPs.

3. The SoC of claim 2, further comprising:
a global DSP cluster crossbar switch coupled to each of the plurality of DSP clusters and to the system bus.

4. The SoC of claim 2, wherein each DSP cluster includes:
a DSP cluster crossbar switch;
a first local DSP crossbar switch and a second local DSP crossbar switch, each coupled to the DSP cluster crossbar switch;
a first DSP, a first instruction cache, and a first DSP memory, each coupled to the first local DSP crossbar switch; and
a second DSP, a second instruction cache, and a second DSP memory, each coupled to the second local DSP crossbar switch.

5. The SoC of claim 2, wherein each DSP cluster includes:
a DSP cluster crossbar switch;
a first local DSP crossbar switch and a second local DSP crossbar switch, each coupled to the DSP cluster crossbar switch;
a first DSP coupled to the first local DSP crossbar switch;
a second DSP coupled to the second local DSP crossbar switch;
a shared DSP cluster memory coupled to the DSP cluster crossbar switch; and
a direct memory access coupled between the shared DSP cluster memory and the system bus.

6. The SoC of claim 1, wherein the configurable accelerator framework includes:
a reconfigurable stream switch coupled to the system bus; and
wherein the plurality of convolution accelerators are coupled to the stream switch.

7. The SoC of claim 6, wherein the stream switch is configurable at run-time and reconfigurable during execution of the at least one DCNN.

8. The SoC of claim 6, wherein each of the plurality of convolution accelerators is configurable at run-time and reconfigurable during execution of the DCNN kernel.

9. The SoC of claim 1, wherein non-convolution operations associated with the DCNN kernel are synchronized with convolutional operations associated with the DCNN kernel using interrupts.

10. The SoC of claim 1, wherein non-convolution operations associated with the DCNN kernel are synchronized with convolutional operations associated with the DCNN kernel using mailboxes.

11. The SoC of claim 1, wherein the memory arrays have a hierarchical structure.

12. The SoC of claim 6 wherein the configurable accelerator framework includes a plurality of control registers and the stream switch, in operation, provides the plurality of DSPs with access to the plurality of control registers during processing of the DCNN kernel to control performing of non-convolution operations by the plurality of DSPs.

13. A mobile computing device comprising:
an imaging sensor that captures images;
a system on chip (SoC) that implements a deep convolutional neural network architecture, the SoC, including:
an SoC bus;
an on-chip memory coupled to the SoC bus;
a configurable accelerator framework coupled to the SoC bus, the configurable accelerator framework including a reconfigurable dataflow accelerator fabric that receives the captured images from the imaging sensor for deep convolutional neural network (DCNN) processing by at least one convolution accelerator; and
a plurality of digital signal processor (DSPs) clusters coupled to the SoC bus, the plurality of DSP clusters configured to perform non-convolution operations for the DCNN and arranged to coordinate functionality with the at least one convolution accelerator of the configurable accelerator framework to execute the DCNN, wherein the plurality of DSP clusters are configured to perform the non-convolutional data processing operations for a DCNN kernel in parallel with execution of convolutional operations for the DCNN kernel by the at least one convolutional accelerator, wherein the non-convolutional data processing operations for the DCNN kernel include one or more operations selected from a group of operations consisting of pooling, non-linear activation and cross-channel response normalization.

14. The mobile computing device of claim 13, wherein each DSP cluster of the plurality of DSP clusters includes at least two separate DSPs arranged for communication with each other and for communication with the SoC bus via a DSP cluster crossbar switch.

15. The mobile computing device of claim 13, comprising:
a global DSP cluster crossbar switch coupled to each of the plurality of DSP clusters and to the SoC bus.

16. The mobile computing device of claim 13, wherein each DSP cluster includes:
a DSP cluster crossbar switch;
a first local DSP crossbar switch and a second local DSP crossbar switch, each coupled to the DSP cluster crossbar switch;
a first DSP, a first instruction cache, and a first DSP memory, each coupled to the first local DSP crossbar switch; and
a second DSP, a second instruction cache, and a second DSP memory, each coupled to the second local DSP crossbar switch.

17. The mobile computing device of claim 13, wherein each DSP cluster includes:
a DSP cluster crossbar switch;
a first local DSP crossbar switch and a second local DSP crossbar switch, each coupled to the DSP cluster crossbar switch;
a first DSP coupled to the first local DSP crossbar switch;
a second DSP coupled to the second local DSP crossbar switch;
a shared DSP cluster memory coupled to the DSP cluster crossbar switch; and
a direct memory access coupled between the shared DSP cluster memory and the SoC bus.

18. The mobile computing device of claim 13, wherein the reconfigurable dataflow accelerator fabric is configurable at run-time and reconfigurable during execution of the DCNN.

19. The mobile computing device of claim 13, wherein the at least one convolution accelerator is configurable at run-time and reconfigurable during execution of the DCNN.

20. The mobile computing device of claim 13 wherein the configurable accelerator framework includes a plurality of control registers and a stream switch, which, in operation, provides the plurality of DSPs with access to the plurality of control registers during processing of the DCNN kernel to control performing of non-convolution operations by the plurality of DSPs.

21. A system on a chip (SoC), comprising:
a communication bus;
a memory coupled to the communication bus;
a configurable accelerator framework coupled to the communication bus, the configurable accelerator framework having a reconfigurable stream switch coupled to the communication bus and a plurality of convolution accelerators coupled to the stream switch, the plurality of convolution accelerators arranged to perform convolution operations on image data during execution of a deep convolutional neural network (DCNN); and
a plurality of digital signal processors (DSPs) coupled to the communication bus, wherein the plurality of DSPs perform non-convolution operations for the DCNN and coordinate functionality with the plurality of convolution accelerators of the configurable accelerator framework to execute the DCNN, wherein the plurality of DSP are configured to perform non-convolutional data processing operations for a DCNN kernel in parallel with execution of convolutional operations for the DCNN kernel by the plurality of convolutional accelerators, wherein the non-convolutional data processing operations for the DCNN kernel include one or more operations selected from a group of operations consisting of pooling, non-linear activation and cross-channel response normalization.

22. The SoC of claim 21, wherein the plurality of DSPs are in clusters, each cluster having at least two separate DSPs, each cluster including a cluster communication bus coupled to the communication bus.

23. The SoC of claim 22, comprising:
a global DSP communication bus coupled to the communication bus and coupled to the cluster communication bus of each cluster;
wherein each cluster includes:
a first local DSP communication bus and a second local DSP communication bus, each of the first and second local DSP communication buses coupled to the cluster communication bus;
a first DSP coupled to the first local DSP communication bus;
a second DSP coupled to the second local DSP communication bus;
a shared cluster memory coupled to the cluster communication bus; and
a direct memory access coupled between the shared cluster memory and the communication bus.

24. The SoC of claim 21, wherein the configurable accelerator framework includes a plurality of control registers to store control information to control execution of the DCNN, and the reconfigurable stream switch, in operation, provides DSPs of the plurality of DSPs and convolutional accelerators of the plurality of convolutional accelerators with access to the plurality of control registers.

* * * * *

UNITED STATES PATENT AND TRADEMARK OFFICE
CERTIFICATE OF CORRECTION

Page 1 of 1

PATENT NO. : 12,118,451 B2
APPLICATION NO. : 15/423272
DATED : October 15, 2024
INVENTOR(S) : Giuseppe Desoli et al.

It is certified that error appears in the above-identified patent and that said Letters Patent is hereby corrected as shown below:

On the Title Page

Item (73) Assignee:
"STMICROELECTRONICS INTERNATIONAL B.V., Amsterdam (NL)"
Should read:
--STMICROELECTRONICS INTERNATIONAL N.V., Amsterdam (NL)--.

Signed and Sealed this
Thirty-first Day of December, 2024

Derrick Brent
*Acting Director of the United States Patent and Trademark Office*